(12) United States Patent
Bothun et al.

(10) Patent No.: US 7,484,631 B2
(45) Date of Patent: Feb. 3, 2009

(54) MODULAR STORAGE SYSTEM FOR LOGISTICAL MANAGEMENT OF OPERATIONAL UNITS

(75) Inventors: Richard A. Bothun, Owatonna, MN (US); Mark E. Gallea, Waseca, MN (US); Michael D. Jines, Northfield, MN (US); Frederick A. Mather, Owatonna, MN (US); Gregg S. Nelson, Northfield, MN (US); Marty L. Prins, Owatonna, MN (US); Craig J. Ulrich, Owatonna, MN (US)

(73) Assignee: Nenger Corporation, Owatonna, MN (US)

( * ) Notice: Subject to any disclaimer, the term of this patent is extended or adjusted under 35 U.S.C. 154(b) by 536 days.

(21) Appl. No.: 10/990,277

(22) Filed: Nov. 16, 2004

(65) Prior Publication Data

US 2005/0236340 A1 Oct. 27, 2005

Related U.S. Application Data

(60) Provisional application No. 60/616,538, filed on Oct. 6, 2004, provisional application No. 60/599,227, filed on Aug. 5, 2004, provisional application No. 60/543,047, filed on Feb. 9, 2004, provisional application No. 60/523,044, filed on Nov. 17, 2003.

(51) Int. Cl.
*A47F 5/00* (2006.01)
(52) U.S. Cl. ..................................... 211/162; 312/201
(58) Field of Classification Search ................. 211/162, 211/151, 189, 126.15; 312/198–201, 131, 312/132, 349, 249.8, 318, 351.11, 351.14; 414/331.06; 104/106, 110, 245, 247, 140; 280/47.4, 33.994; 108/102, 137
See application file for complete search history.

(56) References Cited

U.S. PATENT DOCUMENTS

| 566,926 A | 9/1896 | McKay et al. |
| 702,503 A | 6/1902 | Stewart |
| 842,821 A | 1/1907 | Tryon |
| 1,033,630 A | 7/1912 | Sowers |

(Continued)

FOREIGN PATENT DOCUMENTS

DE 3242953 A1 5/1984

(Continued)

OTHER PUBLICATIONS

Case Study, Spacesaver Corporation, SC 9889, Aug. 1998, 2 pages.

(Continued)

*Primary Examiner*—Jennifer E. Novosad
(74) *Attorney, Agent, or Firm*—Patterson, Thuente, Skaar & Christensen, P.A.

(57) ABSTRACT

A modular storage system for installation on a floor includes a plurality of carts. Each cart includes a base that generally has a length that separates opposed ends of the base, a storage structure that is operably attached to and carried by the base, at least three pivotable wheel assemblies, the wheel assemblies being operably attached to and extending below the base to provide a rolling surface adapted to roll on the floor, and at least one track follower mechanism that is operably attached to one end of the base and having at least a portion of which is selectively vertically movable to engage the track.

11 Claims, 72 Drawing Sheets

U.S. PATENT DOCUMENTS

| | | | |
|---|---|---|---|
| 1,981,655 A | 11/1934 | Lucke, Jr. | |
| 2,068,403 A | 1/1937 | Ekstrom | |
| 2,166,704 A | 7/1939 | Foulkes | |
| 2,336,686 A | 12/1943 | Hudash | |
| 2,772,639 A | 12/1956 | Ingold | |
| 2,904,383 A | 7/1959 | Potts | |
| 2,905,480 A | 9/1959 | Giovannelli | |
| 2,915,195 A | 12/1959 | Crosby | |
| 2,966,991 A | 1/1961 | Duffner | |
| 2,987,200 A | 6/1961 | Ingold | |
| 3,044,577 A * | 7/1962 | Lotz | 188/5 |
| 3,080,204 A | 3/1963 | Lindhgren | |
| 3,145,031 A | 8/1964 | Wilkinson | |
| 3,188,977 A | 6/1965 | Viktorsson | |
| 3,198,592 A | 8/1965 | Zippel | |
| 3,240,507 A | 3/1966 | Braun | |
| 3,286,651 A | 11/1966 | Dahl, Jr. | |
| 3,410,223 A * | 11/1968 | Miller | 104/60 |
| 3,427,085 A | 2/1969 | Staller | |
| 3,540,614 A | 11/1970 | Flagg | |
| 3,563,180 A | 2/1971 | Rutledge | |
| 3,563,400 A | 2/1971 | Greaves | |
| 3,566,802 A | 3/1971 | Lundgvist | |
| 3,575,479 A | 4/1971 | Kombuchen | |
| 3,589,522 A | 6/1971 | Chiodo | |
| 3,640,595 A | 2/1972 | Staller et al. | |
| 3,650,407 A | 3/1972 | Benham, Jr. | |
| 3,724,389 A | 4/1973 | Greaves | |
| 3,772,994 A | 11/1973 | Juarbe | |
| 3,801,176 A | 4/1974 | Higbee | |
| 3,802,573 A | 4/1974 | Davis et al. | |
| 3,829,189 A | 8/1974 | Staller | |
| 3,861,702 A | 1/1975 | Wilson | |
| 3,865,446 A | 2/1975 | Mastronardi | |
| 3,869,137 A | 3/1975 | Byrom | |
| 3,876,223 A | 4/1975 | O'Reilly et al. | |
| 3,880,336 A | 4/1975 | Demasson | |
| 3,890,903 A | 6/1975 | Showell | |
| 3,908,562 A | 9/1975 | Wittschen | |
| 3,920,297 A | 11/1975 | Brandes | |
| 3,923,354 A | 12/1975 | Young | |
| 3,944,309 A | 3/1976 | Taniwaki | |
| 3,957,323 A | 5/1976 | Tucker et al. | |
| 3,967,868 A | 7/1976 | Baker, Jr. | |
| 3,981,511 A * | 9/1976 | Foster | 280/79.3 |
| 4,017,131 A | 4/1977 | Camenisch | |
| 4,033,649 A | 7/1977 | Naito et al. | |
| 4,084,125 A | 4/1978 | King | |
| 4,084,867 A | 4/1978 | Putt et al. | |
| 4,092,031 A | 5/1978 | Greer et al. | |
| 4,099,735 A | 7/1978 | Becker, III | |
| 4,126,327 A | 11/1978 | Taber | |
| 4,227,710 A | 10/1980 | Laub | |
| 4,241,668 A | 12/1980 | Carroll | |
| 4,256,355 A | 3/1981 | Yamaguchi et al. | |
| 4,275,665 A | 6/1981 | Silverman | |
| 4,307,922 A | 12/1981 | Rhodes, Jr. | |
| 4,326,465 A | 4/1982 | Forrest | |
| 4,344,660 A | 8/1982 | Molnar et al. | |
| 4,372,514 A | 2/1983 | Glumac | |
| 4,412,772 A | 11/1983 | Naito et al. | |
| 4,417,524 A | 11/1983 | Quinn et al. | |
| 4,418,930 A | 12/1983 | Ryan, Jr. | |
| 4,421,365 A | 12/1983 | Taniwaki | |
| 4,422,816 A | 12/1983 | Naito et al. | |
| 4,432,589 A | 2/1984 | Sattel | |
| 4,441,617 A | 4/1984 | Forsberg | |
| 4,450,968 A * | 5/1984 | Muellner | 211/17 |
| 4,462,500 A | 7/1984 | Konstant et al. | |
| 4,467,924 A | 8/1984 | Morcheles | |
| 4,509,805 A | 4/1985 | Welsch et al. | |
| 4,523,794 A * | 6/1985 | Peterman | 312/201 |
| 4,557,534 A | 12/1985 | Dahnert | |
| 4,561,547 A | 12/1985 | Estwanik, III | |
| 4,568,233 A | 2/1986 | Baker et al. | |
| 4,583,647 A | 4/1986 | Schinzing | |
| 4,597,615 A | 7/1986 | Steger | |
| 4,627,544 A | 12/1986 | Scarpa et al. | |
| 4,629,065 A | 12/1986 | Braaten | |
| 4,702,174 A | 10/1987 | Tredwell et al. | |
| 4,802,622 A | 2/1989 | Homan | |
| 4,807,765 A | 2/1989 | Brown et al. | |
| 4,936,467 A | 6/1990 | Bobeczco | |
| 4,941,578 A | 7/1990 | Devening | |
| 4,991,725 A * | 2/1991 | Welsch et al. | 211/162 |
| 5,048,902 A | 9/1991 | Daly | |
| 5,054,625 A | 10/1991 | Foley | |
| 5,072,838 A * | 12/1991 | Price et al. | 211/162 |
| 5,085,327 A | 2/1992 | Mercer, Jr. et al. | |
| 5,160,189 A | 11/1992 | Johnston et al. | |
| 5,303,828 A | 4/1994 | Paullin | |
| D353,285 S | 12/1994 | Spirk, Jr. et al. | |
| 5,377,849 A | 1/1995 | Martin | |
| 5,439,281 A | 8/1995 | Croker | |
| 5,454,441 A | 10/1995 | Jines | |
| 5,462,299 A | 10/1995 | Maddux | |
| D365,716 S | 1/1996 | Rose, Sr. | |
| 5,526,916 A | 6/1996 | Amdahl et al. | |
| D374,363 S | 10/1996 | Puzo | |
| 5,588,355 A | 12/1996 | Mead et al. | |
| 5,597,217 A * | 1/1997 | Hoska et al. | 312/201 |
| 5,651,469 A | 7/1997 | Lodge | |
| 5,653,366 A | 8/1997 | Liserre | |
| 5,657,883 A | 8/1997 | Badia | |
| 5,676,428 A | 10/1997 | St. Laurent | |
| 5,680,942 A | 10/1997 | McAllister et al. | |
| 5,683,155 A | 11/1997 | Sarno | |
| 5,685,440 A | 11/1997 | Mason | |
| 5,690,235 A | 11/1997 | Matzen | |
| D392,486 S | 3/1998 | Hsia | |
| D393,553 S | 4/1998 | Beggs | |
| D394,926 S | 6/1998 | Lindsay | |
| 5,769,260 A | 6/1998 | Killinger et al. | |
| 5,788,070 A | 8/1998 | Banker | |
| 5,797,612 A | 8/1998 | Buccioni | |
| D398,469 S | 9/1998 | Leong et al. | |
| D401,458 S | 11/1998 | Hsia | |
| 5,848,716 A | 12/1998 | Waranius | |
| 5,862,924 A | 1/1999 | Dumont | |
| 5,871,105 A | 2/1999 | Whitehead et al. | |
| 6,027,190 A | 2/2000 | Stewart et al. | |
| D421,866 S | 3/2000 | Long | |
| 6,073,783 A | 6/2000 | Allman | |
| D429,094 S | 8/2000 | Solowiej | |
| 6,112,917 A | 9/2000 | Baker et al. | |
| 6,152,043 A | 11/2000 | Haring | |
| 6,161,485 A | 12/2000 | Muth | |
| 6,164,465 A | 12/2000 | Schroeder | |
| 6,216,887 B1 | 4/2001 | Soo | |
| 6,231,138 B1 | 5/2001 | Janson | |
| 6,241,106 B1 | 6/2001 | Fujita et al. | |
| 6,247,769 B1 | 6/2001 | Spitzer et al. | |
| 6,371,031 B1 | 4/2002 | Muth | |
| D459,931 S | 7/2002 | Mahoney | |
| D460,652 S | 7/2002 | Mahoney | |
| 6,431,627 B1 | 8/2002 | Tomeny | |
| 6,460,950 B2 | 10/2002 | Spitzer et al. | |
| 6,547,085 B2 | 4/2003 | Belisle | |
| D476,183 S | 6/2003 | Bennett | |
| 6,591,994 B1 | 7/2003 | Bearss | |
| 6,592,189 B1 | 7/2003 | Back, Sr. | |
| D479,423 S | 9/2003 | Mahoney | |
| 6,644,213 B2 | 11/2003 | Muth | |
| 6,659,294 B1 | 12/2003 | Simard | |

| | | | |
|---|---|---|---|
| 6,669,314 B1 | 12/2003 | Nemec et al. | |
| 6,688,708 B1 | 2/2004 | Janson | |
| 6,726,039 B2 | 4/2004 | Boron | |
| 6,752,278 B2 | 6/2004 | Craft et al. | |
| 6,824,231 B2 * | 11/2004 | Jakob-Bamberg et al. | 312/249.9 |
| 6,948,785 B1 | 9/2005 | Frank | |
| 7,124,902 B1 * | 10/2006 | Chen | 211/162 |
| 2005/0132924 A1 | 6/2005 | Bothun | |
| 2005/0150178 A1 | 7/2005 | Bothun | |
| 2005/0236340 A1 | 10/2005 | Bothun | |
| 2006/0076306 A1 * | 4/2006 | Bothun et al. | 211/162 |
| 2006/0163184 A1 * | 7/2006 | Parker et al. | 211/162 |
| 2006/0231517 A1 * | 10/2006 | Bothun et al. | 211/151 |

FOREIGN PATENT DOCUMENTS

GB            2 225 928 A       6/1990

OTHER PUBLICATIONS

Case Study, Spacesaver Corporation, SC 9889A, Aug. 1998, 1 page.

Spacesaver Corporation Advertisement, undated, 1 page.

Rolling Storage Systems, "Rolling Storage Systems," Internet Archive Wayback Machine, http://web.archive.org/web/20010421235451/http://rollingstoragesystems.com/, Apr. 21, 2001, 1 page.

Rolling Storage Systems, "Rolling Storage Systems-Product Description," Internet Archive Wayback Machine, http://web.archive.org/web/20030724174314/rollingstoragesystems.com/newDescriptionPage1.htm, Jul. 24, 2003, 2 pages.

Rolling Storage Systems, "Description, Innovative Storage for the Garage and Basement," Internet Archive Wayback Machine, http://web.archive.org/web/20010503150402/rollingstoragesystems.com/NewDescriptionPage2.h..., May 3, 2001, 1 page.

Rolling Storage Systems, "Description, Innovative Storage for the Garage and Basement," Internet Archive Wayback Machine, http://web.archive.org/web/20010507061616/rollingstoragesystems.com/NewDescriptionPage3.htm, May 7, 2001, 3 pages.

Rolling Storage Systems, "Rolling Storage Systems-Features," Internet Archive Wayback Machine, http://web.archive.org/web/20010428112116/rollingstoragesystems.com/NewFea..., Apr. 28, 2001, 1 page.

Rolling Storage Systems, "Ordering Information," Internet Archive Wayback Machine, http://web.archive.org/web/20030724174450/rollingstoragesystems.com/NewOrdering.htm, Apr. 28, 2001, 2 pages.

Rolling Storage Systems, "Rolling Storage Systems-Pricing," Internet Archive Wayback Machine, http://web.archive.org/web/20010503032347/rollingstoragesystems.com/PricingMatrix.htm, May 3, 2001, 2 pages.

Rolling Storage Systems, "Rolling Storage Systems-About Us," Internet Archive Wayback Machine, http://web.archive.org/web/20010428111359/rollingstoragesystems.com/New A..., Apr. 28, 2001, 1 page.

PCT Preliminary Report on Patentability (Chapter I of the Patent Cooperation Treaty): Dated Oct. 2, 2008; 3 pages.

Canadian Notification of Requisition by the Examiner; Dated Oct. 20, 2006; 1 page.

* cited by examiner

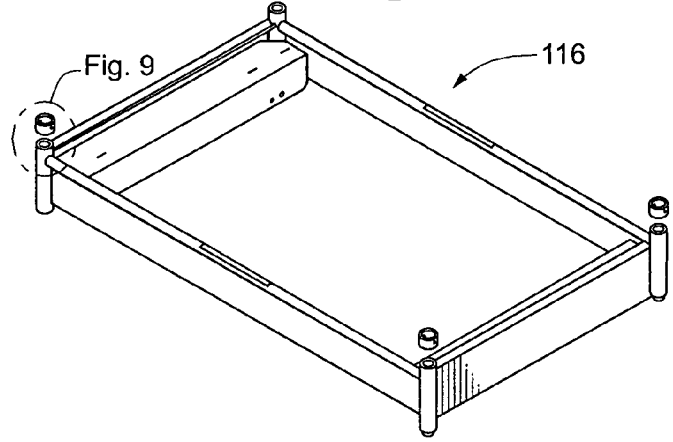
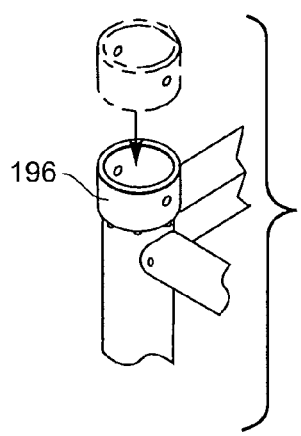
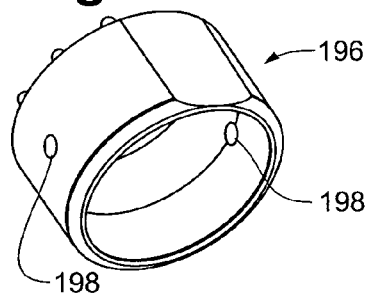
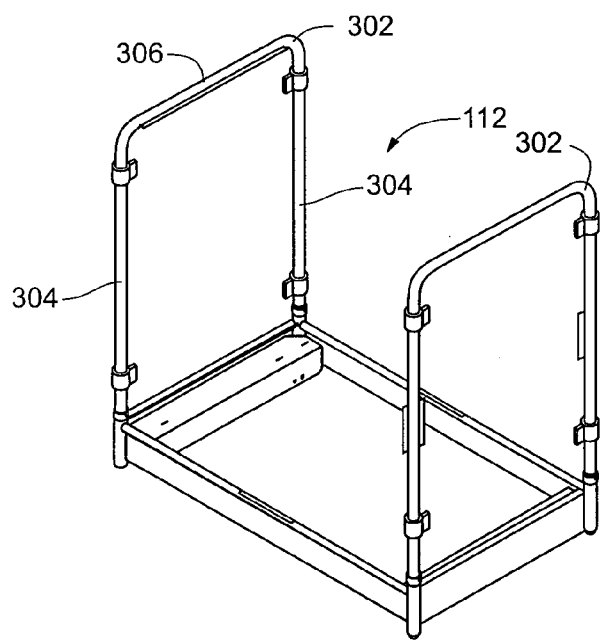
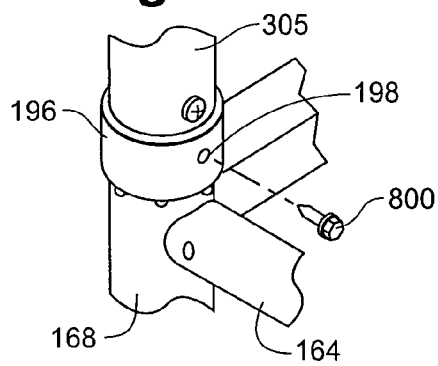

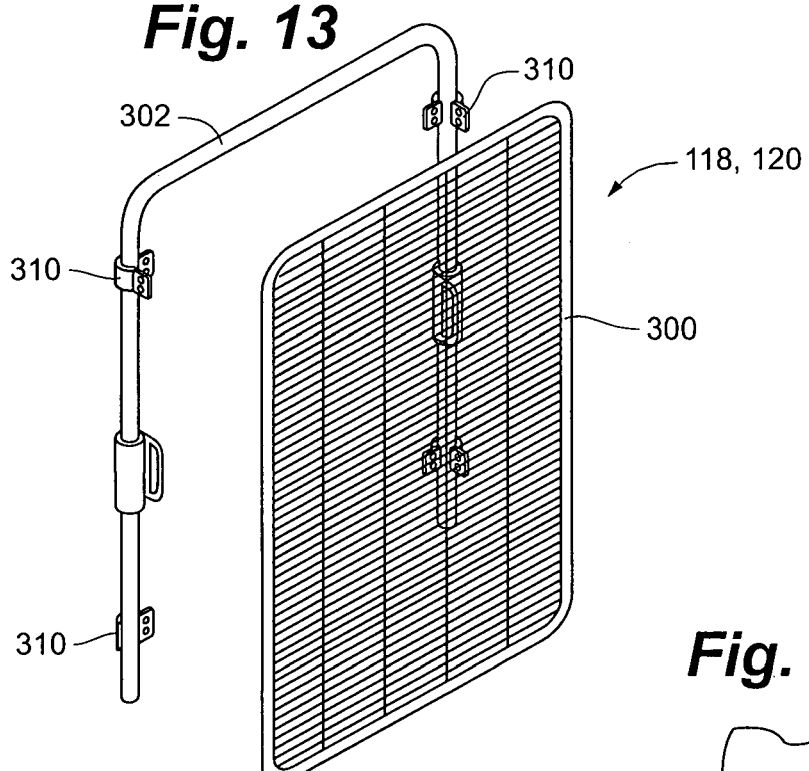
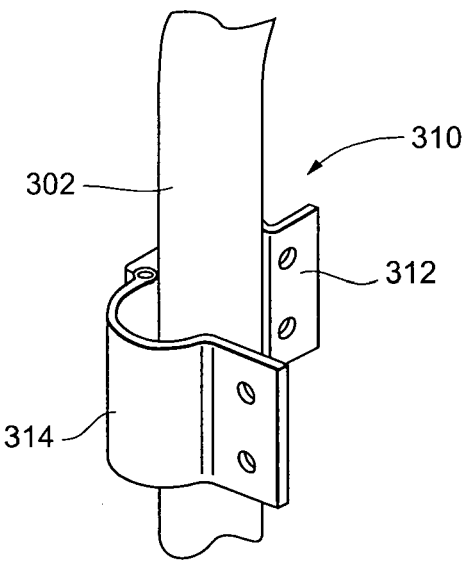
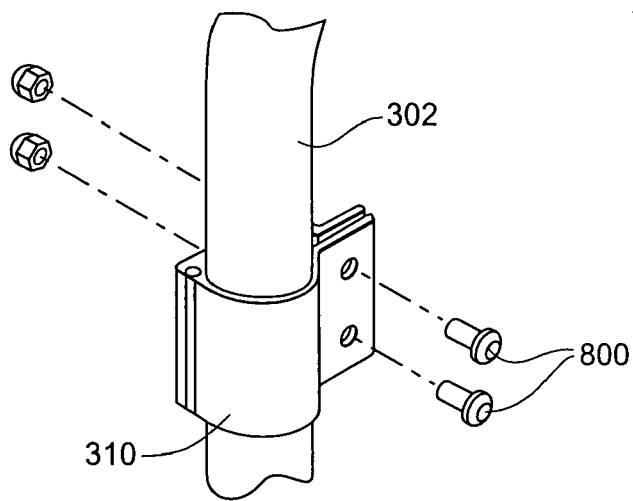

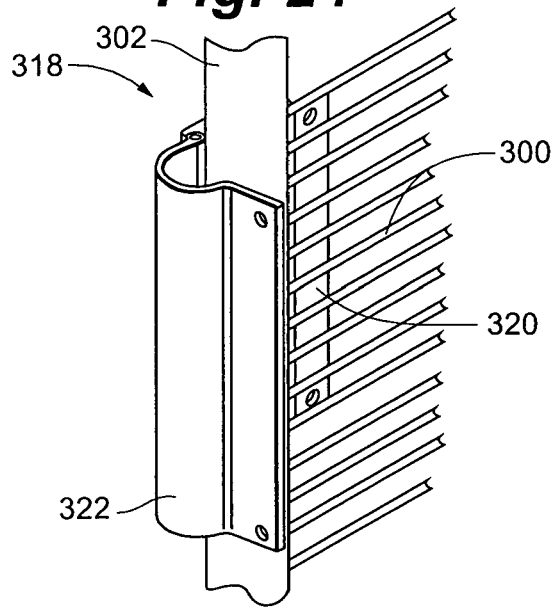
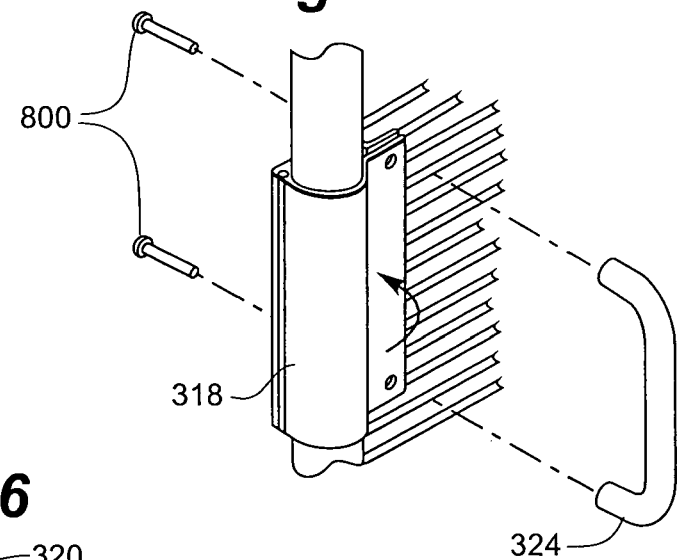
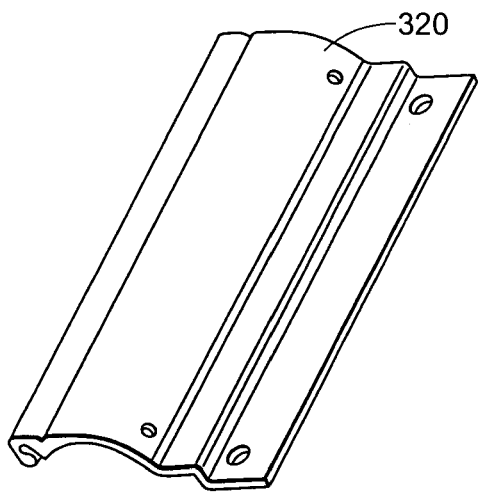
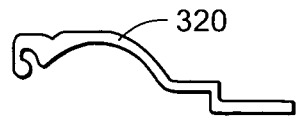

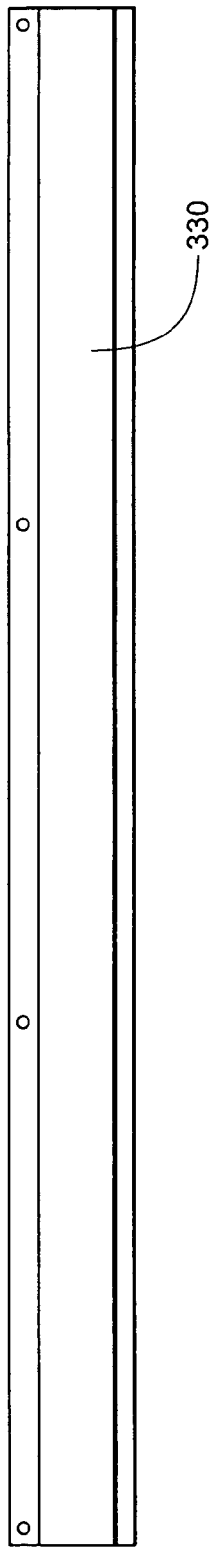
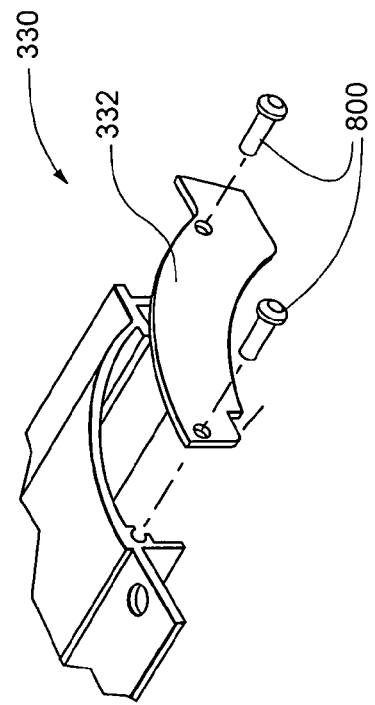
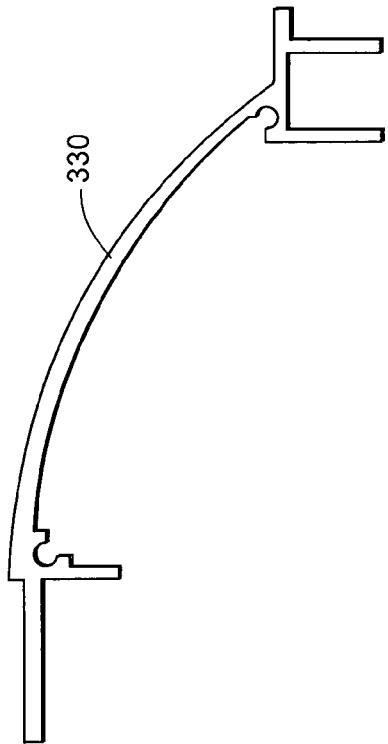

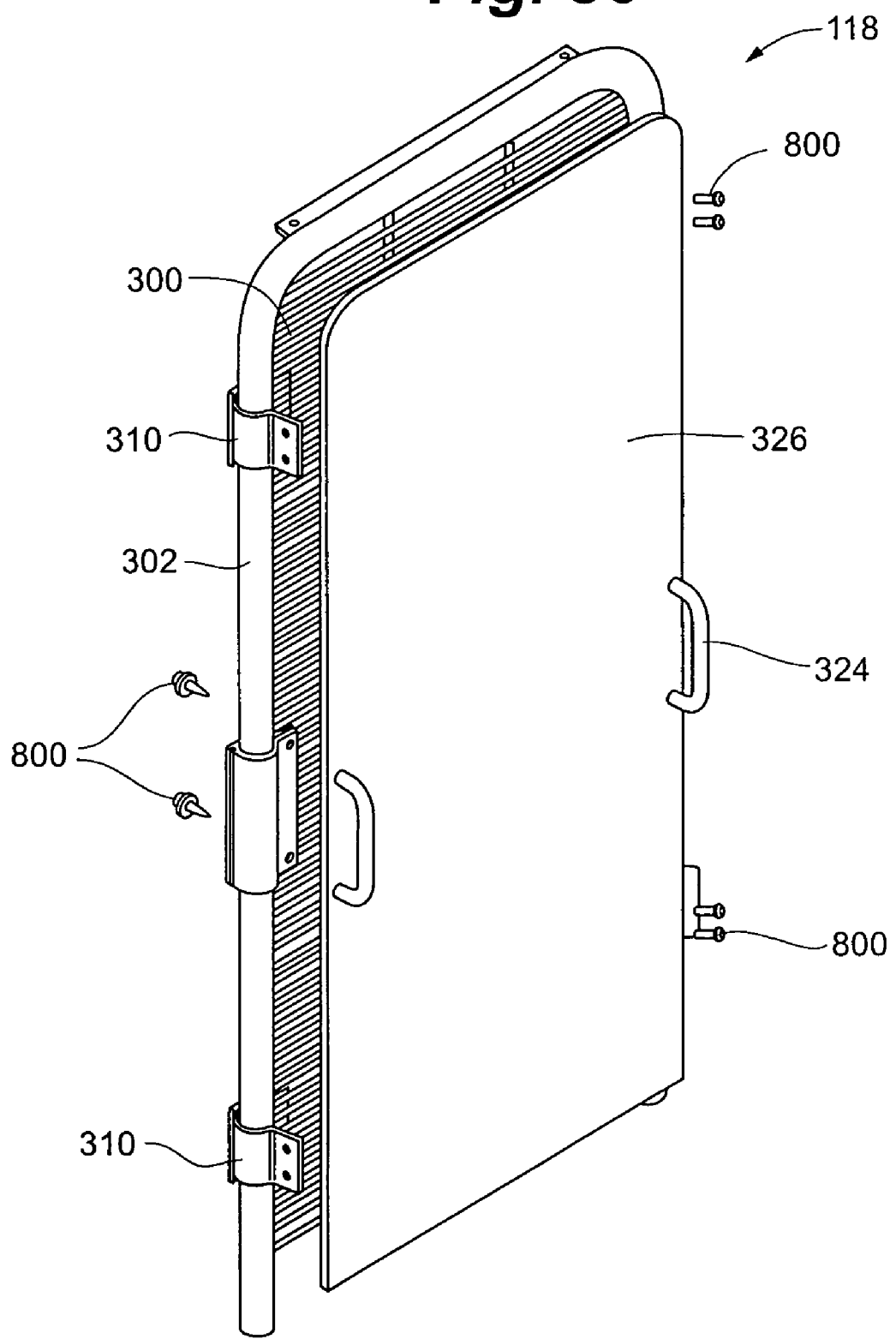

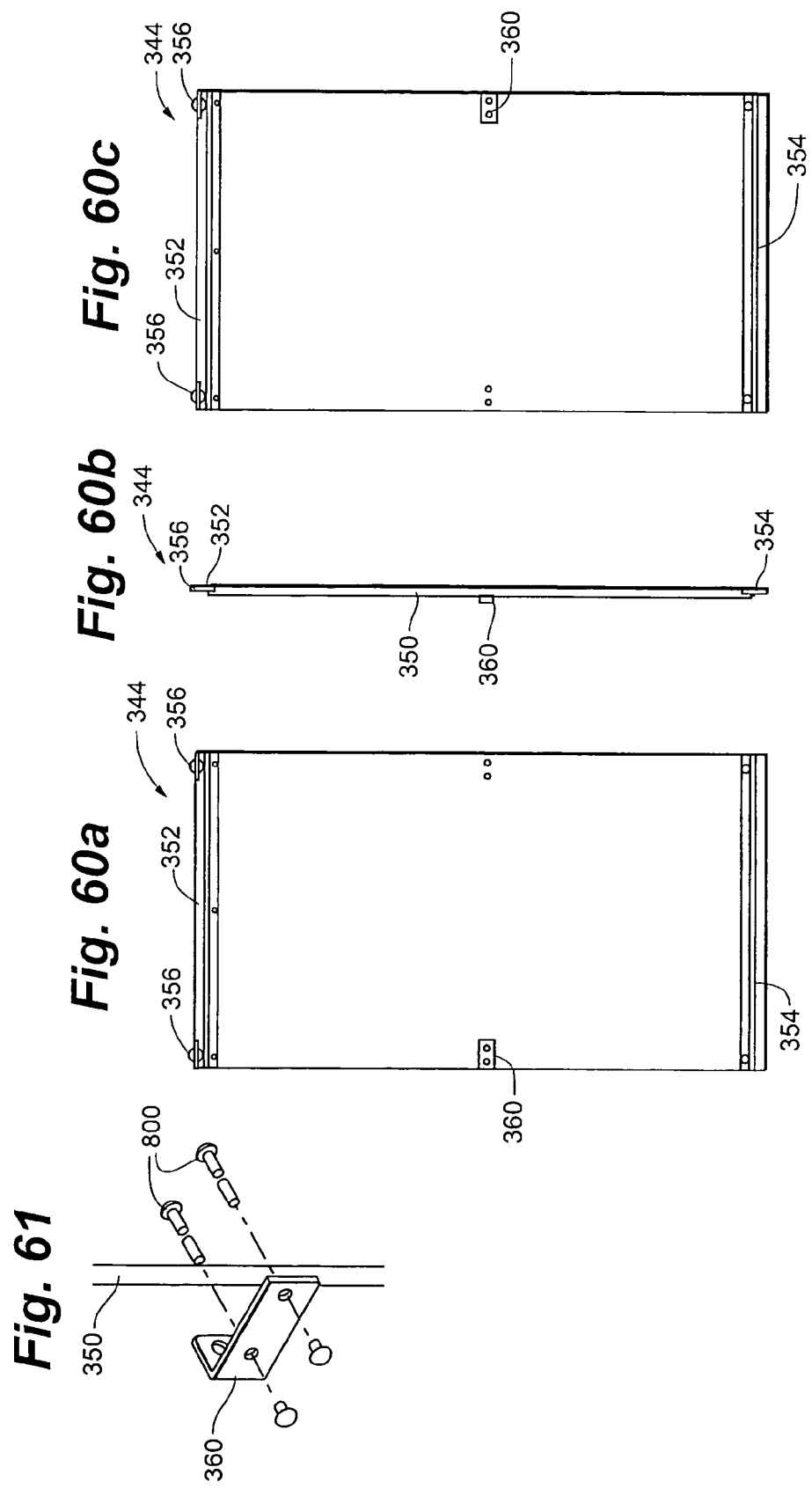

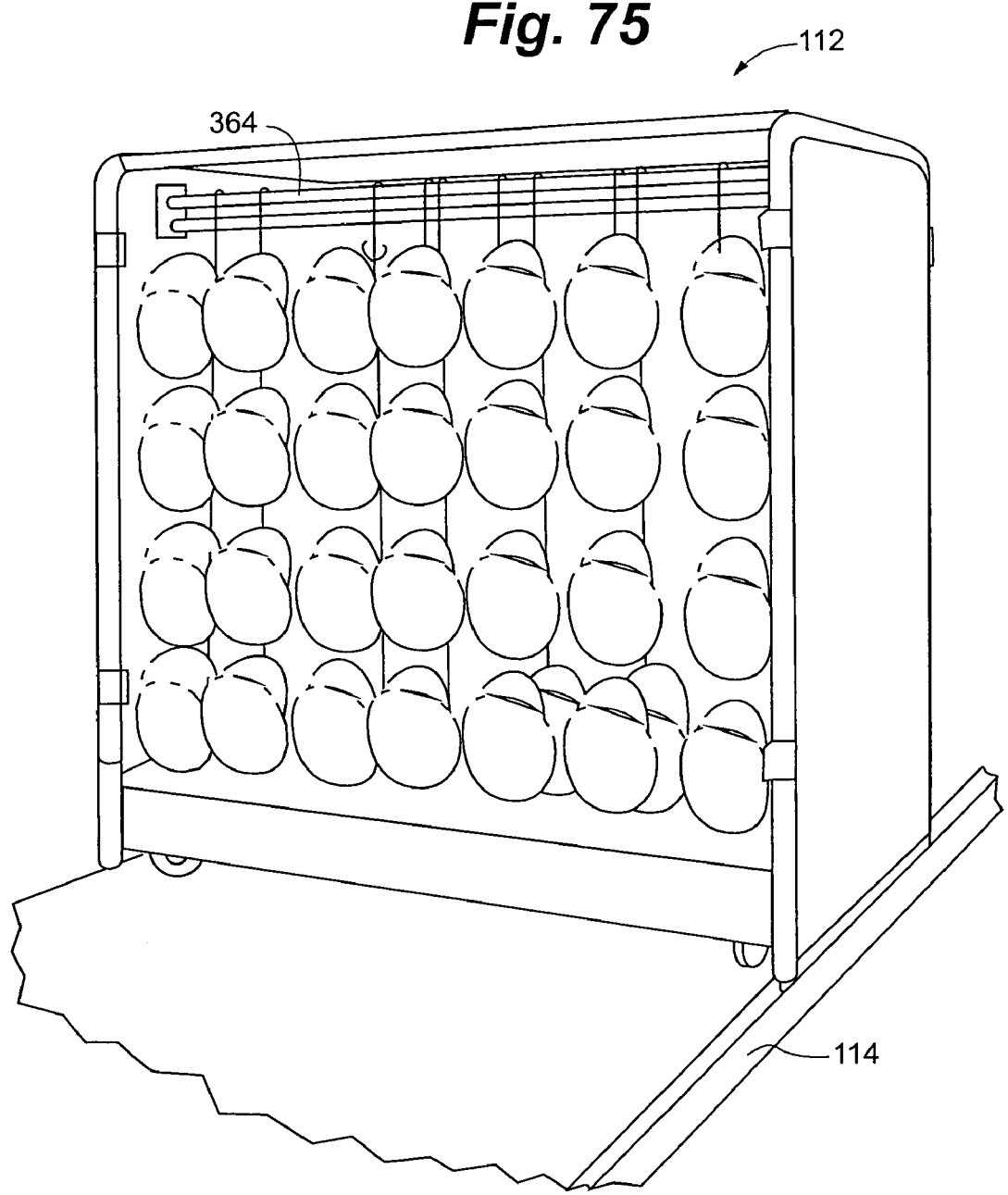

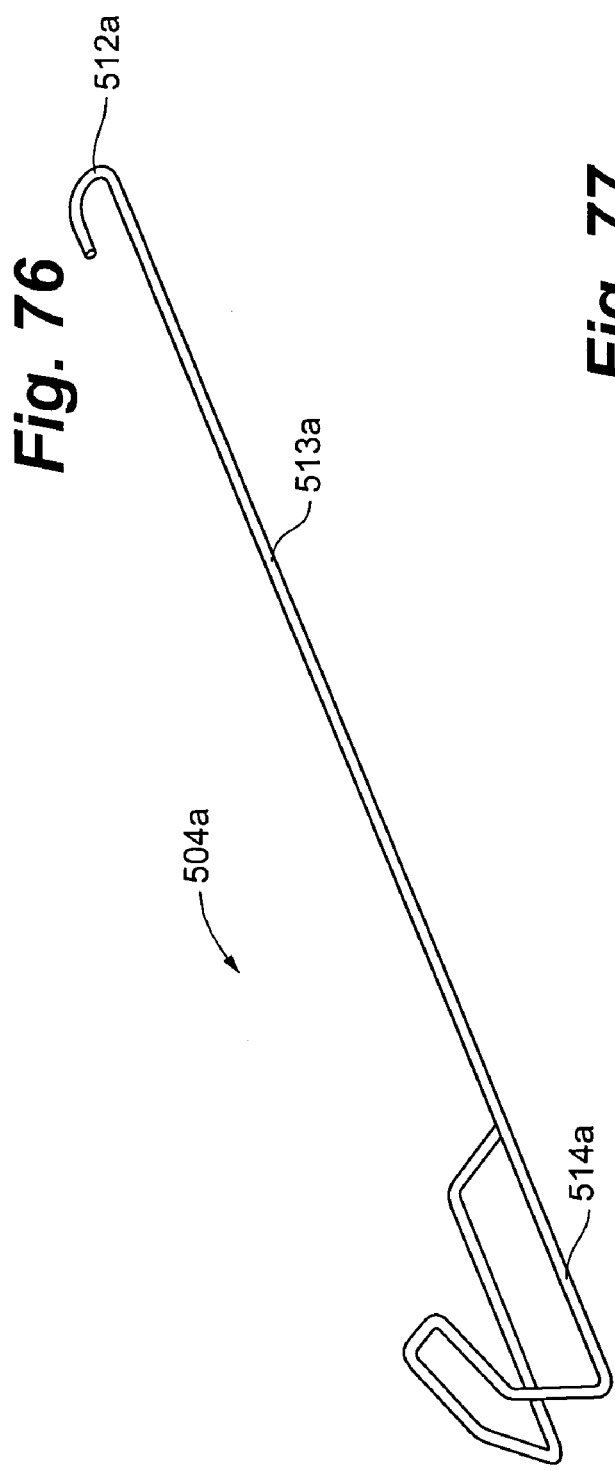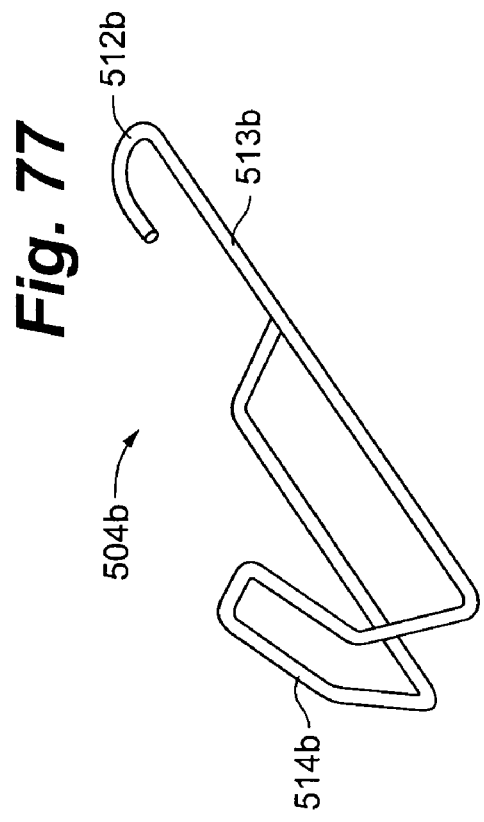

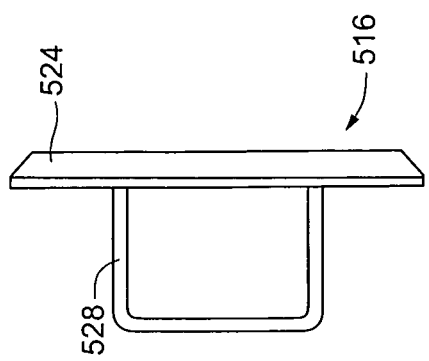
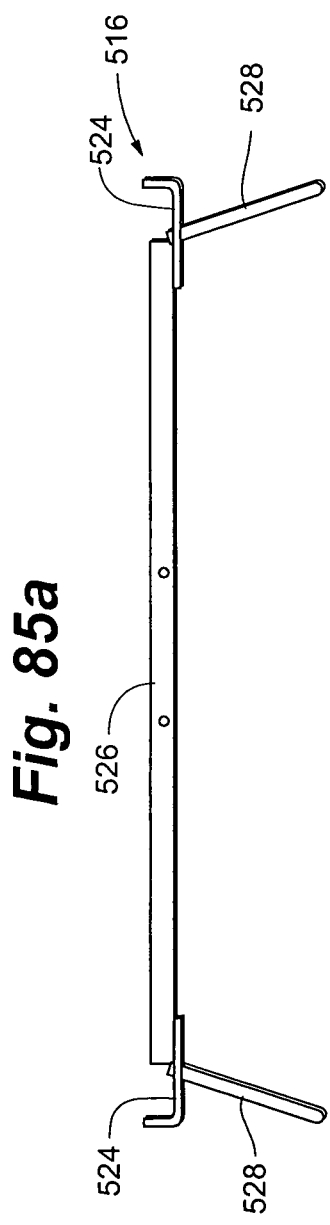
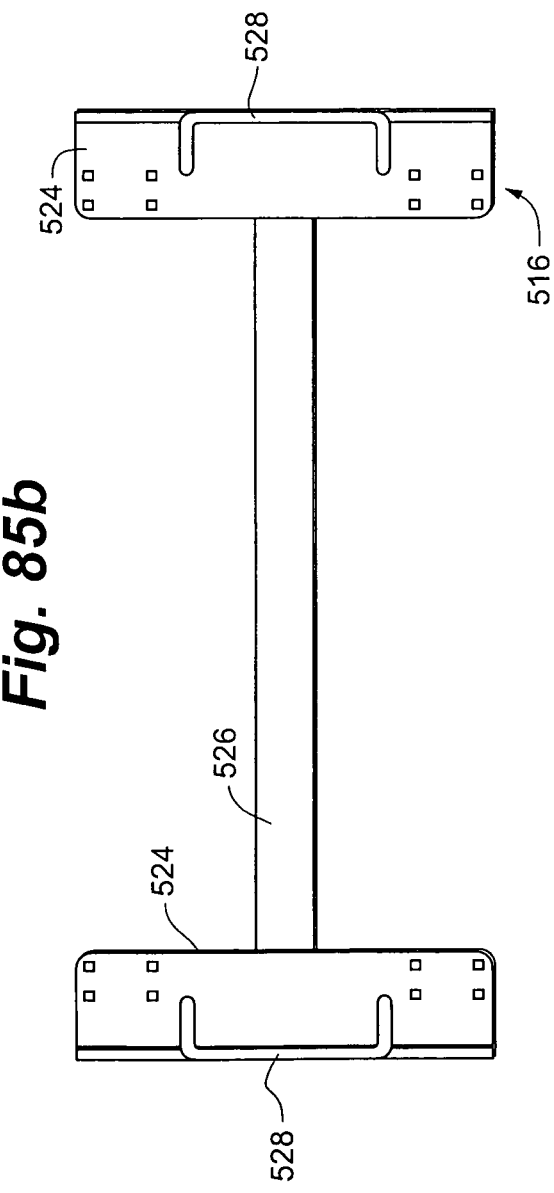

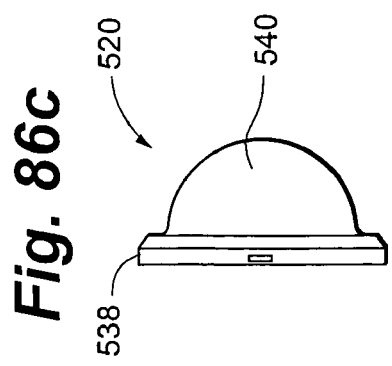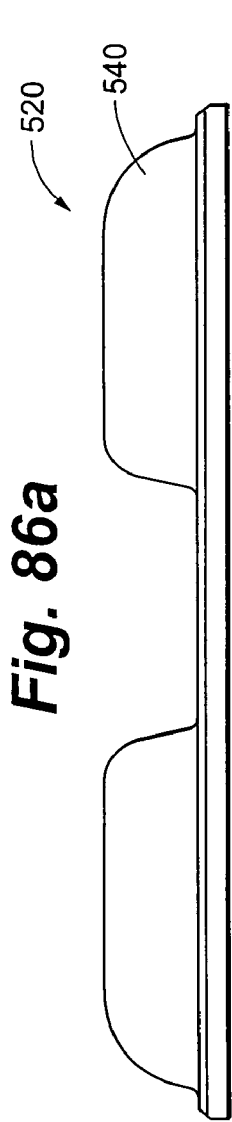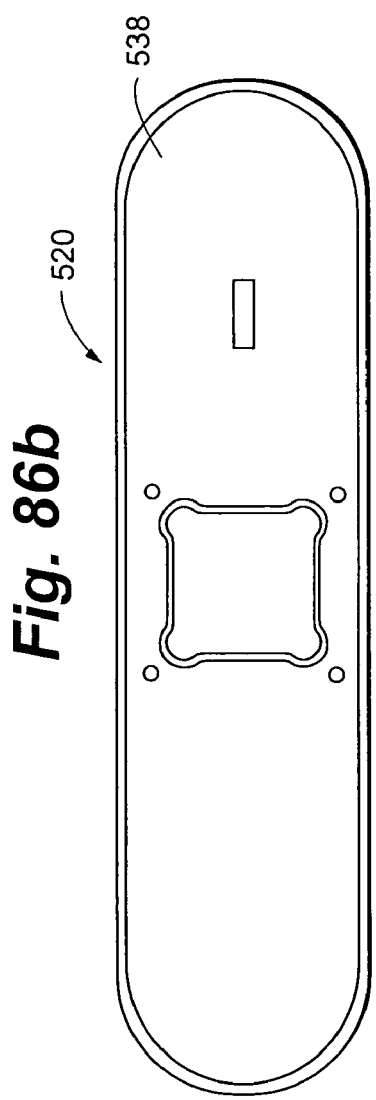

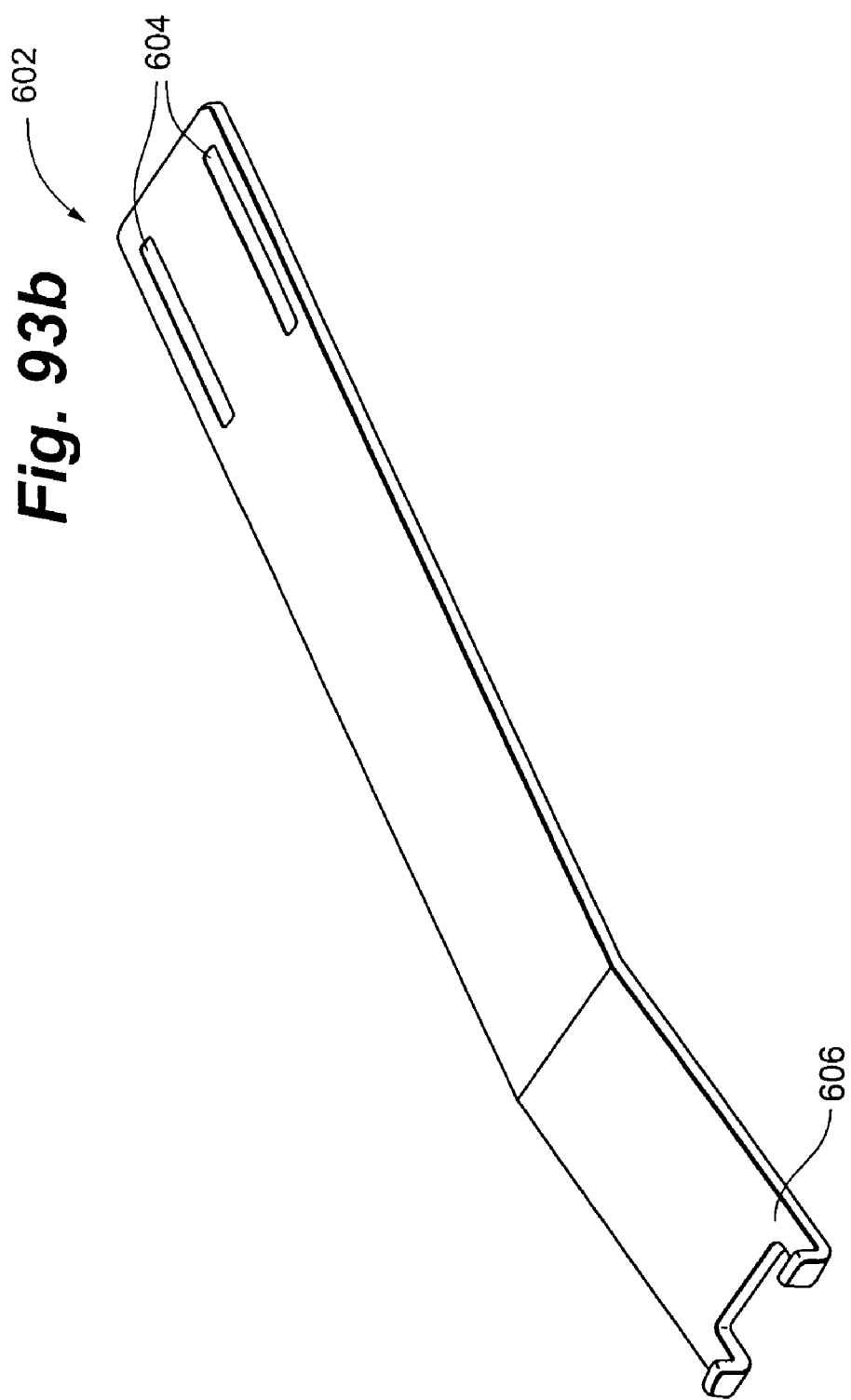

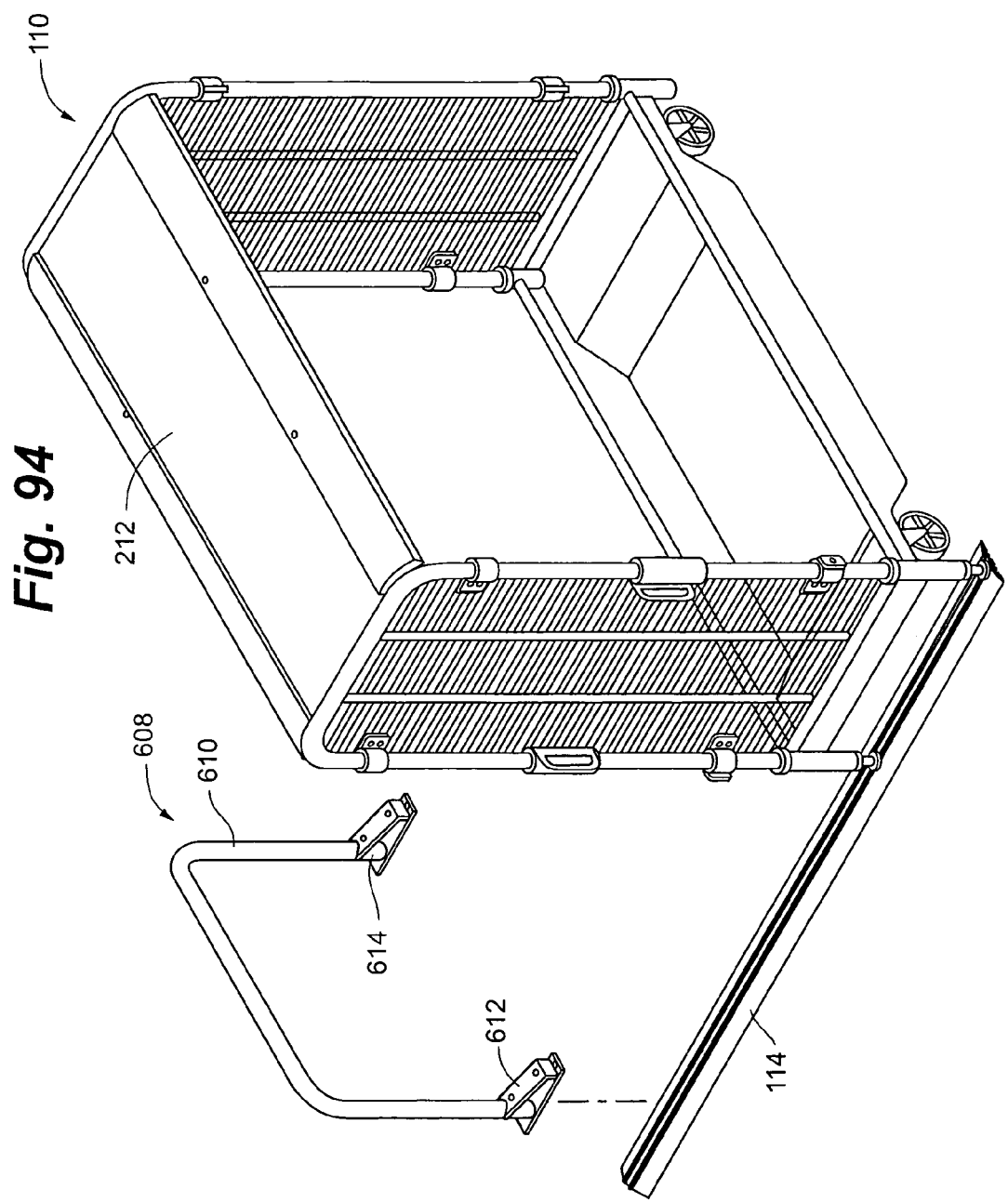

Fig. 107a
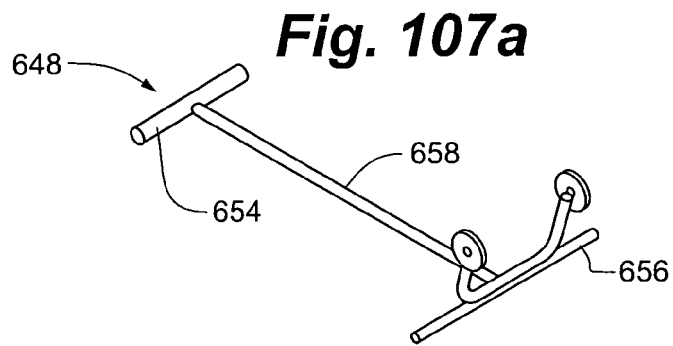
Fig. 107b
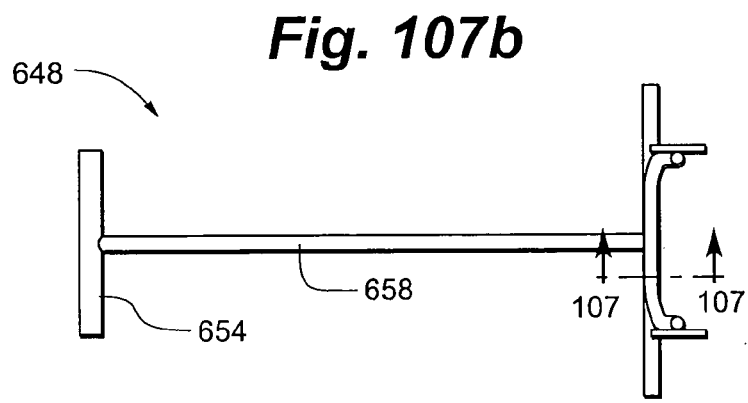
Fig. 107c    Fig. 107d
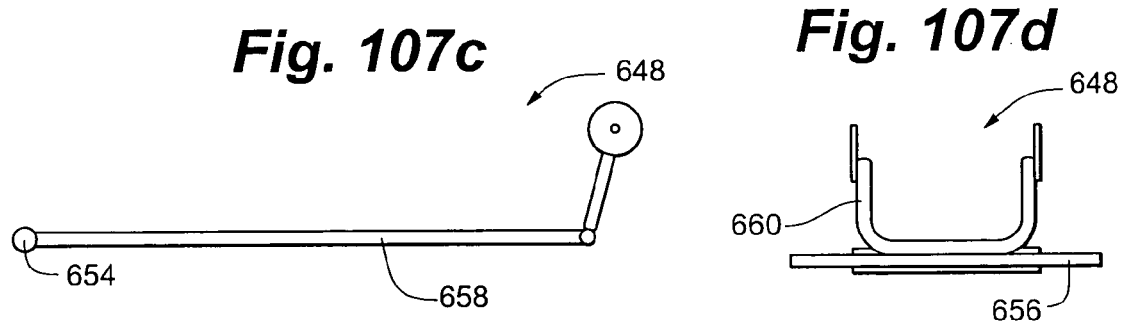
Fig. 107e
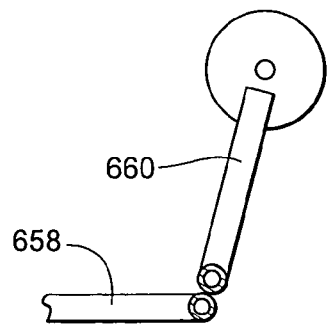

MODULAR STORAGE SYSTEM FOR LOGISTICAL MANAGEMENT OF OPERATIONAL UNITS

PRIORITY CLAIM

The present application claims priority to U.S. Provisional Application No. 60/523,044, entitled "LOGISTICAL MANAGEMENT OF FIELD EQUIPMENT FOR OPERATIONAL UNITS" filed Nov. 17, 2003, U.S. Provisional Application No. 60/543,047, entitled "LOGISTICAL MANAGEMENT OF FIELD EQUIPMENT FOR OPERATIONAL UNITS" filed Feb. 9, 2004, U.S. Provisional Application No. 60/599,227, entitled "LOGISTICAL MANAGEMENT OF FIELD EQUIPMENT FOR OPERATIONAL UNITS" filed Aug. 5, 2004, and U.S. Provisional Application No. 60/616,538, entitled "LOGISTICAL MANAGEMENT OF FIELD EQUIPMENT FOR OPERATIONAL UNITS" filed Oct. 6, 2004. The disclosures of the aforementioned provisional applications are hereby incorporated by reference to the extent not inconsistent with the present disclosure.

FIELD OF THE INVENTION

The present invention relates generally to movable storage cabinets. More particularly, the present invention relates to a modular storage system for the logistical management of operational units.

BACKGROUND OF THE INVENTION

Those involved in field operational units often possess or require a large amount of uniforms, supplies, and other equipment. Examples of such operational units are athletic teams, construction industries, medical and hospital organizations, military and paramilitary organizations, theatre companies, and marching and concert bands. There is currently a need within these groups for better equipment storage and handling solutions. Specifically, there is a need for a storage system that can be used to effectively store equipment at storage sites and cycle and transport the equipment between the storage sites and areas in which the equipment is used.

As an example, space is always at a premium in schools and athletic facilities. There is rarely enough room allocated for athletic equipment storage. The storage space that is made available for athletic equipment is often located in storage facilities that are inconvenient for coaches, equipment managers, and players. These storage facilities are often small, cramped rooms, closets or portions of rooms or similar sites or spaces. Storage facilities often overflow into areas that are not intended for storage purposes, such as locker rooms, gymnasiums, and coaches' offices. Equipment storage facilities are frequently messy with athletic equipment strewn about the floor. If there are storage shelves and bins, they usually do not have labels or allow the equipment managers to visually inspect or manage the gear. Equipping players at the beginning of the season is usually disorganized and characterized by piles of gear spread out over the storage facility or locker room for weeks.

Mobility is also an essential part of the storage of items for field operational units. While a permanent storage facility allows for certain efficiencies to be gained by having a central location of the stored items, in many instances some of these items need to be transported to another site quickly, inexpensively, and with minimal planning. For instance, in athletic endeavors, planning and managing the practice, game, and travel logistics of teams is a complicated task and usually not the primary focus of the athletic or activities director, coaches, players, and trainers. Athletic equipment is constantly being moved through a usage cycle between "off-season" storage and "in-season" use and management. During the season, equipment constantly needs to be moved to and from storage areas, practice fields, and game sites.

Safety is also a very important aspect of equipment management. Player safety and avoidance of program and personal liability can be accomplished by effectively managing gear through regular inspections and record keeping. Regular gear inventory and inspection is critical to identify and replace expired, damaged, and lost equipment. By taking care of their equipment and knowing what equipment is on hand and "game ready," schools can also extend equipment life and can assure purchases only as necessary. Safety also encompasses the sanitary aspects of storage. With adequate ventilation, well-designed storage can mitigate the growth and spread of mold and odor associated with locker rooms. Also, by effectively managing and organizing equipment, schools can prevent and control loss and theft.

Moreover, in the field of athletics, equipment storage systems must reflect the pride, excellence, and the winning attitude of the schools' athletic programs. Pride and excellence are rarely reflected in current equipment management areas or processes. Messy, disorganized equipment areas do not reflect discipline, pride, or excellence. Disorganized equipment distribution to players does not support the desired tone of the program. If the storage areas are poorly kept, they do not reflect well on a school's excellence to parents, alumni, fellow educators, and recruits. The makeshift storage areas are usually in a state of disarray and can be a source of embarrassment for the schools. As a result, the areas are often shut or closed during recruiting trips to prevent such embarrassment.

There are not any commercially available organizational storage systems meeting the current needs or addressing the current problems discussed above. As an illustration, high schools, colleges, and universities usually use storage systems ranging from makeshift and make-do systems to generic, mass-marketed products modified for use as athletic equipment storage systems. The makeshift or make-do solutions often comprise homemade wooden shelves or generic shelving available from local hardware stores. Carts are also often homemade and storage containers are usually corrugated boxes, gear bags, garbage bags, laundry hampers, or generic plastic bins. Any labeling is usually done with a marker and tape on the equipment, shelves, and boxes.

Some universities/colleges and professional sports organizations currently use expensive, high-density storage solutions such as those manufactured by Spacesaver Corporation. Such high-density storage solutions have movable shelving units carried on a rail system typically installed in a raised floor such that the shelving units can be slide together and apart to provide for more space efficient storage as shown, for example, in U.S. Pat. Nos. 6,688,708, 6,669,314, 6,644,213, 6,371,031, 6,231,138, 6,161,485, 4,557,534, 4,432,589, and 3,829,189. Because these systems are fixed on dual tracks, those using the system are not allowed to bring the storage system to an off-site area. Those wishing to access the storage must come to the storage facility and cannot bring the storage system with them. In addition, solid panels enclose the shelves and/or bins in the storage system, which inhibits any airflow within the arrangement. Moreover, the bin and shelving arrangement within the systems are also fixed so those using the systems do not have the flexibility of being able to arrange the shelves and/or bins in appropriate dimensions for different sized articles. Also, although the storage solutions manufactured by Spacesaver Corporation have been modified to accommodate athletic equipment, the solutions are generally designed for document storage and therefore cannot fulfill all of the aforementioned equipment storage needs of logistical management units.

Other similar movable storage systems have been developed for storage units that are fixed onto and movable along dual tracks. Some exemplary systems can be seen in U.S. Pat. Nos. 6,644,213, 6,371,031, 6,112,917, 6,027,190, 5,160,189, 4,597,615, 4,467,924, 4,307,922, 4,256,355, and 6,161,485. The storage units in these storage systems are movable along the dual tracks and the contents can be accessed when two adjacent units are separated by a space. However, the units in these storage systems cannot be removed from the dual tracks and taken out of the storage site. As a result, those desiring to transport equipment to an off-site area will not be able to do so using the units in the storage systems described in these patents.

There have also been systems developed in which the units are fixed relative to a wall but that can be pulled outwardly away from the wall to access the contents. U.S. Pat. No. 6,688,708 describes a space saving storage system in which the storage modules move along a bracket mounted on the wall. The storage modules are movable along the bracket and can be pulled outwardly from the wall to access the contents. However, as with the patents listed above, the units cannot be removed from the bracket and taken out of the storage facility. U.S. Pat. Nos. 6,231,138, 6,027,190, and 5,683,155 describe additional fixed storage systems. The storage units described in these patents can be pulled outwardly from the wall to access the contents, but cannot be removed from the tracks and taken out of the storage facility. As a result, those desiring to transport equipment to an off-site area will not be able to do so using the units in the storage systems described in these patents.

While the vast majority of storage systems are fixed within a given facility, there have been a few attempts to provide storage units that can be removed from the storage facility. U.S. Pat. No. 4,807,765 describes a space saving system in which the storage units are movable on casters along adjacent dual track arrangements within a storage facility to provide front-to-rear movement of adjacent carts that are stored in a side-by-side relation in their storage position. While these carts could be removed from the track and taken out of the storage facility, the carts are not designed to accommodate equipment that is used by field operational units. In addition, the carts or shelves can only be removed off the end of the tracks. U.S. Pat. No. 6,241,106 is directed to a space saving system in which the storage units are shelf main bodies that are provided with pivotable casters and are movable along a dual set of overhead rails within a storage facility. While these shelf main bodies can be removed from the overhead rails so as to function as conveyer wagons, as with the above-listed patents, neither the shelf main bodies nor the overhead rails are not designed to accommodate equipment that is used by field operational units.

A patent that is directed towards an athletic equipment carrier rack can be seen in U.S. Pat. No. 2,904,383. The patent describes an athletic equipment carrier rack to be used for the care and handling of various articles of athletic equipment. However, the cart described by this patent is an isolated unit and is not designed to be incorporated into a modular storage system.

What is needed is a better equipment storage and handling system for field operational units. Specifically, there is a need for a modular storage system that can be implemented into an existing or newly constructed facility and that can be used to effectively store and access equipment at storage sites and easily cycle and transport the equipment between the storage facility and areas in which the equipment is used by utilizing the storage units. There is also a need for a system having generally reconfigurable storage units that can accommodate the various uniforms and equipment of field operational units.

SUMMARY OF THE INVENTION

In an embodiment of the present invention, a modular storage system for installation on a floor includes a plurality of carts. Each cart includes a base that generally has a length that separates opposed ends of the base, a storage structure that is operably attached to and carried by the base, at least three pivotable wheel assemblies, the wheel assemblies being operably attached to and extending below the base to provide a rolling surface adapted to roll on the floor; and at least one track follower mechanism that is operably attached to one end of the base and having at least a portion of which is selectively vertically movable.

The modular storage system according to this embodiment further includes a track that is operably positioned on the floor and extends along a track axis that is generally transverse to the length of the base of the carts, such that a cart is operably retained by and movable only in a direction generally parallel to the track axis when the at least one track follower is selectively engaged with the track to permit the cart to be selectively positioned in a storage position that is generally side-by-side with an adjacent cart along the track axis and in an accessible position that is generally spaced apart with an adjacent cart along the track axis, and such that the cart is removable from the track and movable in a direction generally perpendicular to the track axis when the at least one track follower is selectively disengaged from the track.

In one embodiment of the present invention, the track of the modular storage is installed in relation to a floor of a storage facility that is selected from the set consisting of: the floor of a vehicle, the floor of a trailer, the floor of a storage system than includes a plurality of movable floors, an existing floor, or a newly formed floor surface. In another embodiment of the present invention, the pivotable wheels assemblies on the modular cart in the modular storage system are selected from the set consisting of: casters, axled pairs of wheels, or ball wheels.

In another embodiment of the present invention, a modular storage system comprises a plurality of carts. Each cart includes a chassis that generally has a length that separates opposed ends of the base, a storage structure that is operably attached to and carried by the base, at least three pivotable wheel assemblies that are operably attached to and extend below the base to provide a rolling surface adapted to roll on the floor, and at least one rail follower mechanism that is operably attached to one end of the base and having at least a portion of which is selectively vertically movable. The modular storage system according to this embodiment of the present invention further includes a rail that is operably positioned on the floor and extends along a rail axis that is generally transverse to the length of the base of the carts, such that the carts are operably retained by and movable only in a direction generally parallel to the rail axis when the rail followers are selectively engaged with the rail to permit the cart to be selectively positioned in a storage position that is generally side-by-side with an adjacent cart along the rail axis and in an accessible position that is generally spaced apart with an adjacent cart along the rail axis, and such that the cart comprising pivotable wheels is removable from the rail and movable in a direction generally perpendicular to the rail axis when the at least one rail follower is selectively engaged with the guide.

In another embodiment of the present invention, a method of using a modular storage system for the logistical management of operational units is taught. The method of using a modular storage system comprises providing a plurality of carts. In this embodiment, each cart includes a base that generally has a length that separates opposed ends of the base, a storage structure that is operably attached to and carries by the base, at least three pivotable wheel assemblies, each wheel assembly operably attached to and extending below the base to provide a rolling surface adapted to roll on the floor, and at least one track follower mechanism operably attached to one end of the base and having at least a portion of which is selectively vertically movable. In this embodiment, the modular storage system further includes a track that is operably positioned on the floor and extending along a track axis that is generally transverse to the length of the base of the carts. The method further includes selectively engaging the at least one track follower with the track so that the cart is operably retained by and movable only in a direction generally parallel to the track axis in a storage position and selectively disengaging the at least one track follower from the track such that the cart is removable from the track and movable in a direction generally perpendicular to the track axis.

In another embodiment of the present invention, a modular storage system for installation on a floor includes a track operably positioned on the floor and extending along a track axis, a plurality of movable modular storage units, each modular storage unit including, a base generally having a length that separates opposed ends of the base, the length of the base of the modular storage unit being generally transverse to the track axis, means for storing operably attached to and carried by the base, means for rolling operably attached to and extending below the base to provide a surface adapted to roll the modular storage unit with respect to the floor, and means for selectively engaging the plurality of modular storage units with the track that retains the modular storage unit as movable only in a direction generally parallel to the track axis when the means for selectively engaging is engaged with the track to permit the modular storage unit to be selectively positioned in a storage position that is generally side-by-side with an adjacent modular storage unit along the track axis and in an accessible position that is generally spaced apart with an adjacent modular storage unit along the track axis, and releases the modular storage unit from the track movable in at least a direction generally perpendicular to the track axis when the means for selectively engaging is selectively disengaged from the track.

In one embodiment of the present invention, the modular storage unit comprises a cart. In one embodiment of the present invention, the means for selectively engaging comprises a track follower mechanism. In one embodiment of the present invention, the means for rolling comprises a plurality of wheels selected from the set consisting of: casters, axled pairs of wheels, or ball wheels.

In another embodiment of the present invention, a method of assembling a modular storage system at a storage facility comprises operably positioning a track on a floor, such that the track extends along a track axis, the track axis defining a bound of the storage facility, assembling a plurality of carts, the carts each having a base generally having a length that separates opposed ends of the base that is generally transverse to the track axis and at least three wheel assemblies extending from the bottom of the base to roll over the floor, attaching a storage structure to the base, positioning the carts in the storage facility, such that a track follower mechanism operably attached to one end of the base of each cart is selectively engageable with the track, selectively engaging at least a portion of the track follower mechanism with the track to cause the cart to be retained by and movable only in a direction generally parallel to the track axis such that the cart is selectively positionable in a storage position that is generally side-by-side with an adjacent cart along the track axis and in an accessible position that is generally spaced apart with an adjacent cart along the track axis, and selectively disengaging at least a portion of the track follower mechanism with the track to cause such that the cart to be removable from the track and movable in at least a direction generally perpendicular to the track axis when the at least one track follower is selectively disengaged from the track.

In one embodiment of the present invention, the step of attaching the storage structure comprises operably attaching end panels disposed on the opposed ends of the base and operably attaching a top panel disposed between and generally on top of the end panels that defines a top surface of the storage space.

In one embodiment of the present invention, the end panels are formed of C channel tubing and the step of operably attaching comprises positioning a wire-grille panel onto the end panel, capturing at least a portion of the end frame and at least a portion of the wire-grille panel with a bracket, and utilizing a fastener to secure the bracket on the end panel and to secure the wire-grille panel in a position on the end panel.

In one embodiment of the present invention, the brackets are formed of two pivotably connected bracket portions and the step of operably attaching comprises positioning a wire-grille panel onto the end panel, pivoting the two bracket portions to capture at least a portion of the end frame and at least a portion of the wire-grille panel with a bracket, and utilizing a fastener to secure the bracket on the end panel and to secure the wire-grille panel in a position on the end panel.

In one embodiment of the present invention, the step of attaching further comprises attaching a secondary storage structure carried by and above the top panel.

In one embodiment of the present invention, the step of positioning the carts includes the step of positioning at least a first cart wherein the wheel assemblies are pivotable and at least a second cart wherein the wheel assemblies are not pivotable.

BRIEF DESCRIPTION OF THE DRAWINGS

FIG. 8 is a top front perspective view of the base of a cart according to an embodiment of the present invention;

FIG. 9 is a top front perspective view of the frame post of the base according to an embodiment of the present invention;

FIG. 10 is a top front perspective view of a bumper according to an embodiment of the present invention;

FIG. 11 is a top front perspective view of a cart according to an embodiment of the present invention;

FIG. 12 is a top front perspective view of the frame post of the base according to an embodiment of the present invention;

FIG. 13 is a top front perspective view of the frame and wire-grille panel according to an embodiment of the present invention;

FIG. 14 is a top front perspective view of a bracket according to an embodiment of the present invention;

FIG. 15 is a top front perspective view of a bracket according to an embodiment of the present invention;

FIG. 24 is a top front perspective view of a handle bracket according to an embodiment of the present invention;

FIG. 25 is a top front perspective view of a handle bracket and handle according to an embodiment of the present invention;

FIG. 26 is a perspective view of an inside handle bracket according to an embodiment of the present invention;

FIG. 27 is a cross-sectional view of an inside handle bracket according to an embodiment of the present invention;

FIG. 33 is a top elevation view of a top panel extrusion of a cart according to an embodiment of the present invention;

FIG. 34 is a cross-sectional view of a top panel extrusion of a cart according to an embodiment of the present invention;

FIG. 35 is a perspective view of a top panel extrusion of a cart according to an embodiment of the present invention;

FIG. 36 is a top front perspective view of the frame, wire-grille panel, and solid panel according to an embodiment of the present invention;

FIG. 60a is a front elevation view of a bypass door of a cart according to an embodiment of the present invention;

FIG. 60b is a side elevation view of a bypass door of a cart according to an embodiment of the present invention;

FIG. 60c is a front elevation view of a bypass door of a cart according to an embodiment of the present invention;

FIG. 61 is an exploded view of a bypass door latch of a cart according to an embodiment of the present invention;

FIG. 75 is a perspective view of a cart having fully populated helmet hangers according to an embodiment of the present invention;

FIG. 76 is a perspective view of a long pad hanger of a cart according to an embodiment of the present invention;

FIG. 77 is a perspective view of a short pad hanger of a cart according to an embodiment of the present invention;

FIG. 85a is a side elevation view of a base of a pad stacker of a cart according to an embodiment of the present invention;

FIG. 85b is a top elevation view of a base of a pad stacker of a cart according to an embodiment of the present invention;

FIG. 85c is a side elevation view of a base of a pad stacker of a cart according to an embodiment of the present invention;

FIG. 86a is a side elevation view of a pad support of a pad stacker of a cart according to an embodiment of the present invention;

FIG. 86b is a side elevation view of a pad support of a pad stacker of a cart according to an embodiment of the present invention;

FIG. 86c is a top elevation view of a pad support of a pad stacker of a cart according to an embodiment of the present invention;

FIG. 93b is a perspective view of the plunger lock bracket according to an embodiment of the present invention;

FIG. 94 is a perspective view of a cart, track, and island stop according to an embodiment of the present invention;

FIG. 98b is a side elevation view of an attic frame of a cart according to an embodiment of the present invention;

FIG. 98c is a side elevation view of an attic frame of a cart according to an embodiment of the present invention;

FIG. 99 is a cross-sectional view of a cart having a video system according to an embodiment of the present invention;

FIG. 100 is a cross-sectional view of a cart having a video system according to an embodiment of the present invention;

FIG. 101 is a side elevation view of a cart having a video system according to an embodiment of the present invention;

FIG. 102 is a perspective view of a cart according to an embodiment of the present invention;

FIG. 103 is a perspective view of a cart according to an embodiment of the present invention;

FIG. 104 is a perspective view of a cart according to an embodiment of the present invention;

FIG. 105 is a perspective view of a cart according to an embodiment of the present invention;

FIG. 106 is a perspective view of a cart according to an embodiment of the present invention;

FIG. 107a is a perspective view of a pull handle according to an embodiment of the present invention;

FIG. 107b is a top view of a pull handle according to an embodiment of the present invention;

Figure 108:
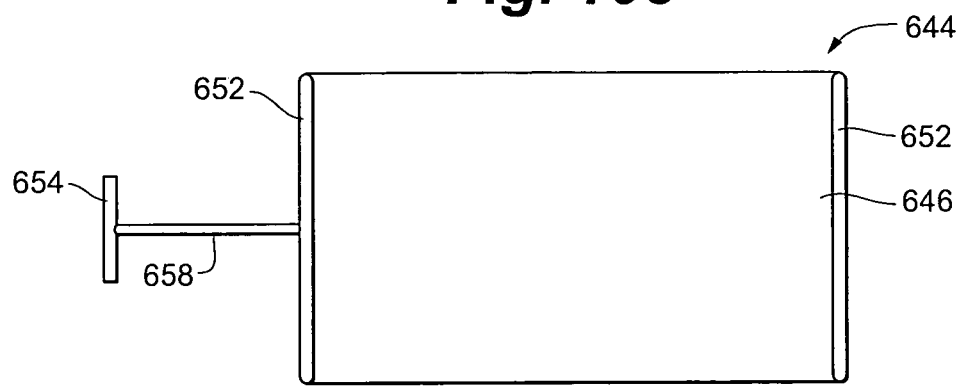
Figure 109:
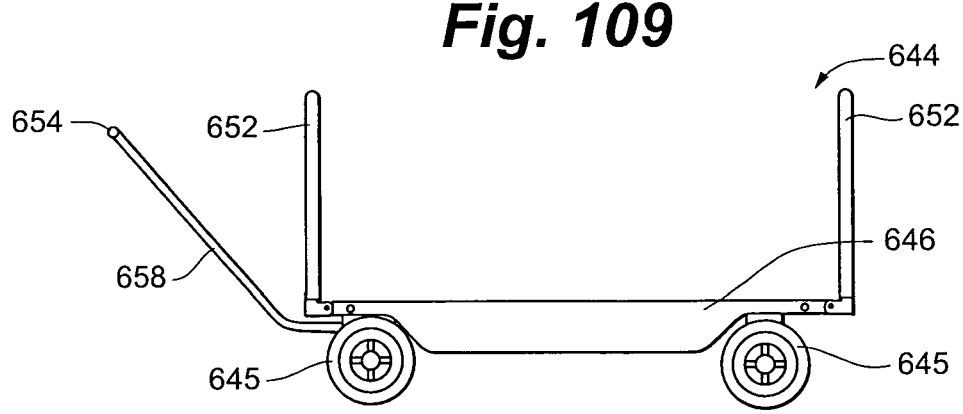
Figure 110:
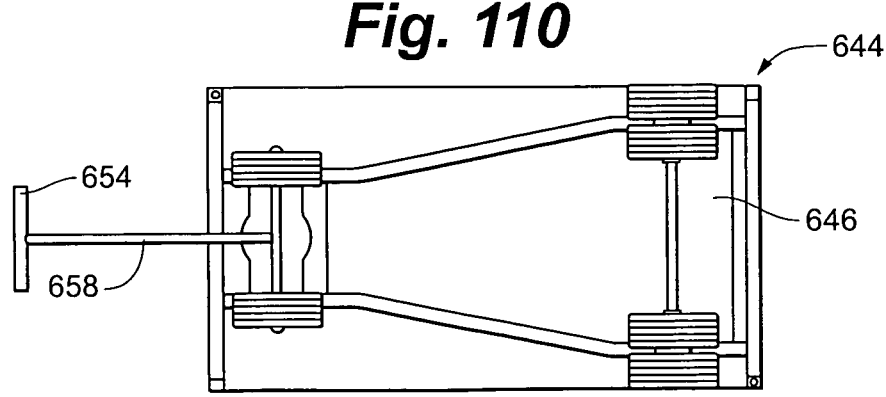

FIG. 107c is a side view of a pull handle according to an embodiment of the present invention;

FIG. 107d is a front view of a pull handle according to an embodiment of the present invention;

FIG. 107e is a sectional side view of a pull handle according to an embodiment of the present invention;

FIG. 108 is a top view of a cart according to an embodiment of the present invention;

FIG. 109 is a side view of a cart according to an embodiment of the present invention; and FIG. 110 is a bottom view of a cart according to an embodiment of the present invention.

DETAILED DESCRIPTION OF THE PREFERRED EMBODIMENTS

Figure 1:
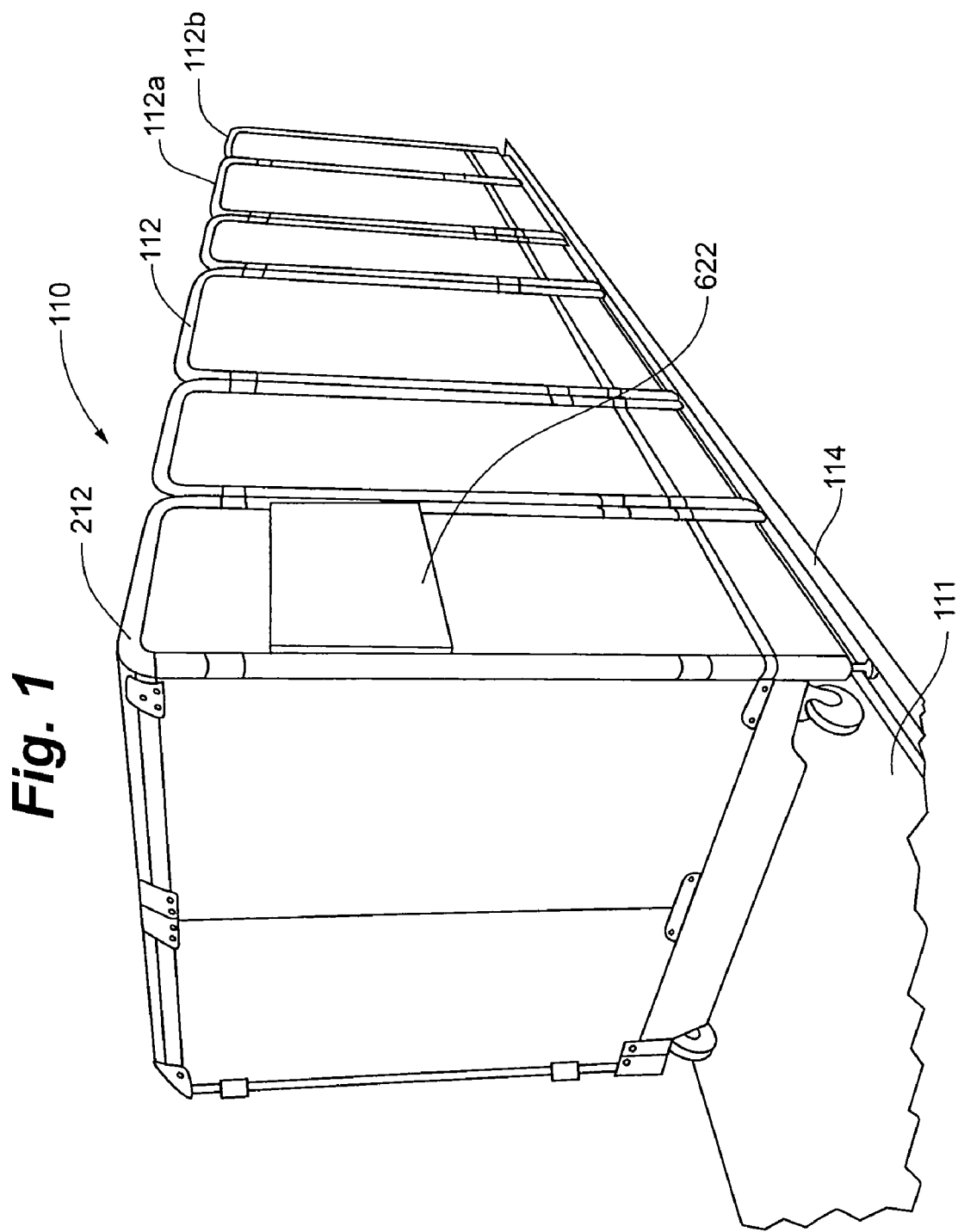
FIG. 1 is a front perspective view of a modular storage system according to an embodiment of the present invention.
Figure 2:
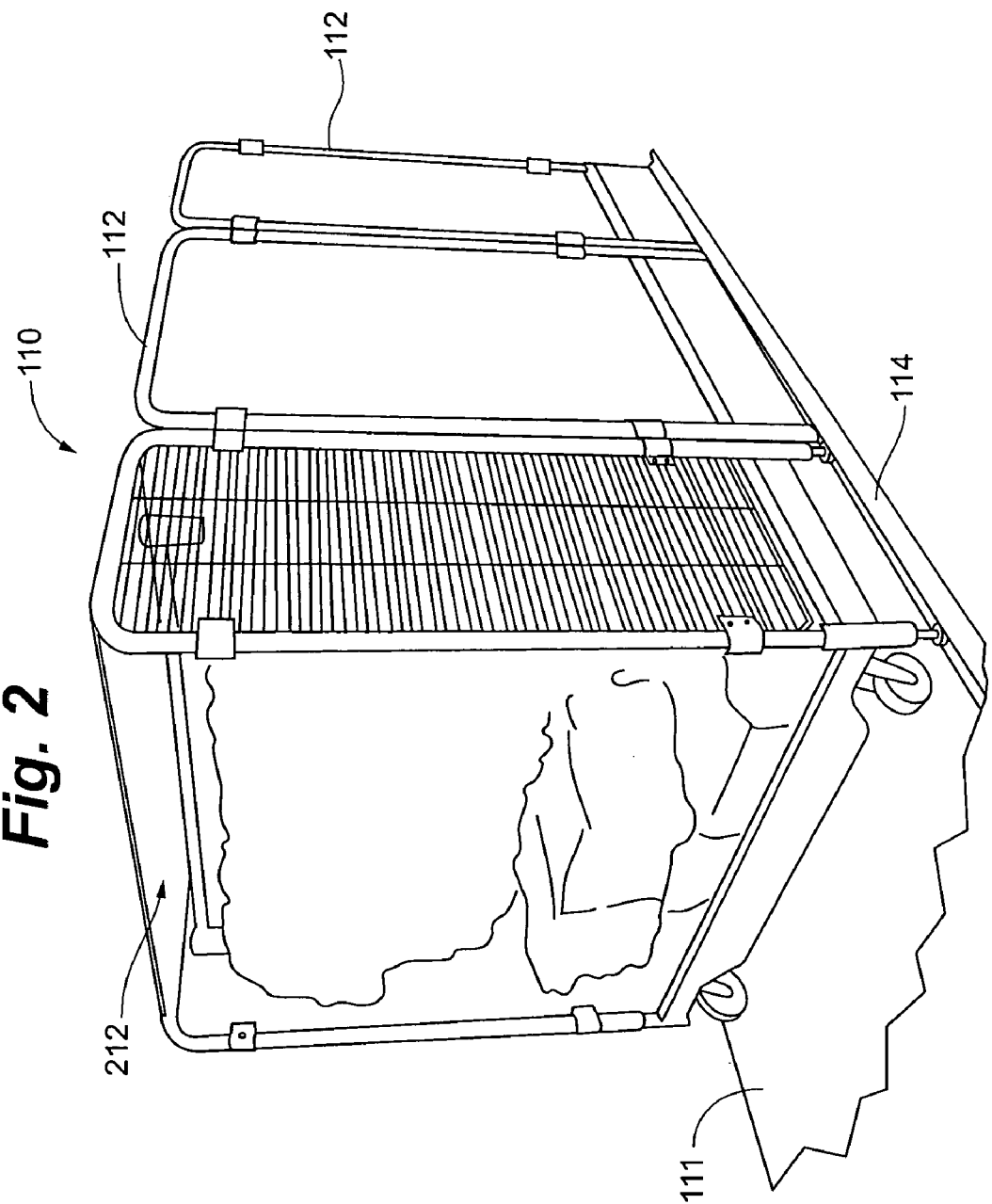
FIG. 2 is a front perspective view of a modular storage system according to an embodiment of the present invention.
Figure 3:
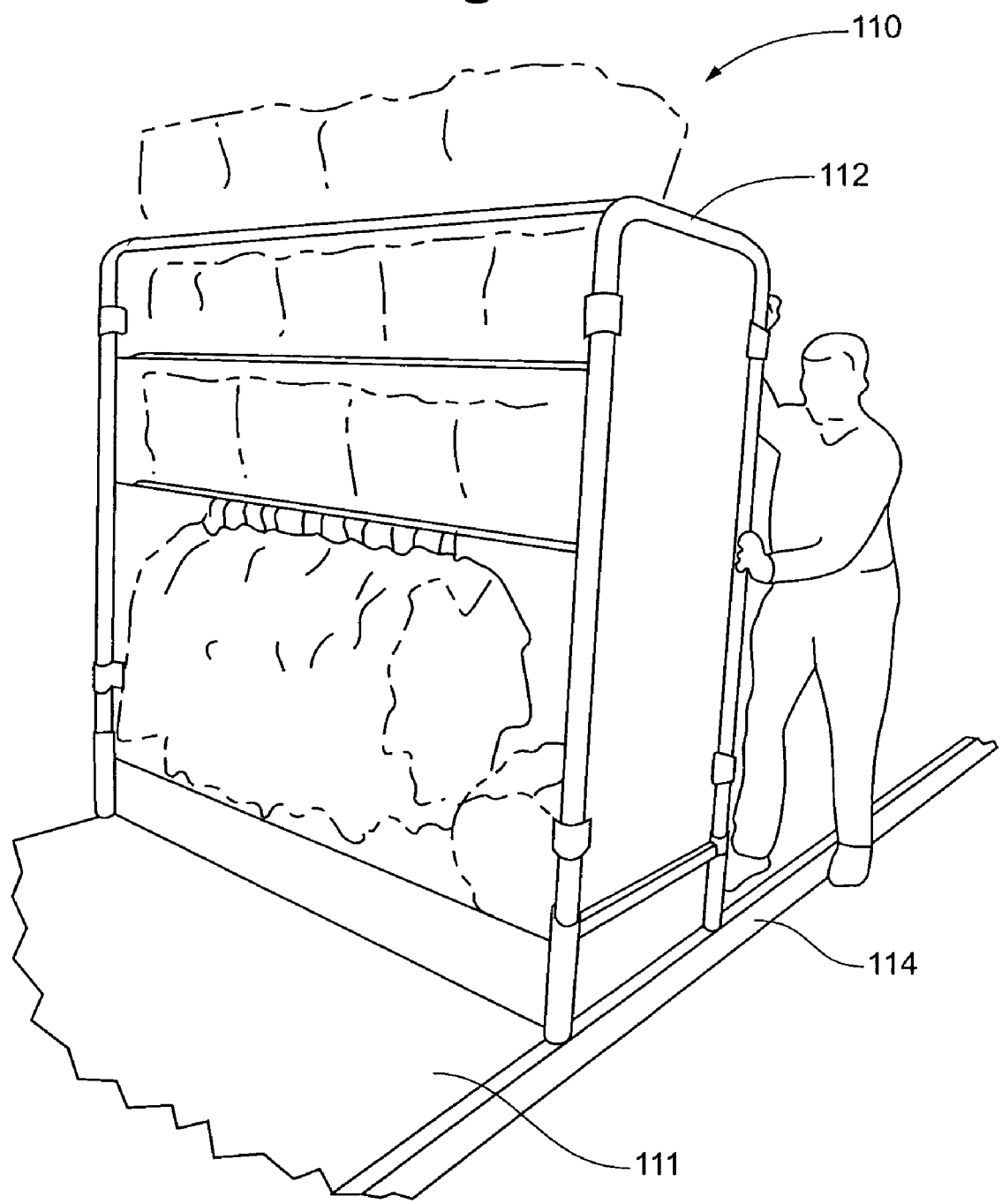
FIG. 3 is a front perspective view of a modular storage system according to an embodiment of the present invention depicting a cart being manually moved along a track.

As depicted in FIGS. 1-3, a modular storage system 110 according to an embodiment of the present invention generally comprises a track 114 and a plurality of carts 112, 212. In a preferred embodiment, the carts 112 are arranged in a storage facility along a single track 114. The storage facility can be a retrofitted area of an already existing facility or the storage facility can be designed and implemented into a newly constructed facility. In an already existing facility, the track 114 is preferably positioned onto and connected to a pre-selected portion of a floor. In a newly constructed facility, the track 114 is preferably integrated directly into or onto a newly formed floor.

Figure 55:
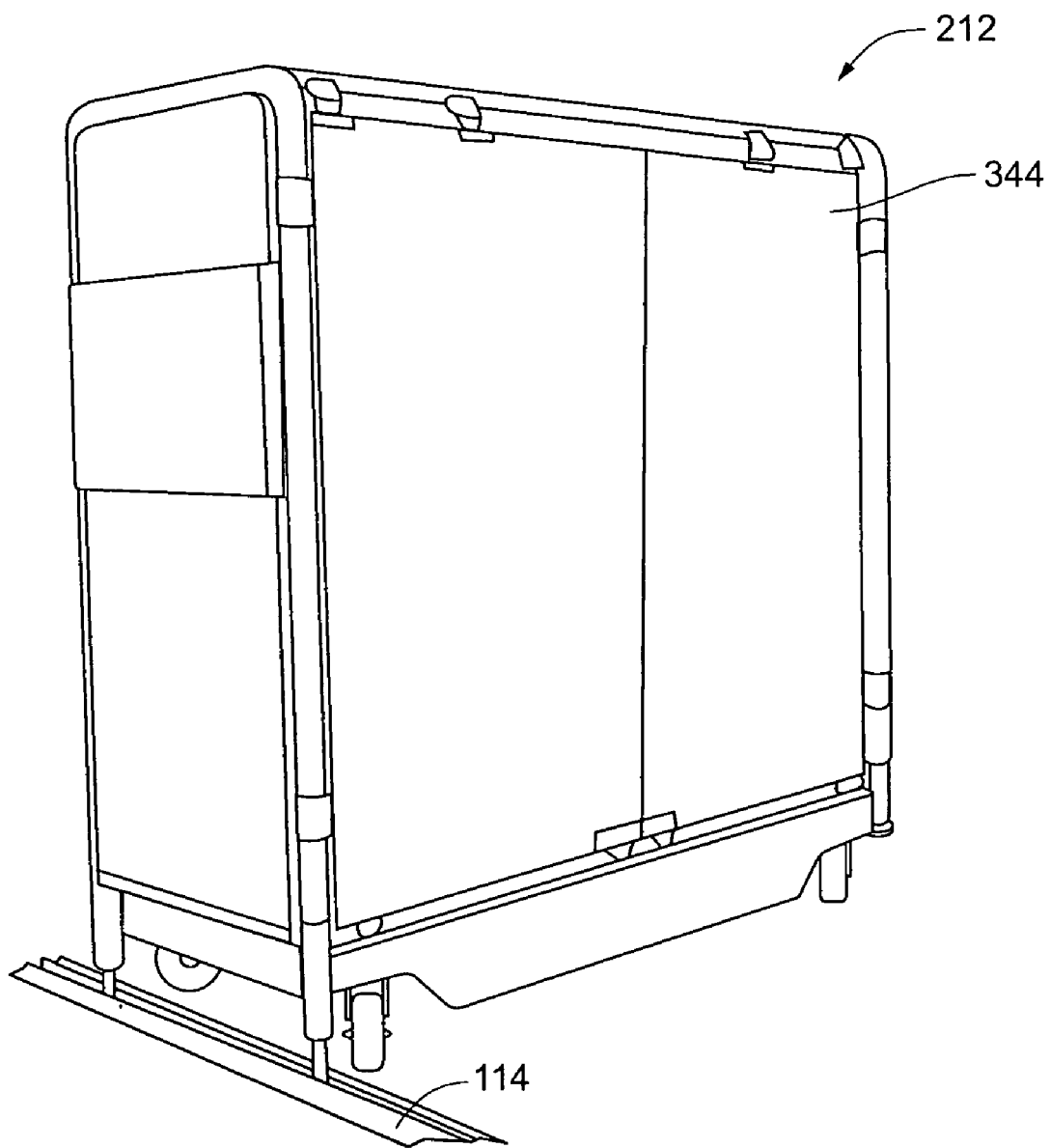
FIG. 55 is a top front perspective view of a cart according to an embodiment of the present invention.

The modular storage system as depicted in FIG. 1 includes a mixture of retained carts 112 (as shown in FIG. 3) and modular carts 212 (as shown in FIG. 55). As can be seen in FIG. 3, the retained carts 112 populated with uniforms and equipment are preferably movable by manual force in a direction that is generally parallel to and along the track 114. The modular carts 212 as depicted in FIG. 55 are also preferably movable along the track 114. In addition to being movable along the track 114, the modular carts 212 can also be removed from the storage site 11 and taken to an off-site location.

It will be understood that the mixture of retained carts 112 and modular carts 212 can be of any number and mix, depending upon the length of the track 114 installed at the storage facility and the width of each cart 112, 212. It will also be appreciated that any number of tracks 114 could be installed in a variety of floor plan configurations at a given storage facility given the dimensions of the floor plan of the storage facility. As shown in FIG. 1, some of the retained carts 112 are full width (112a) and others are half width (112b). Preferably, all of the carts 112, 212 have a similar length, although this is not required. For purposes of describing the preferred embodiments of the present invention, the carts 112, 212 will be referred to as having a width in a direction generally parallel to the track 114 and a length in a direction generally perpendicular to the track 114. Similarly, the carts 112, 212 will have sides oriented along the length of the carts and end oriented along the width of the carts.

The carts 112, 212 generally comprise a reconfigurable storage structure that includes a number of different means for storing uniforms, equipment, and other items used by field operational units. The modular storage system 110 as depicted in the figures is designed to accommodate high school athletic equipment. As such, the following description of different means for storing uniforms, equipment, and other items is generally directed to athletic equipment storage. However, those of ordinary skill in the art will appreciate that the storage structures and means could be easily used to accommodate a number of different operational units, including, but not limited to, construction industries, medical and hospital organizations, military and paramilitary organizations, theatre companies, and marching and concert bands.

In addition, the arrangement of the track 114 and carts 112. 212 allow users to come to the storage facility, quickly find their equipment in a particular cart, move the carts along the track to access the appropriate cart, remove their equipment from the cart, and move on to an off-storage-site location with the necessary equipment. Because the uniforms and equipment are organized and arranged within the carts, those persons who monitor and track the equipment to be stored in the modular storage system 110 are able to determine what equipment remains within the storage facility and what equipment is being used at an offsite location. When users return to the storage facility to return their uniforms or equipment, they can give the uniforms and equipment to the persons responsible for monitoring and tracking the equipment, who can then return the equipment to the proper cart within the storage facility. Alternatively, users can return their own equipment to the proper cart within the storage facility.

Because the modular carts 212 can be taken out of the confines of the storage facility and transported to an off-site location, the modular storage system 110 of the present invention permits operational units that require large amounts of uniforms and various pieces of equipment to transport the uniforms and equipment in an organized manner. By doing so, the units are much less likely to forget or lose track of the uniforms and equipment. For example, military units often travel with large amounts of gear including uniforms, weapons, first aid kits, tents, cots, ammunition, and other equipment. When the military unit must travel, the logistics of transporting the members and equipment can create pose significant logistical problems. However, by using a modular storage system 110 according to the various embodiments of the present invention, the military unit can travel in an organized manner. Each uniform and piece of equipment can have a position within the carts 112, 212 when leaving a storage facility and when arriving at a destination. Because the equipment does not need to be removed from the cart during transportation, much time and effort can be saved by not having to load and unload any containers.

Also, when inventory is taken prior to leaving a storage facility, inventorying is not required when arriving at a destination as there is no need to remove anything from the cart. These same benefits occur with other operational units such as athletic teams, construction industries, medical and hospital organizations, theatre companies, marching and concert bands, police and fire departments, and medical rescue teams.

Description of the Retained Carts

Referring to FIGS. 3-12, embodiments of the retained cart will be described. It will be noted that reference numerals in the 100's are generally used to denote the base features and components of the retained carts 112. The retained carts 112 are preferably retained within the storage facility during normal use and not designed to be removable from the storage facility. In order to be removed from the storage facility, the retained carts 112 generally would need to be lifted out of the track 114 by selectively releasing them from the confines of the track 114 and then carried out of the storage facility (i.e., to a location other than the location of the track 114). Alternatively, the track 114 may be removed in order to permit the retained carts 114 to be removed from the storage facility.

Figure 4:
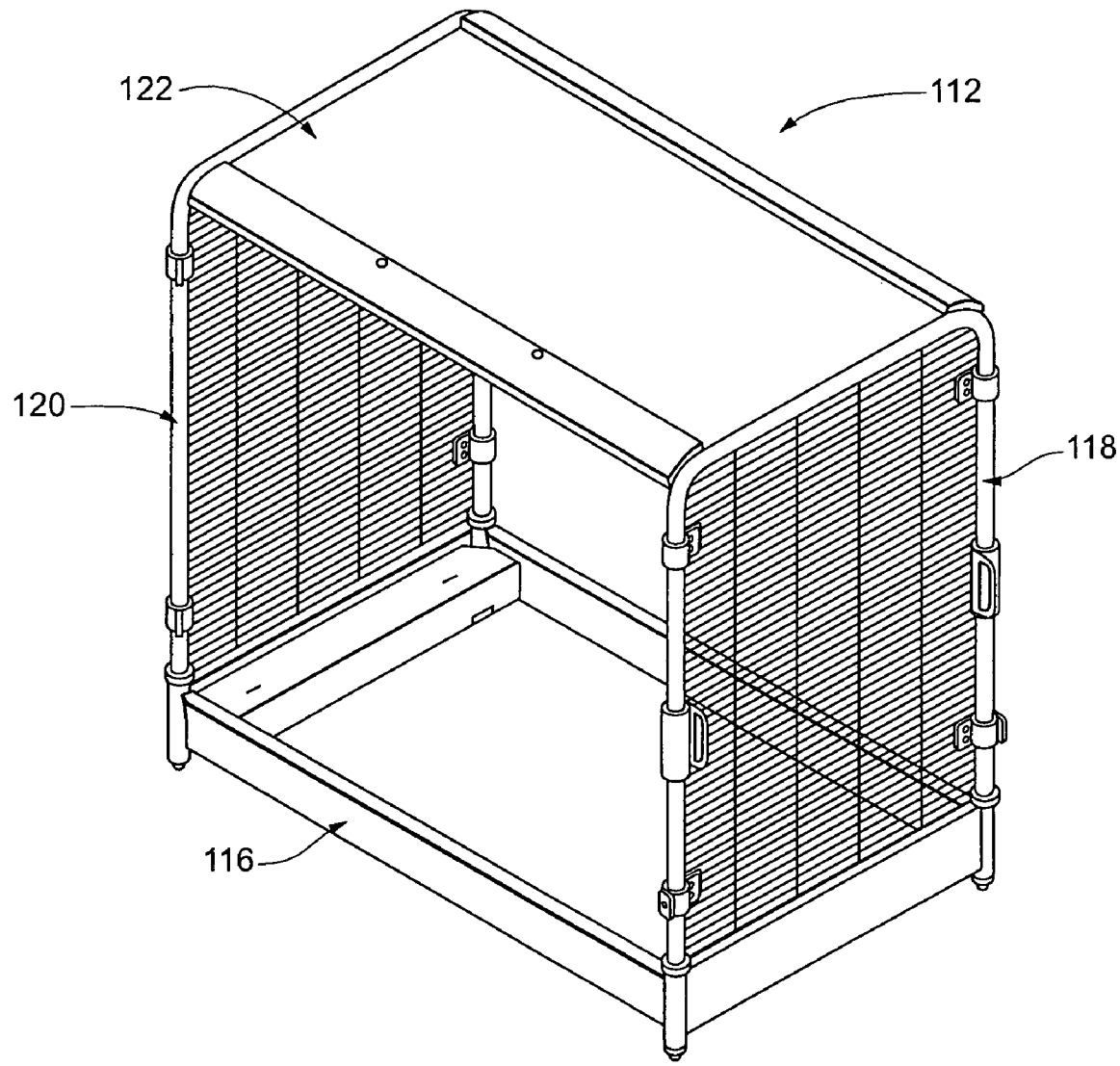
FIG. 4 is a top front perspective view of a cart according to an embodiment of the present invention.

As depicted in FIG. 4, a retained cart 112 according to an embodiment of the present invention preferably comprises a cart base 116, a cart top 122, a front end 118, and a rear end 120 opposed the front end 18. The cart base 116, cart top 122, front end 118, and rear end 120 generally define a reconfigurable storage structure. The front end 118, rear end 120, and cart top 122 preferably have substantially similar structure on both the retained cart 112 and modular cart 212. As such, the discussion of the front end 118, rear end 120, and cart top 122 with respect to the retained cart 112 is therefore relevant and incorporated by reference to the later discussion with respect to the modular cart 212. For purposes of this description, front is used to reference the end of the cart base that, when in position on the track 114, is closest to the track 114. Rear is used to reference the end of the cart base 116 that is furthest from the track 114.

The cart base 116 of the retained cart 112 according to an embodiment of the present invention, as depicted in FIGS. 5-8, preferably comprises a bottom 124, a pair of opposed base sides 130a, 130b connected to the bottom 124, a front plate 126, and an opposed rear plate 128. The front plate 126 and rear plate 128 are operably connected to a bottom front 132 and a bottom rear 134, respectively, wherein the bottom front 132 and bottom rear 134 are preferably substantially perpendicular to the opposed sides 130a, 130b. As can be seen in FIG. 2, the bottom 124, front plate 126, rear plate 128, and base sides 130a, 130b generally define a storage basement 117 that can be used to store various equipment or articles below a horizontal level of a top surface of base sides 130a, 130b. The bottom 124, front plate 126, rear plate 128, and base sides 130a, 130b are preferably constructed of sheet steel, although other materials such as aluminum, alloys, graphite or composites materials or various plastics could be used without departing from the spirit and scope of the invention.

The cart base 116 further preferably comprises a plurality of preferably cylindrical frame posts 168a, 168b, 168c, 168d disposed on the base sides 130a, 130b where the base sides 130a, 130b intersect the front plate 126 and rear plate 128. The frame posts 168a, 168b, 168c, 168d preferably include a post slot 171 such that the base sides 130a, 130b and frame posts 168a, 168b, 168c, 168d can be connected by sliding the post slots 171 onto the base sides 130a, 130b. Although the frame posts 168a, 168b, 168c, 168d are depicted as being cylindrical in shape, it is contemplated that they may be square, rectangular, or any other geometric shape. The frame posts 168a, 168b, 168c, 168d are preferably constructed of tubular steel, although other materials such as aluminum, alloys or graphite or composite materials could be used without departing from the spirit and scope of the invention.

Figure 5:
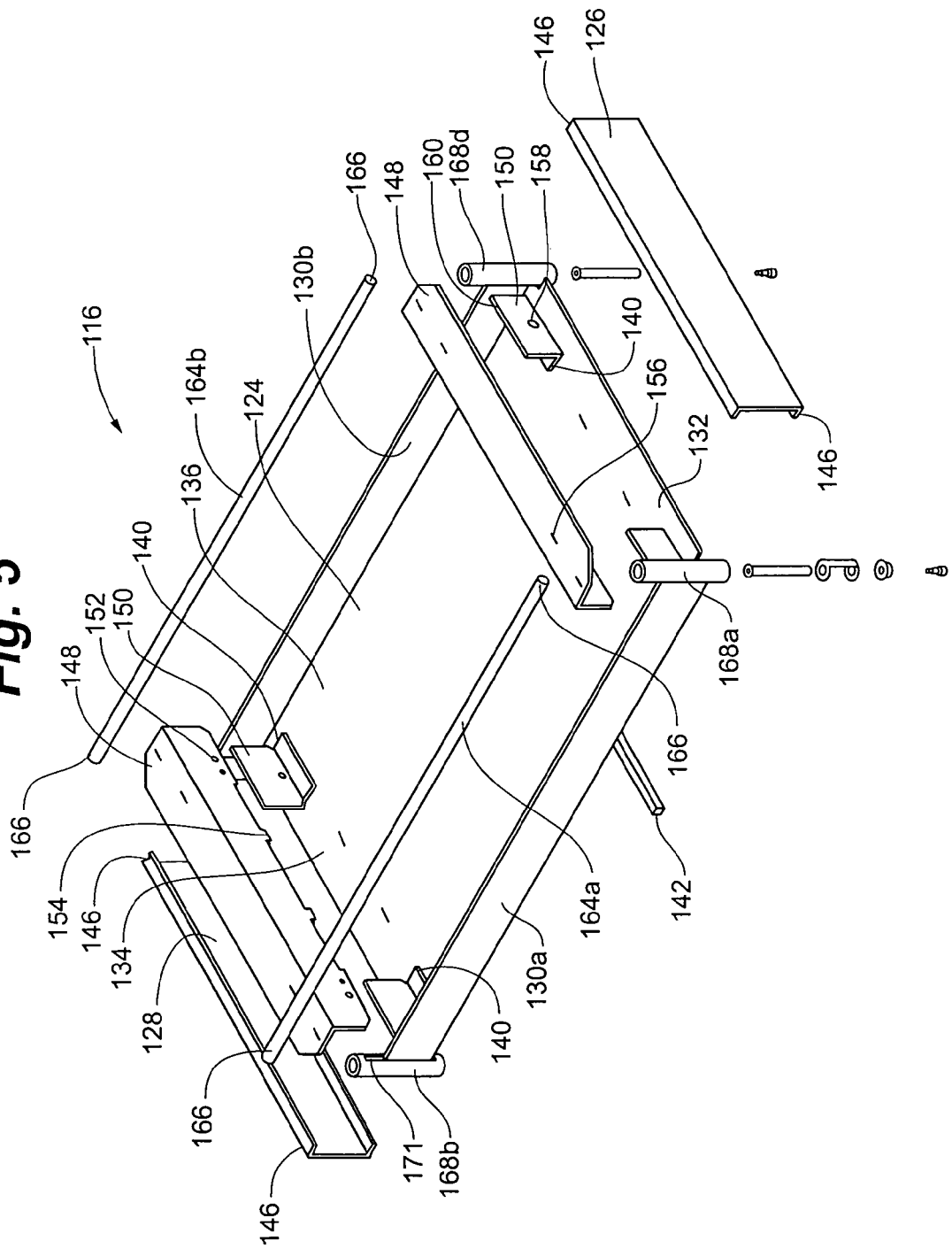
FIG. 5 is an exploded view of a base of a cart according to an embodiment of the present invention.
Figure 6:
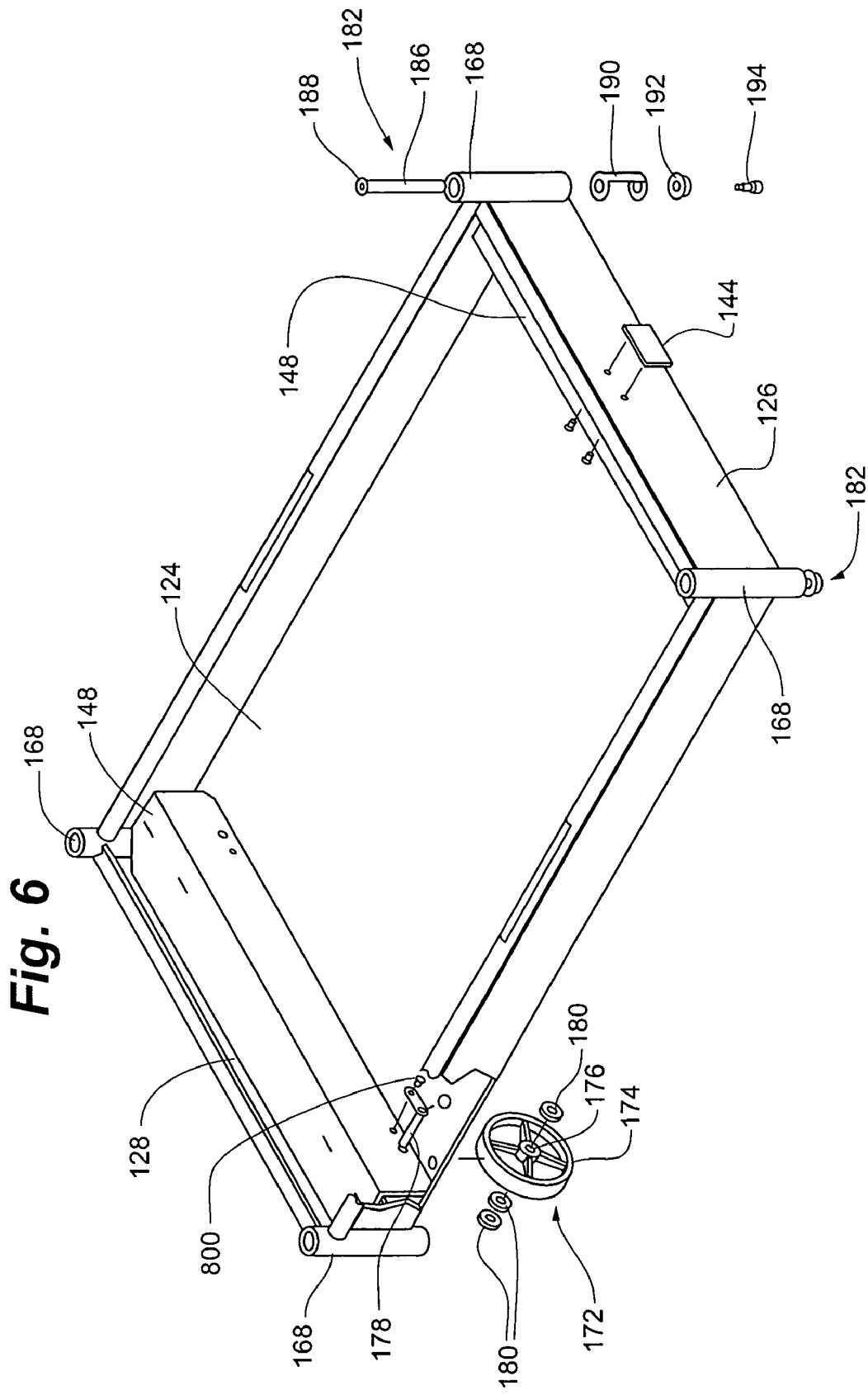
FIG. 6 is a top front perspective view of the base of a cart according to an embodiment of the present invention.
Figure 7:
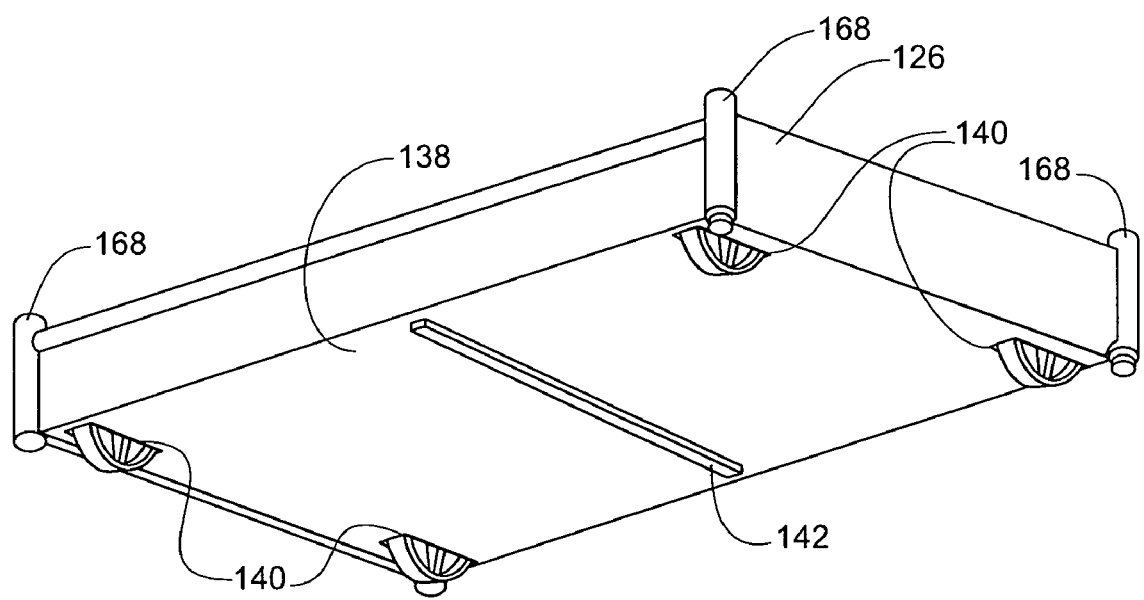
FIG. 7 is a bottom front perspective view of the base of a cart according to an embodiment of the present invention.
Figure 16:
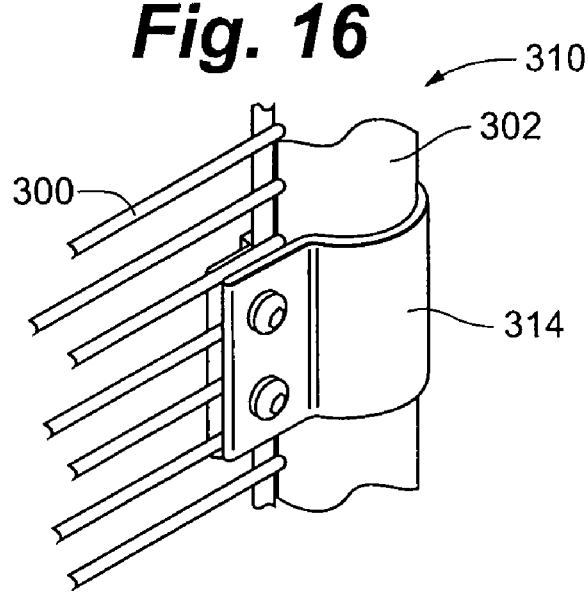
FIG. 16 is a top front perspective view of a bracket according to an embodiment of the present invention.

As depicted in FIG. 5, the front plate 126 and rear plate 128 are preferably "C" or channel shaped and comprise concave-shaped plate ends 146 so that the plates 126, 128 substantially abut the cylindrical frame posts 168a, 168b, 168c, 168d when the cart base 116 is assembled. The front plate 126 and rear plate 128 are preferably connected to the bottom 124 using fasteners 800. The terms "fastener" as used in this application includes screw, bolt, nut, rivet, snap, or other generally known mechanical fasteners. Although the plates 126, 128 are depicted as being "C" or channel shaped, it is contemplated that they be curved or flat. As depicted in FIG. 6, the front plate preferably includes a logo plate 144.

While the preferred embodiment of the present invention describes the operable connection of various members and elements of the carts 112, 212 with the use of mechanical fasteners 800, the various components of the carts 112, 212 could be assembled by welding or gluing in an alternative embodiment. It will be understood, however, that this alternate embodiment of assembling the carts 112, 212 does not facilitate easily on-site assembly of the carts 112, 212 as is provided for by the preferred embodiment.

The cart base 116 further preferably comprises a pair of opposed beams 164a, 164b disposed on and extending along the base sides 130a, 130b between the frame posts 168a, 168b, 168c, 168d. The beams 164a, 164b are preferably tubular in shape and comprise concave shaped beam ends 166 so that the beams 164a, 164b substantially abut the cylindrical frame posts 168a, 168b, 168c, 168d. While the beam cross-sections as depicted are tubular in shape, it is contemplated that the beams have a different shaped cross-section, such as square, rectangular, flat, or other various geometric shapes. The beams 164a, 164b are preferably constructed of tubular steel, although other materials such as aluminum, alloys or graphite or composite materials or various plastics could be used without departing from the spirit and scope of the invention.

The bottom 124 preferably comprises a top surface 136, an underside 138 opposed the top surface 136, and a plurality of wheel slots 140 extending from the top surface 136 through the underside 138. The wheel slots 140 are preferably located proximate the frame posts 168a, 168b, 168c, and 168d. The bottom 124 further comprises a support bar 142 that is disposed on the underside 138 extending substantially between the opposed base sides 130a, 130b. The support bar 142 as depicted has a square-shaped cross-section although it is contemplated that the support bar 142 be flat or tubular in shape. The support bar 142 is preferably constructed of steel, although other materials such as aluminum, alloys or graphite or composite materials or plastics could be used without departing from the spirit and scope of the invention. Each wheel slot 140 preferably comprises an axle plate 150 having an axle pin aperture 158 and a plurality of axle plate tabs 160.

The cart base 116 further preferably comprises a plurality of wheels covers 148, each wheel cover 148 having a plurality of axle pin apertures 152, a plurality of wheel cover tabs 154, and a plurality of axle plate tab slots 156. When the wheel cover 148 is placed onto the bottom 124 of the cart base 116, the wheel cover 148 preferably extends between the opposed sides 130a, 130b. In this position, the wheel cover tabs 154 are inserted into a plurality of wheel cover tab slots 162 included on the bottom 124 of the cart base 116 and the axle plate tabs 160 on the axle plates 150 are inserted into the axle plate tab slots 156 on the wheel covers 148. The wheel cover tabs 154 and axle plate tabs 160 assist in holding the axle plates 150 and wheel covers 148 in place. The wheel covers 148 and axle plates 150 are preferably constructed of sheet steel, although other materials such as aluminum, alloys or graphite or composite materials or plastics could be used without departing from the spirit and scope of the invention.

The components of the above-described cart base 116 are preferably selected, configured, and assembled so that the base 116 has a structural integrity and strength sufficient so that when the carts 112 are moved along the track 114, the carts 112 will not canter, flex, or bend by more than 5 degrees from normal to the track 114, and preferably by no more than 2-3 degrees from normal. By having such a structural integrity, when the carts 112 are moved along the track 114, the cart will not bind on the track 114, thus allowing easy manual movement of the carts 112 along the preferred embodiment of a single track 114. As a result of this preferred structural integrity, the present invention is able to dispense with the need for dual track arrangements as is generally taught in the modular storage systems of the prior art.

With continuing reference to FIG. 6, the cart base 116 preferably comprises at least three wheel mechanisms 172. The wheel mechanisms 172 on the retained cart 112 are generally axle-type wheels and generally comprise a wheel 174 having a wheel aperture 176, an axle pin 178 extending through the wheel aperture 176, and a plurality of washers 180. To connect each wheel 174 to the cart base 116, prior to placing the wheel covers 148 onto the cart base 116, the axle pin 178 is first inserted through the axle pin aperture 152 in the wheel cover 148. The axle pin 178 is then preferably inserted through a washer 180, the wheel aperture 176, through more washers 180, and then through the axle pin aperture 158 in the axle plate 150. The axle pin 178 is then connected to the wheel cover 148 by inserting a fastener 800 through a portion of the axle pin 178 into the wheel cover 148. The axle pins 178 and washers 180 are preferably constructed of steel, although other materials such as aluminum, alloys or graphite or composite materials could be used without departing from the spirit and scope of the invention. When the wheel mechanisms 172 are installed on the cart base 116, at least a portion of the wheels 174 extends below the underside 138 of the bottom 124. The wheels 174 are preferably constructed of nylon or polyolefin, such as part number PB0820112WS02 from Tricker Caster & Wheel Sales in Fairbault, Minn., although other equivalent polymer materials could be used without departing from the spirit and scope of the invention. In a preferred embodiment, a total of four wheel mechanisms 172 are utilized, with one pair of wheel mechanisms 172 on each end of the cart base 116. It will be understood that any number of wheel mechanism 172 greater than two could be incorporated into the design of the cart base 116 to decrease the weight load per wheel mechanism 172, for example, by providing additional wheel mechanisms 172 positioned at different points along the length of the cart base 116. In another embodiment of the present invention, the wheel 174 could be a caster wheel or ball wheel.

The cart base 116 further comprises at least one track follower mechanism 182. The track follower mechanism 182 can be seen in FIG. 5 and in greater detail in FIGS. 42-46. As depicted in the figures, the retained cart 112 according to an embodiment of the present invention includes two track follower mechanisms 182 positioned at opposite sides of the front end 118, although it is contemplated that the carts 112 could include one or more track follower mechanisms 182 positioned to engage the track 114 wherever the track 114 is positioned relative to the length of the carts 112, 212. For example, in an alternate embodiment, the track 114 and corresponding track follower mechanisms 182 could be positioned proximate the rear end 120 of the carts 112 or the track followers 182 could be positioned at any position along the length of the cart 112, for example, in the middle of the length of the cart 112. It will be understood, however, that the advantage of the positioning of the track follower mechanisms 182 on the front end of the carts 112 permits for easy following of a single track with the ability to manually move the carts 112 with a minimum amount of effort.

The track follower mechanism 182 comprises a track follower 184 having a plunger 186 that is preferably cylindrical in shape and a roller 192 connected to the plunger 186 using a shoulder bolt 194. The frame posts 168a, 168b, 168c, 168d preferably include a plunger guide 190, such that when the track follower mechanism 182 is inserted into the frame post 168, the plunger 186 of the track follower mechanism 182 rests within the plunger guide 190. Once the plunger 186 rests within the plunger guide 190, the roller 192 can be connected to the plunger 186 using the shoulder bolt 194. In this position, the track follower mechanism 182 is vertically movable and rotatable about the plunger 186 within the frame post 168 in the plunger guide 190. When the track follower mechanism 182 is inserted into the frame posts 168a, 168d, the track follower roller 192 extends below the frame posts 168a, 168d. A plunger cap 188 on the plunger 186 opposite the shoulder bolt 194 prevents the track follower mechanism 182 from falling out of the frame post 168. The roller 192 is preferably constructed of glass-filled nylon, although other materials such as steel, aluminum, bronze, alloys, graphite or composite materials or various plastics could be used without departing from the spirit and scope of the invention. The plunger 186, shoulder bolt 194, and plunger guide 190 are preferably constructed of steel or aluminum, although other materials could be used without departing from the spirit and scope of the invention.

The cart base 116 further preferably includes a plurality of bumpers 196. As depicted in FIGS. 8-12, the bumpers 196 are preferably cylindrical or donut-shaped and preferably comprise a bumper clearance aperture 198 and a bumper flat surface 199. The bumpers 196 are placed onto the frame posts 168a, 168b, 168c, 168d so that the bumper clearance apertures 198 are substantially aligned with post clearance apertures 170 that are included on the frame posts 168a, 168b, 168c, 168d. In this position the bumper flat surfaces 199 on the bumpers 196 proximate the rear plate 128 substantially face one another and the bumper flat surfaces 199 on the bumpers 196 proximate the front plate 126 substantially face one another. This flat surface 199 extends laterally beyond vertical members 304 of frames 302 to provide clearance for any panels that are placed onto the carts 112. The bumpers 196 are preferably constructed of nylon, although other materials such as rubber or various plastics could be used without departing from the spirit and scope of the invention.

The bumpers 196 protect adjacent carts 112, 212 when the carts 112, 212 are moved along the track 114 within the storage facility. If a first cart 112 is moved towards a second cart 112, such that the carts 112 contact one another, the bumpers 196 on the first cart 112 will contact the bumpers 196 of a second cart 112 rather than other parts of the carts 112 coming into contact with one another. As the bumpers 196 are constructed of nylon or other similar resilient materials, they will absorb the forces exerted when adjacent carts 12 are moved into an abutting relation along the track 14.

The cart as depicted in FIG. 4 also preferably comprises a front end 118 and a rear end 120, each end 118, 120 preferably comprising a frame 302 and a wire-grille panel 300 connected to the frame 302 using a plurality of brackets 310. It will be noted that reference numerals in the 300's are generally used to denote the features and components of frame, ends and top of the retained carts 112. The frame 302 comprises a pair of generally opposed vertical members 304 connected by a substantially horizontal member 306. As depicted in FIGS. 11-12, to connect the frames 302 to the cart base 116, the lower portion 305 of the vertical members 304 are inserted into the frame posts 168a, 168b, 168c, 168d. Once the frame 302 is inserted into the frame posts 168a, 168b, 168c, 168d, a fastener 800 is inserted through the bumper clearance aperture 94, through the frame post aperture 170, and into the aperture in the frame. While the frames as depicted are tubular in shape, it is contemplated that the frames have a different shaped cross-section, such as square, rectangular, flat, or other various geometric shapes. The frames 302 are preferably constructed of tubular steel, although other materials such as aluminum, alloys, graphite or composite materials could be used without departing from the spirit and scope of the invention. The wire-grille panel 300 is preferably constructed of wire steel, although other materials such as mesh or plastic wire could be used without departing from the spirit and scope of the invention.

In a preferred embodiment, the wire-grille panel 300 allows air to move within the cart 112. When uniforms or wearable equipment are placed into the cart 112, the air movement will allow the uniforms and wearable equipment to dry out, preventing any mold, fungus, or bacteria from forming and spreading on the uniforms and wearable equipment. Preferably, the wire-grille panels 300 have an at least 25% opening in the panel and optionally an at least 50% and up to 95% opening. Although the panels 300 are preferably constructed as wire-grilles, solid panels with equivalent cut out apertures could also be utilized to achieve the desired airflow.

The brackets 310 are generally used to connect the wire-grille panel 300, or a solid panel 326 as depicted in FIG. 36, to the frames 302. As depicted in FIGS. 14-22, the brackets 310 comprise an inside bracket portion 312 and an outside bracket portion 314. In order to connect the wire-grille panel 300 to the frame 302, the wire-grille panel 300 is placed into the frame 302 and the inside bracket portion 312 and outside bracket portion 314 are placed together so that they capture the frame 302 and wire-grille panel 300. The inside bracket portion 312 and outside bracket portion 314 are then connected using a plurality of fasteners 800.

Figure 17:
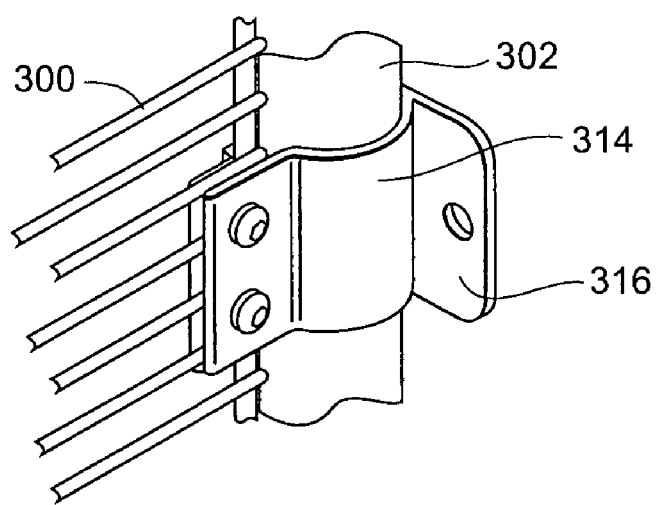
FIG. 17 is a top front perspective view of a locking bracket according to an embodiment of the present invention.
Figure 18:
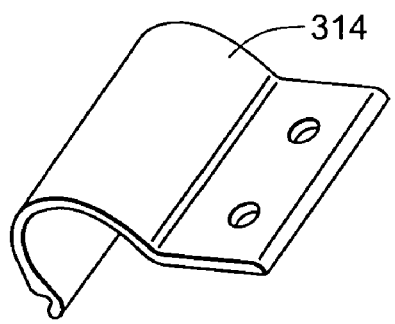
FIG. 18 is a perspective view of an outside bracket according to an embodiment of the present invention.
Figure 19:
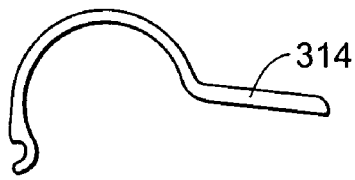
FIG. 19 is a cross-sectional view of an outside bracket according to an embodiment of the present invention.
Figure 20:
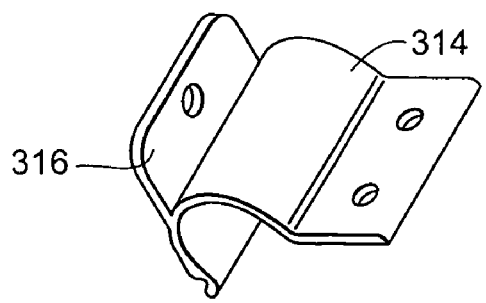
FIG. 20 is a perspective view of a locking bracket according to an embodiment of the present invention.
Figure 21:
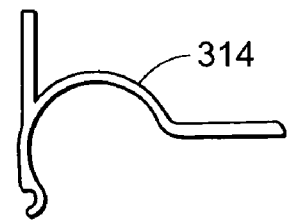
FIG. 21 is a cross-sectional view of a locking bracket according to an embodiment of the present invention.
Figure 22:
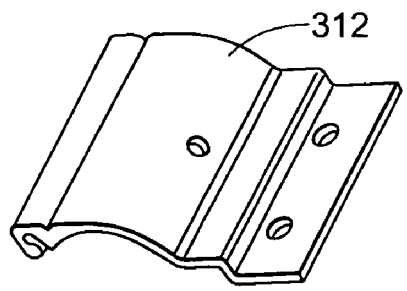
FIG. 22 is a perspective view of an inside bracket according to an embodiment of the present invention.
Figure 23:
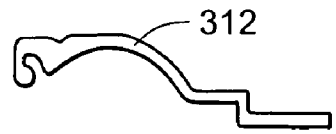
FIG. 23 is a cross-sectional view of an inside bracket according to an embodiment of the present invention.
Figure 28:
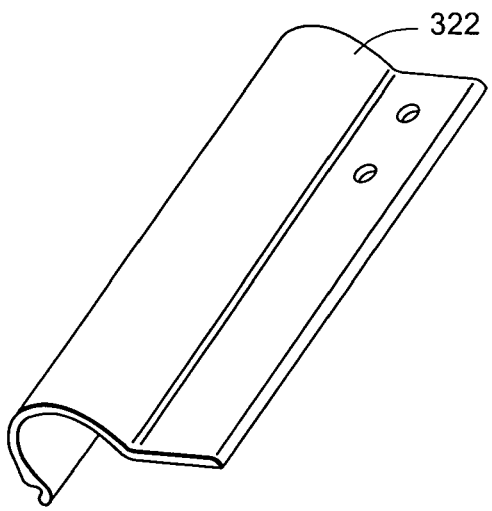
FIG. 28 is a perspective view of an outside handle bracket according to an embodiment of the present invention.
Figure 29:
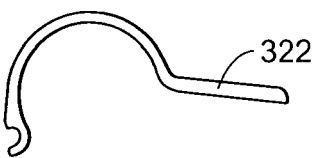
FIG. 29 is a cross-sectional view of an outside handle bracket according to an embodiment of the present invention.

As depicted in FIG. 17, the bracket 310 can also include a lock portion 316. When one desires to connect adjacent carts 12 in a modular storage system 10, brackets 310 comprising lock portions 316 are included. To lock adjacent carts 112 together, adjacent carts 112 including lock portions 316 are placed together. A lock is then inserted into the lock portions 316 of each bracket 310 and then secured. The brackets 310 are preferably constructed of steel, although other materials such as aluminum, alloys, graphite or composite materials or various plastics could be used without departing from the spirit and scope of the invention.

Once the frames 302 and wire-grille panels 300 or solid panels 326 have been installed on the cart base 116, the cart base 116, and panels on the front end 118 and rear end 120 generally define a storage structure. As discussed below, the storage structure is preferably reconfigurable and can be used to store uniforms, wearable equipment, equipment, gear and other various articles for equipping field operational units.

Figure 30:
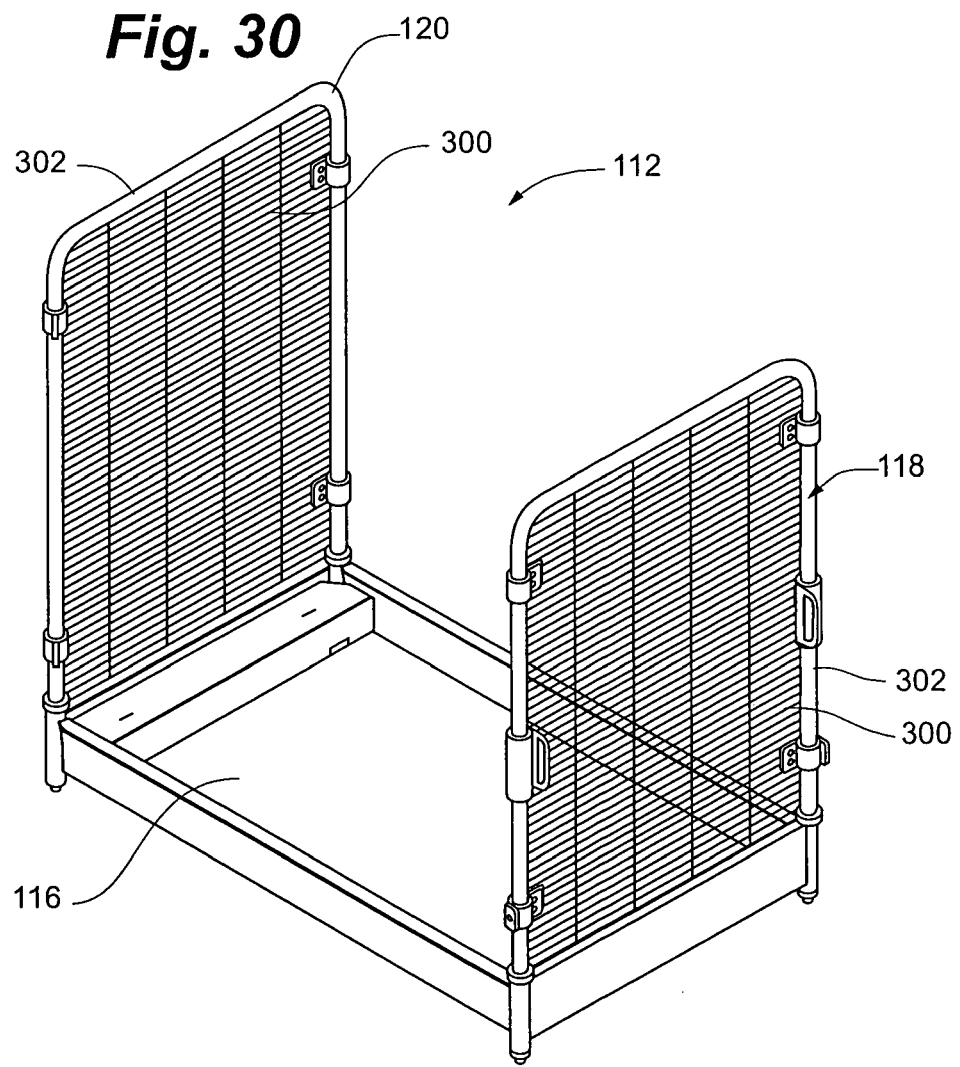
FIG. 30 is a top front perspective view of a cart according to an embodiment of the present invention.
Figure 31:
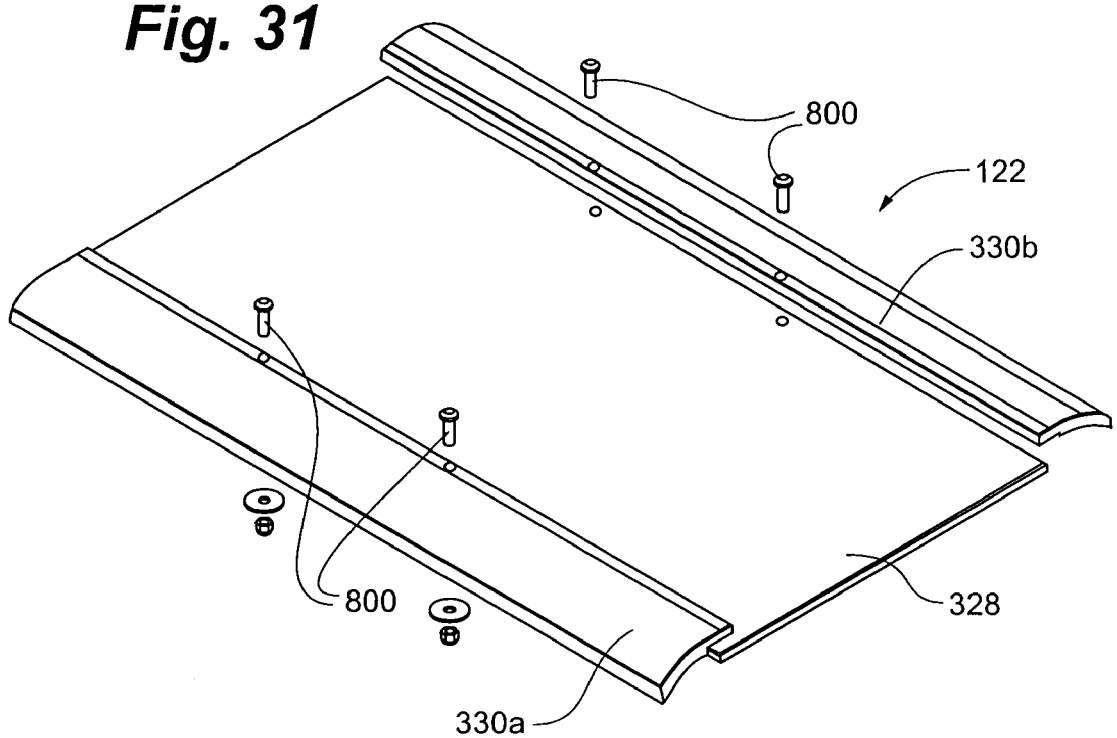
FIG. 31 is a top front perspective view of a top of a cart according to an embodiment of the present invention.
Figure 32:
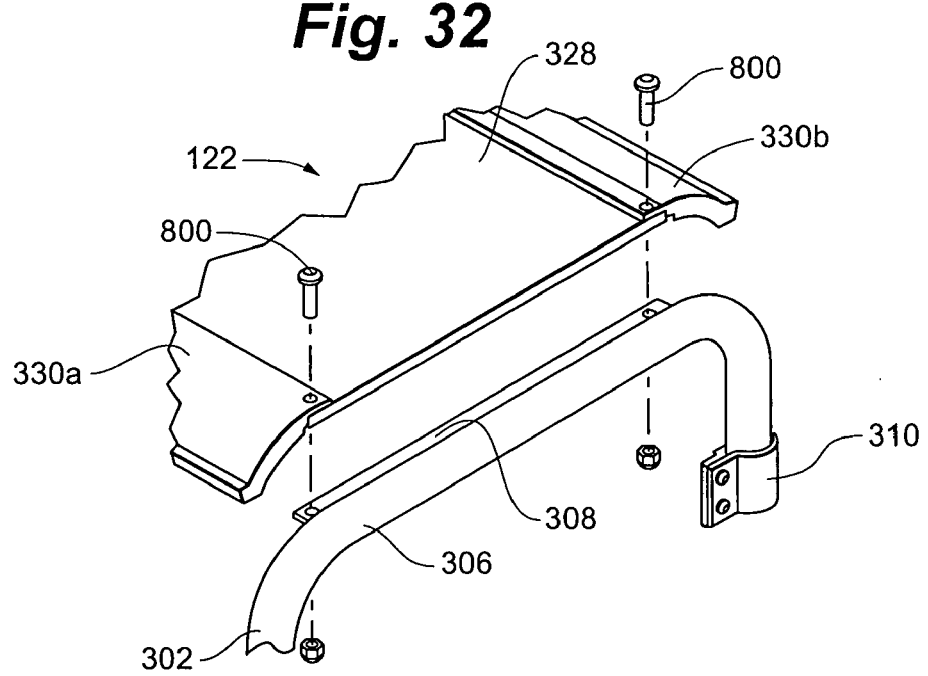
FIG. 32 is a top front perspective view of a top of a cart according to an embodiment of the present invention.
Figure 37:
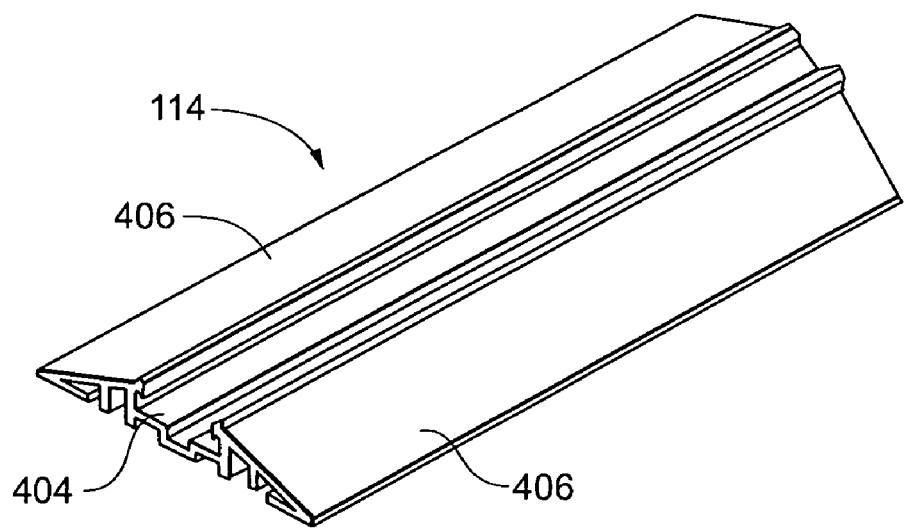
FIG. 37 is a top front perspective view of the track of a modular storage system according to an embodiment of the present invention.
Figure 38:
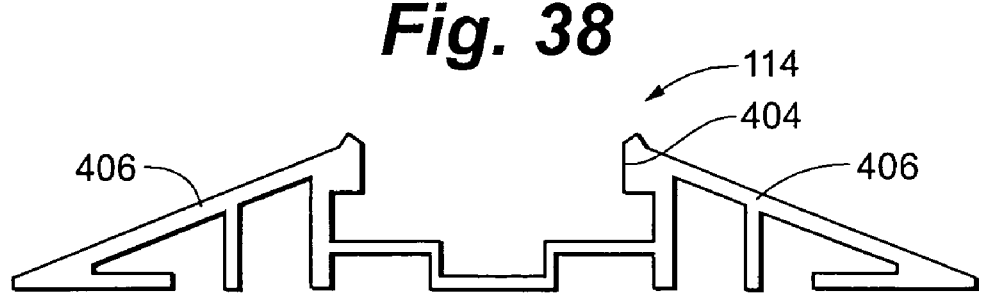
FIG. 38 is a cross-sectional view of the track of a modular storage system according to an embodiment of the present invention.

As depicted in FIGS. 4 and 30, the front end 118 further preferably comprises a handle 324 connected to the frame 302 with a handle bracket 318 having an inside handle bracket portion 320 and outside handle bracket portion 322. Once the wire-grille panel 300 has been positioned in the frame 302, the inside handle bracket portion 320 and outside handle bracket portion 322 are placed together so that they capture the frame 302 and wire-grille panel 300. Fasteners 800 are then inserted through the inside handle bracket portion 320 and outside handle bracket portion 322 and into the handles 324. The handles 324 are preferably constructed of steel, although other materials such as aluminum, alloys, graphite or composite materials or various plastics could be used without departing from the spirit and scope of the invention.

The ends of the carts 112 can also preferably include labeling panels that can be attached to the wire-grille panels 300 or solid panels 326. By including a labeling panel, those using the carts 112 can determine what the cart 112 contains without needing to look within the cart, but by merely looking at the labeling panel.

As stated above, and as depicted in FIG. 36, the front end 118 and rear end 120 can also include a solid panel 326. Once the wire-grille panel 300 has been positioned in the frame 302, the solid panel 326 is then positioned in the frame 302. The inside bracket portion 312 and outside bracket portion 314 are then placed together so that they capture the frame 302 and wire-grille panel 300. Fasteners 800 are then inserted through the inside bracket portion 312 and outside bracket portion 314. In an embodiment of the present invention, the solid panel 326 is substantially the same size as the wire-grille panel 300.

In another embodiment of the present invention, the solid panel 326 comprises a plurality of solid panel 326 sections selectively positioned on the wire-grille panel 300. In another embodiment of the present invention, the carts 112 could comprise a solid panel 326 without using a wire-grille panel 300. In a preferred embodiment, the solid panels 326 are preferably constructed of ⅝" veneer core plywood with a laminate overlay, although other materials such as aluminum, graphite or composite materials or various plastics could be used without departing from the spirit and scope of the invention.

As depicted in FIG. 4, the cart 112 also preferably comprises a top 122, which can be seen in greater detail in FIGS. 31-35. The cart top 122 generally comprises a top panel 328 extending from the front frame 302a to the rear frame 302b and a plurality of top panel extrusions 330a, 330b positioned on opposing sides of the top panel 328 and extending substantially along the length of the top panel 328. The top panel extrusions 330a, 330b are preferably connected to top panel 328 using a plurality of fasteners 800. As can be seen in the figures, the top panel extrusions preferably have a profile that matches the profile of the end frames 302 where the vertical members 304 intersect the horizontal member 306. The top panel 328 is positioned on support brackets 308 disposed on the horizontal member 306 of the frames 302. Once the top panel 328 is positioned on support brackets 308, it is then preferably connected to the support brackets 308 using fasteners 800.

Once the top panel 328 is connected to the frames 302a, 302b, the top panel extrusions 330a, 330b are connected to the top panel 328 using fasteners 800. Roof caps 332 are then connected to the top panel extrusions 330a, 330b using fasteners 800. The roof caps 332 protect the top panel extrusions 330a, 330b and provide a more aesthetically appealing appearance. The top panels 328 are preferably constructed of ⅝" veneer core plywood with a laminate overlay, although other materials such as aluminum, graphite or composite materials or various plastics could be used without departing from the spirit and scope of the invention. The roof caps 332 are preferably constructed of 14-gauge steel, although other materials such as aluminum, alloys, graphite or composite materials or various plastics could be used without departing from the spirit and scope of the invention.

Figure 96:
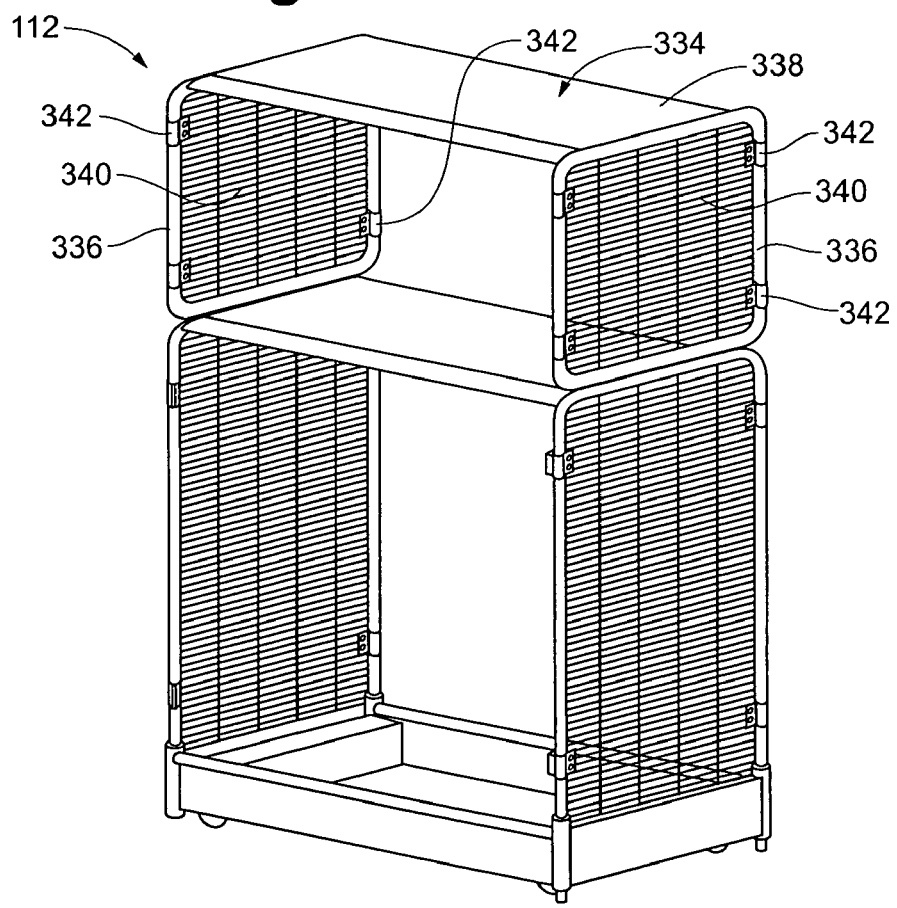
FIG. 96 is a perspective view of a cart having an attic according to an embodiment of the present invention.
Figure 97:
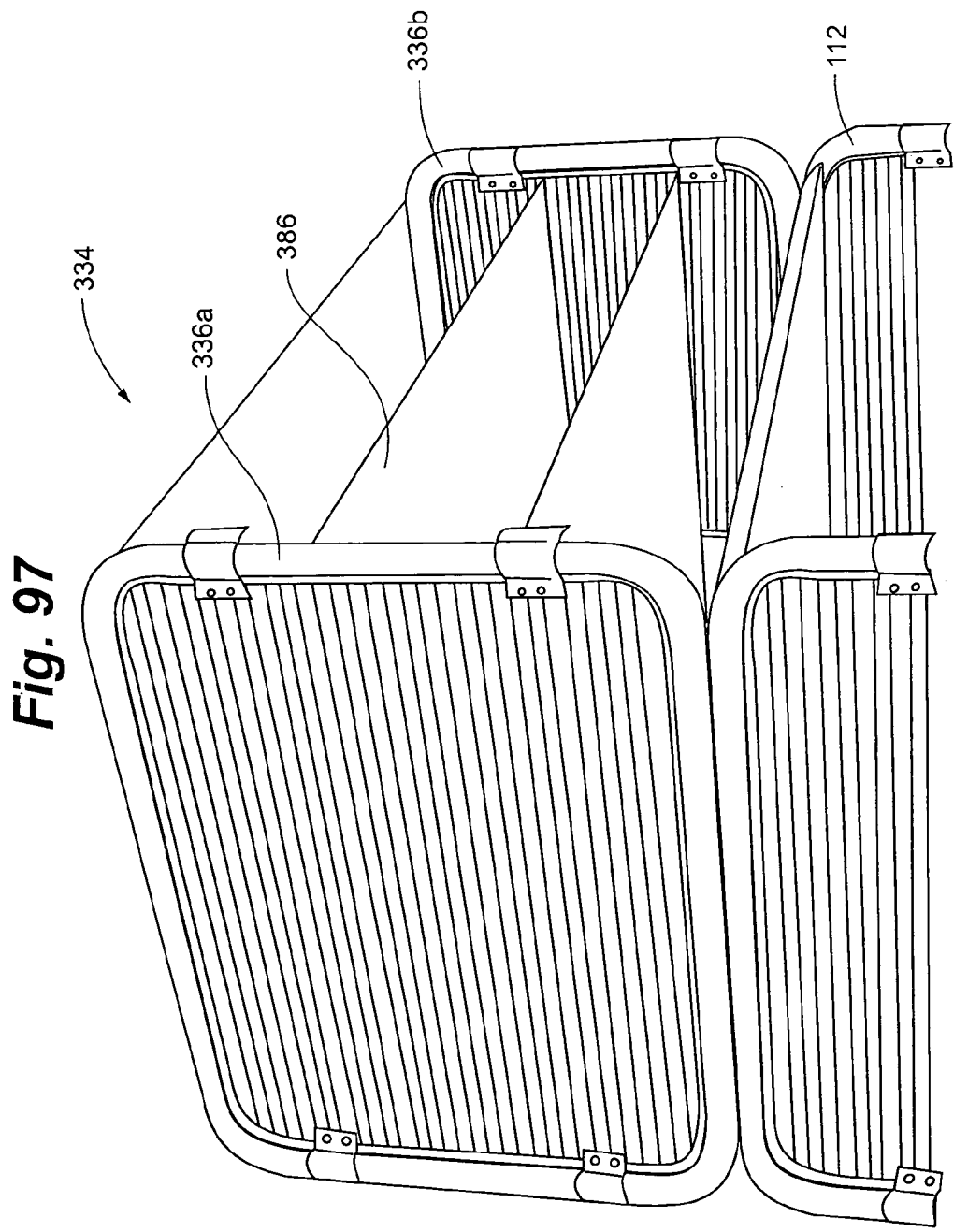
FIG. 97 is a perspective view of an attic of a cart according to an embodiment of the present invention.
Figure 98A:
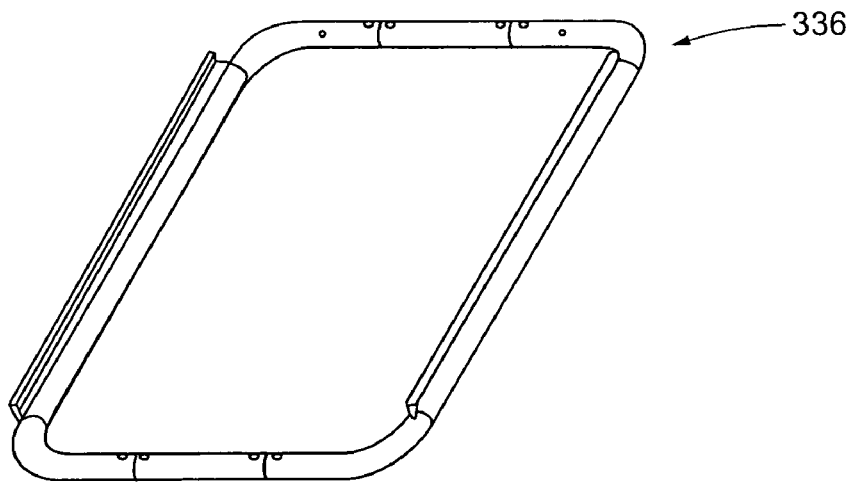
FIG. 98a is a perspective view of an attic frame of a cart according to an embodiment of the present invention.
Figure 98B:
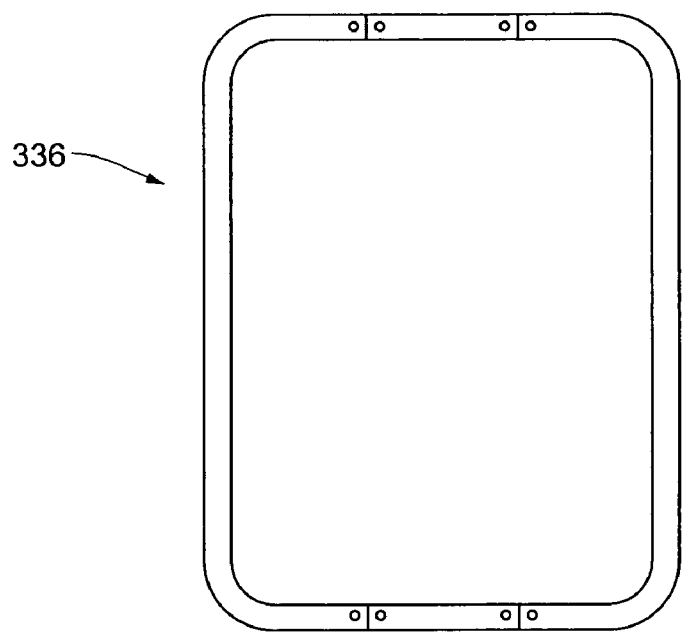
Figure 98C:

As depicted in FIGS. 96-98, the cart 112, in an embodiment of the present invention, an attic 334 is disposed on the cart top 122 of the cart 112. The attic 334 comprises a pair of generally opposed attic frames 336a, 336b separated by and connected to an attic top 338. The attic 334 further preferably comprises attic wire-grille panels 340 connected to the attic frames 336a, 336b using brackets 342 that are substantially similar to brackets 310 described above. The attic top 338 is preferably the same length as the cart top 122. The attic 334 is assembled substantially as described with reference to earlier discussion of the construction and materials of the cart 112, the earlier discussion being incorporated with reference to the attic 334.

Figure 56:
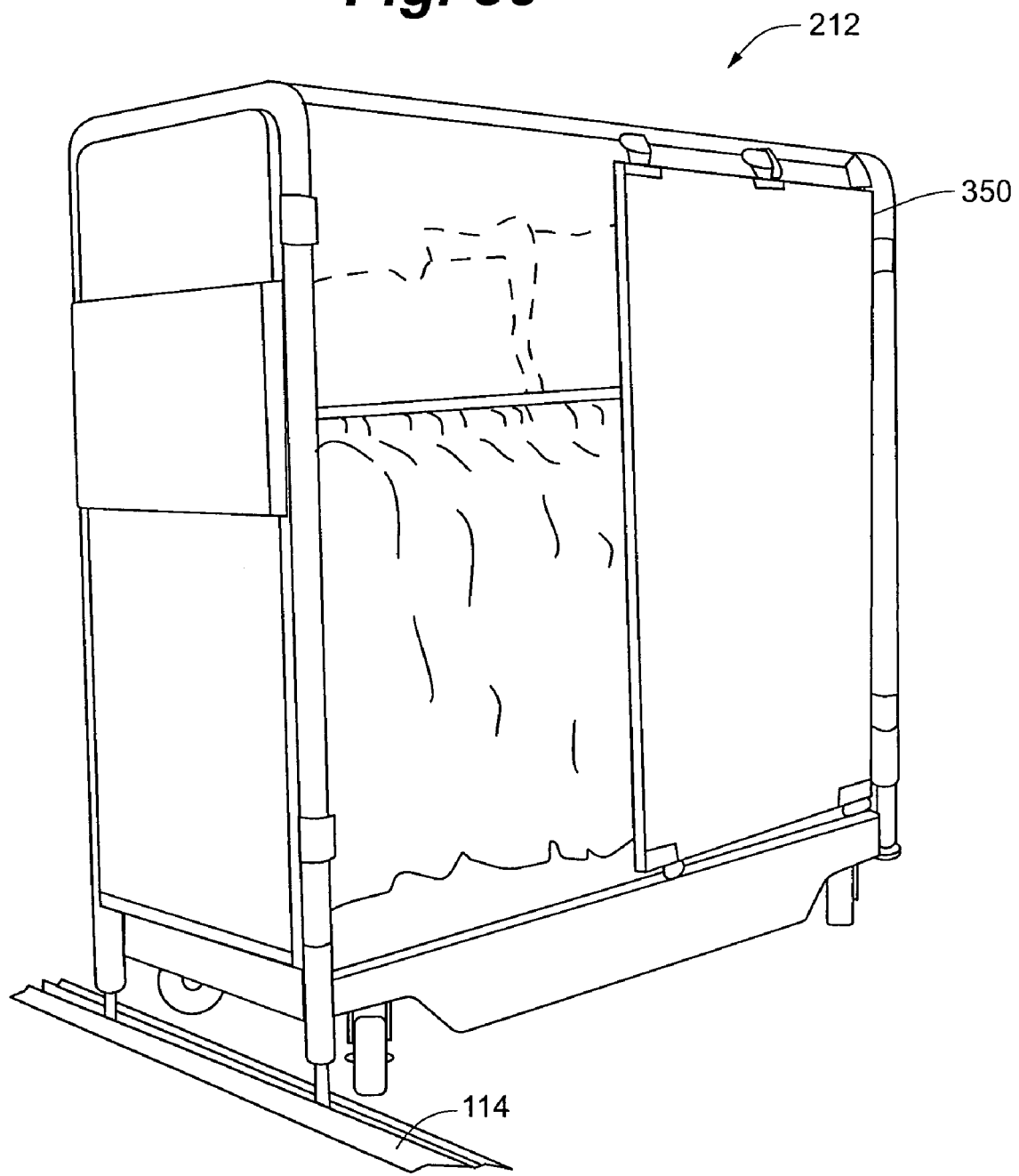
FIG. 56 is a top front perspective view of a cart according to an embodiment of the present invention.
Figures 57A, 57B, 57C:
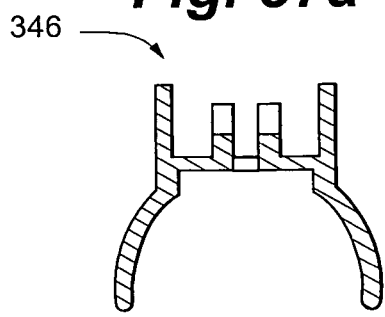
FIG. 57a is a cross-sectional view of a bypass door track of a cart according to an embodiment of the present invention.
FIG. 57b is a side elevation view of a bypass door track of a cart according to an embodiment of the present invention.
FIG. 57c is a top elevation view of a bypass door track of a cart according to an embodiment of the present invention.
Figure 58:
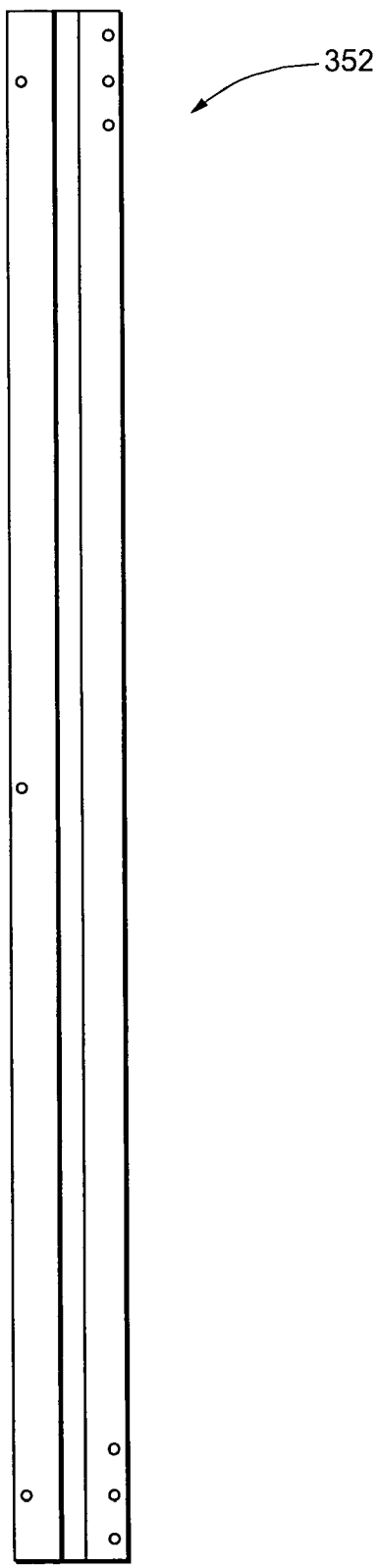
FIG. 58 is a cross-sectional view of a bypass door glide of a cart according to an embodiment of the present invention.
Figure 59:
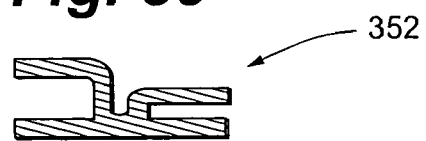
FIG. 59 is a side elevation view of a bypass door glide of a cart according to an embodiment of the present invention.

As depicted in FIGS. 55-56, the retained cart 112 and modular cart 212 can further comprise a bypass door mechanism 344. The bypass door mechanism 344 comprises at least one bypass door 350, a bottom door track 348, and a top door track 346. The at least one bypass door 350 is preferably constructed of ⅝" veneer core plywood with a laminate overlay, although other materials such as aluminum, graphite or composite materials or various plastics could be used without departing from the spirit and scope of this invention. The door tracks 346, 348 are preferably constructed of extruded aluminum, although other materials such as alloys, graphite or composite materials or various plastics could be used without departing from the spirit and scope of this invention.

Figure 62:
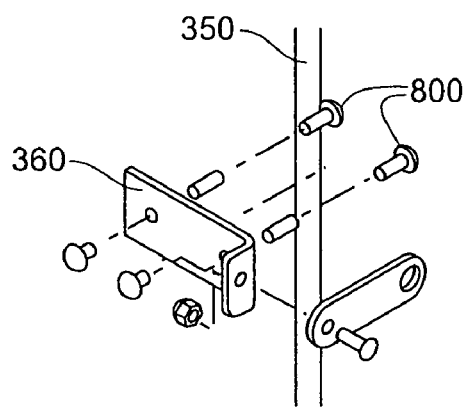
FIG. 62 is an exploded view of a bypass door latch of a cart according to an embodiment of the present invention.
Figure 63:
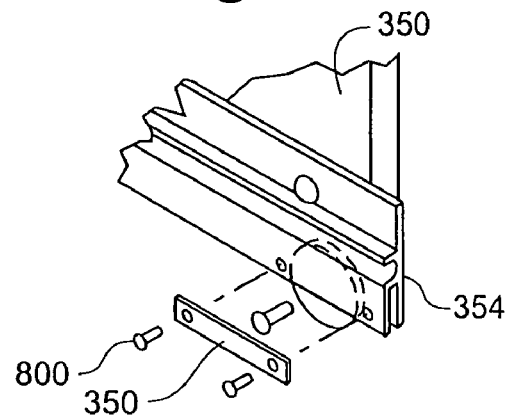
FIG. 63 is an exploded view of a bypass door roller of a cart according to an embodiment of the present invention.
Figure 64A:
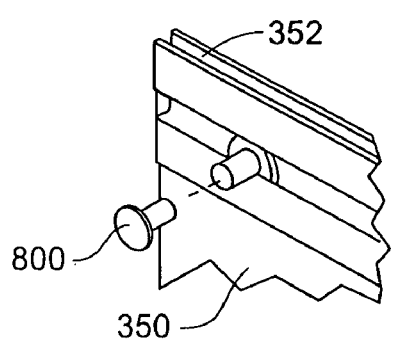
FIG. 64a is an exploded view of a bypass door glide of a cart according to an embodiment of the present invention.
Figure 64B:
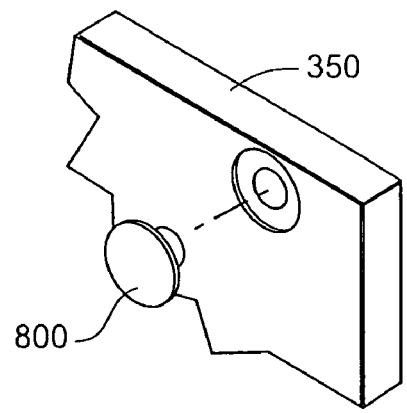
FIG. 64b is an exploded view of a bypass door of FIG. 64a without a glide according to an embodiment of the present invention.
Figure 65:
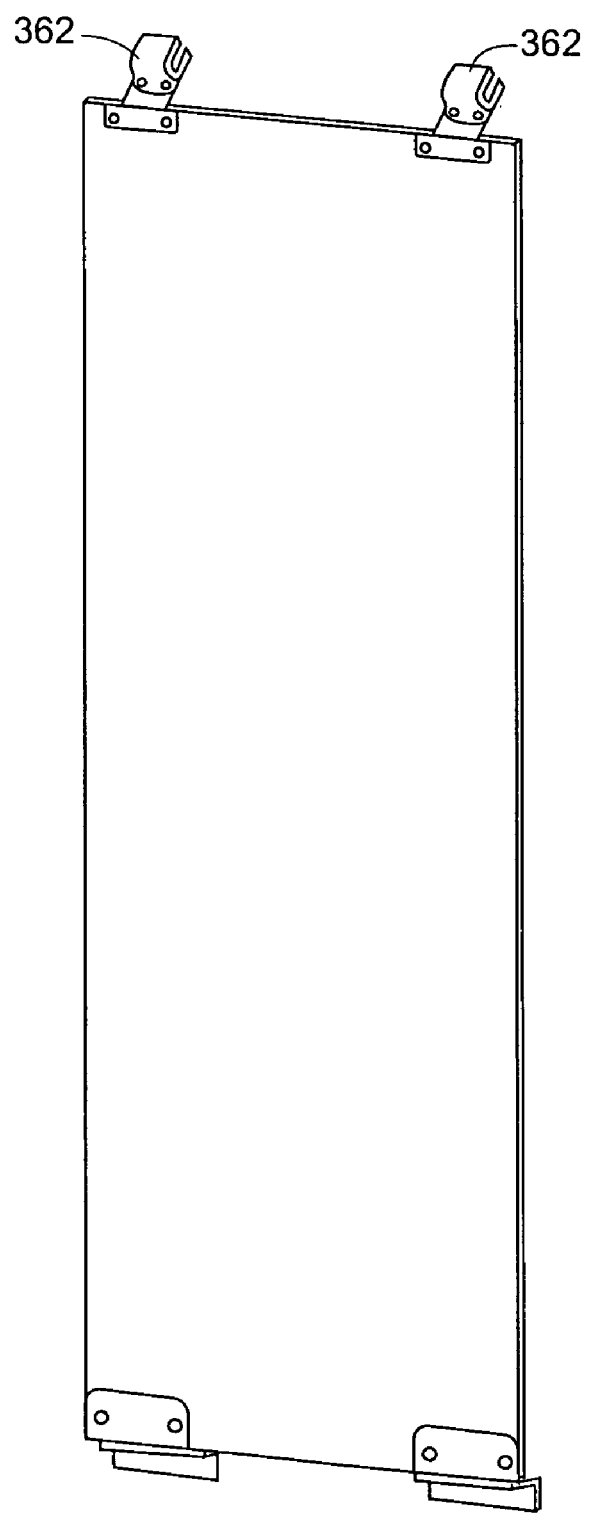
FIG. 65 is a perspective view of a bypass door track of a cart according to an embodiment of the present invention.
Figure 66:
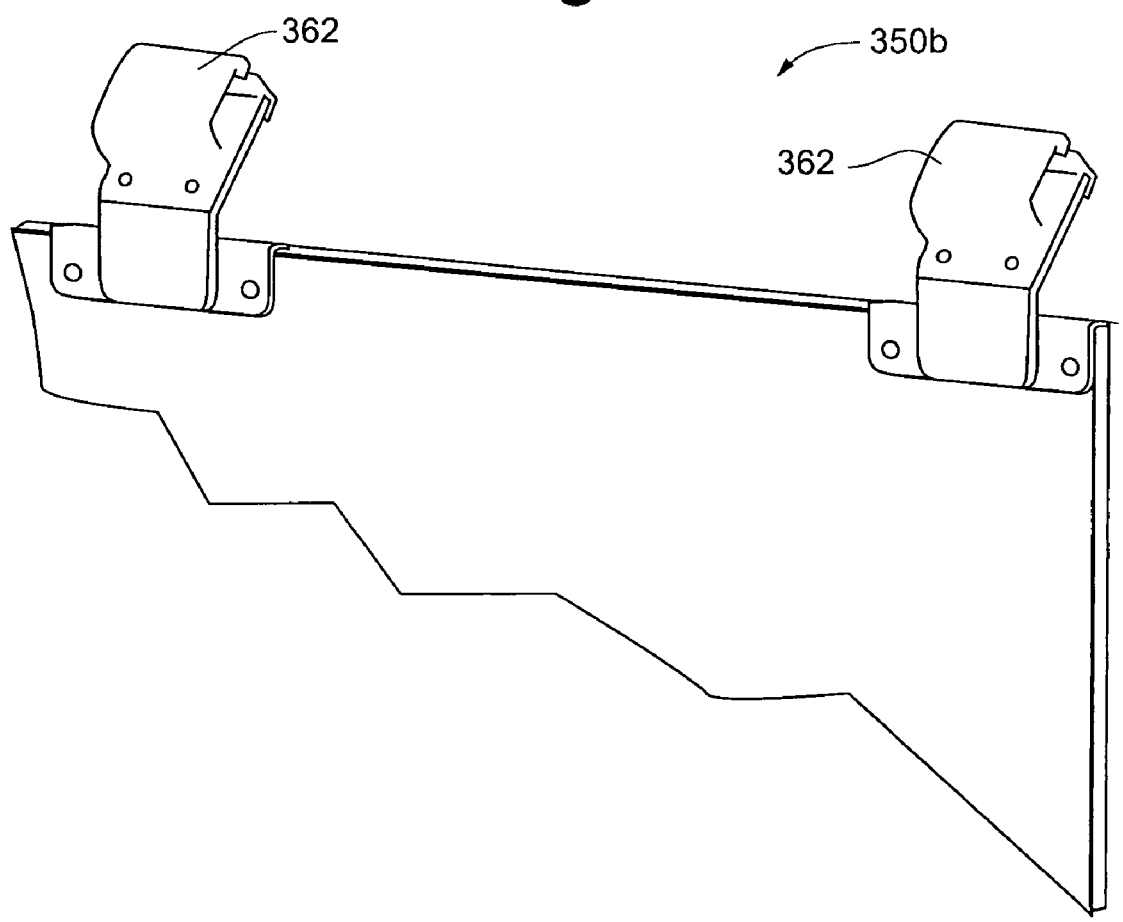
FIG. 66 is a perspective view of a bypass door track of a cart according to an embodiment of the present invention.
Figure 67:
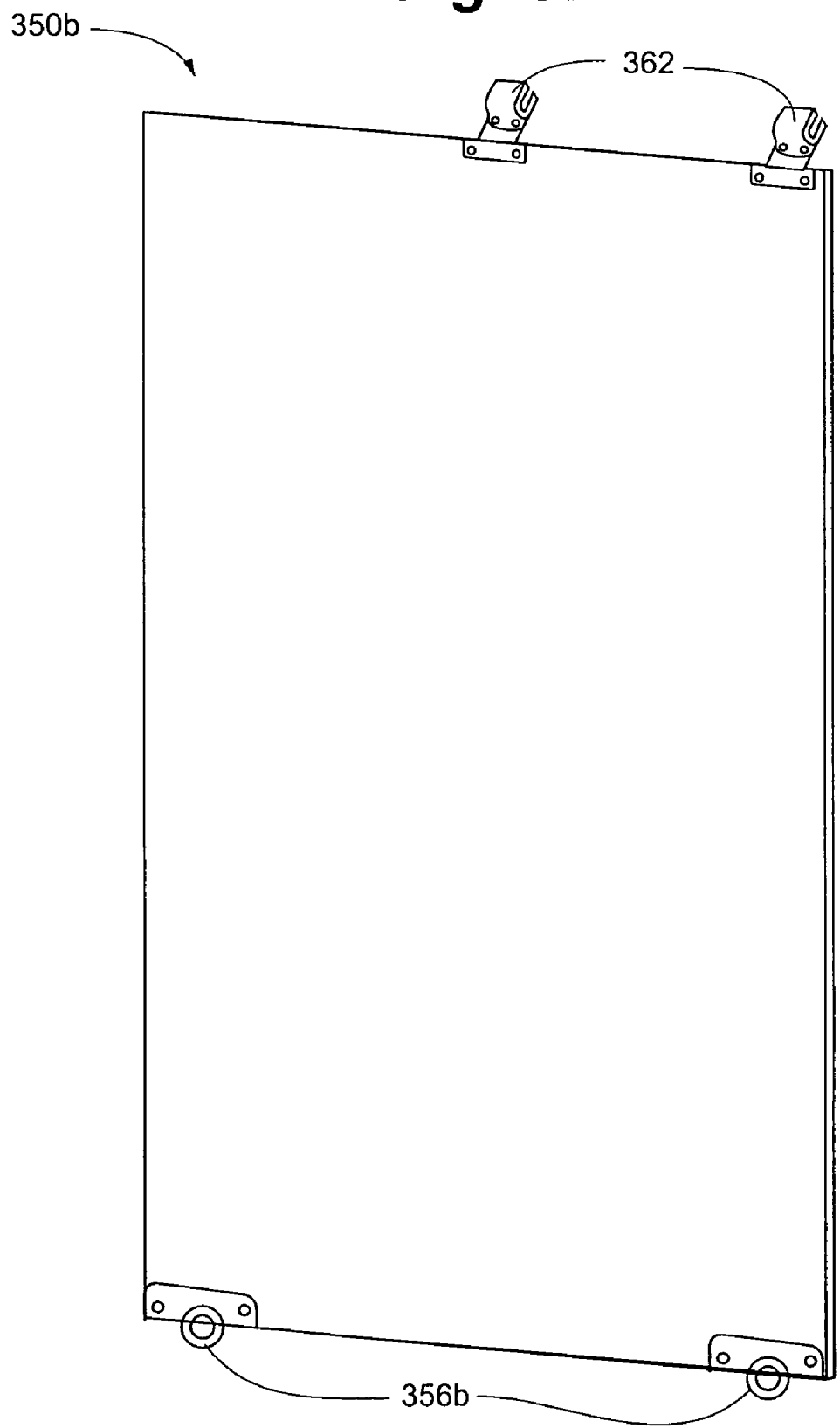
FIG. 67 is a perspective view of a bypass door track of a cart according to an embodiment of the present invention.
Figure 68:
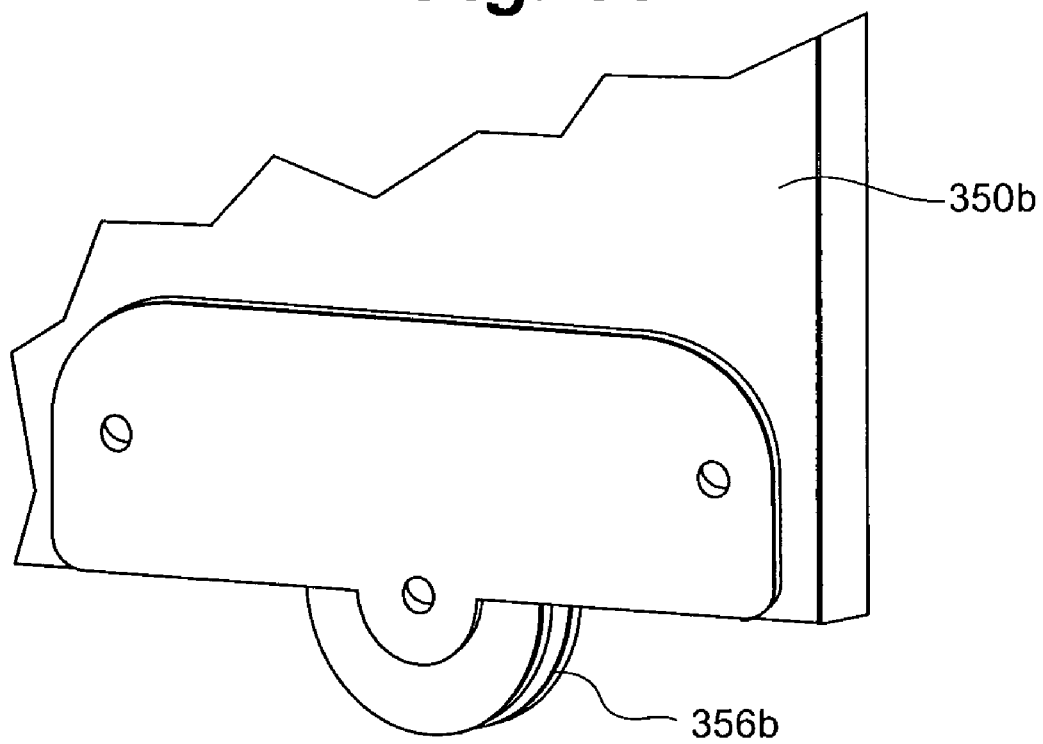
FIG. 68 is a perspective view of a bypass door roller of a cart according to an embodiment of the present invention.
Figure 69:
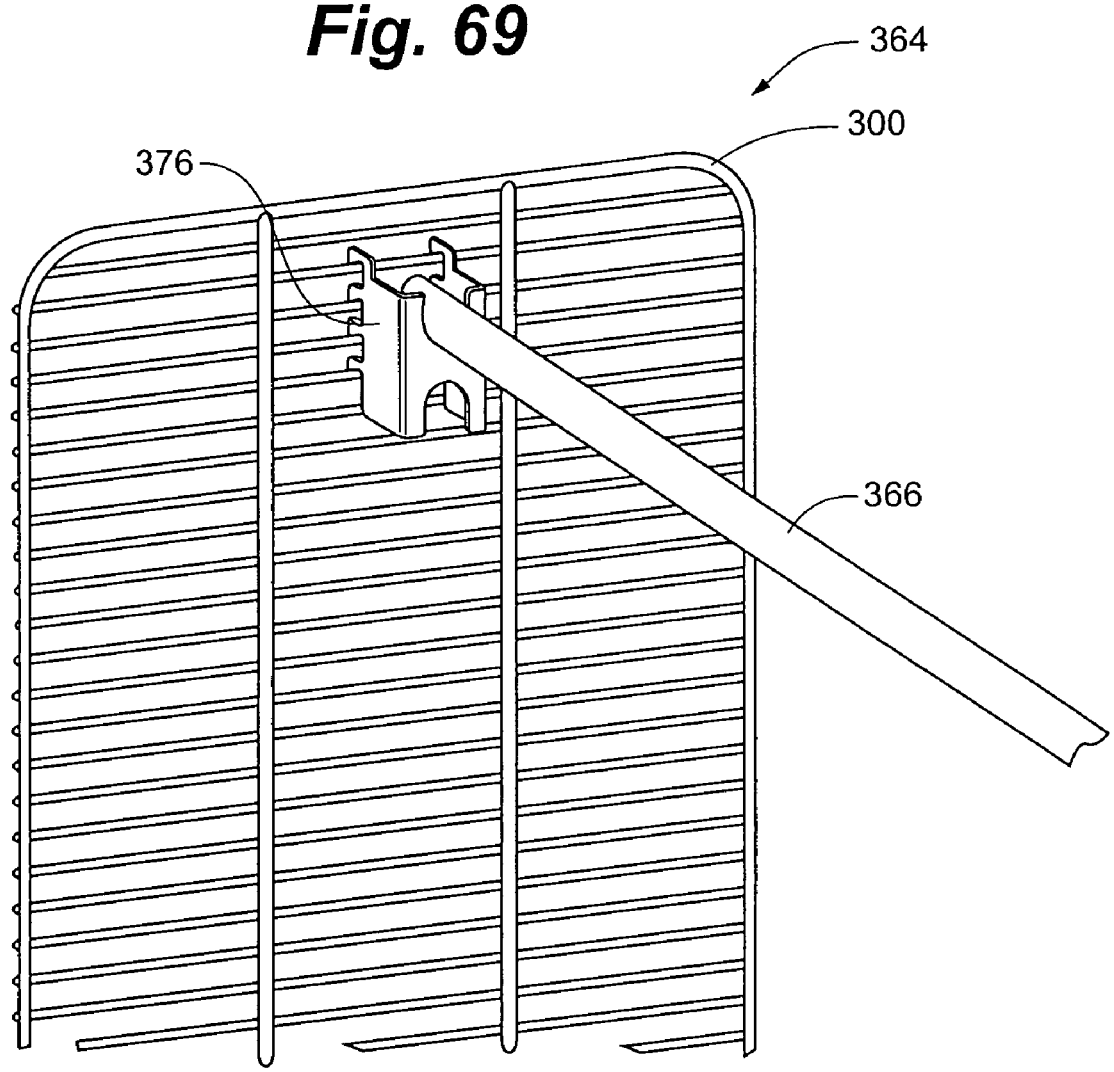
FIG. 69 is a perspective view of a wire-grille panel and truss system of a cart according to an embodiment of the present invention.
Figure 70:
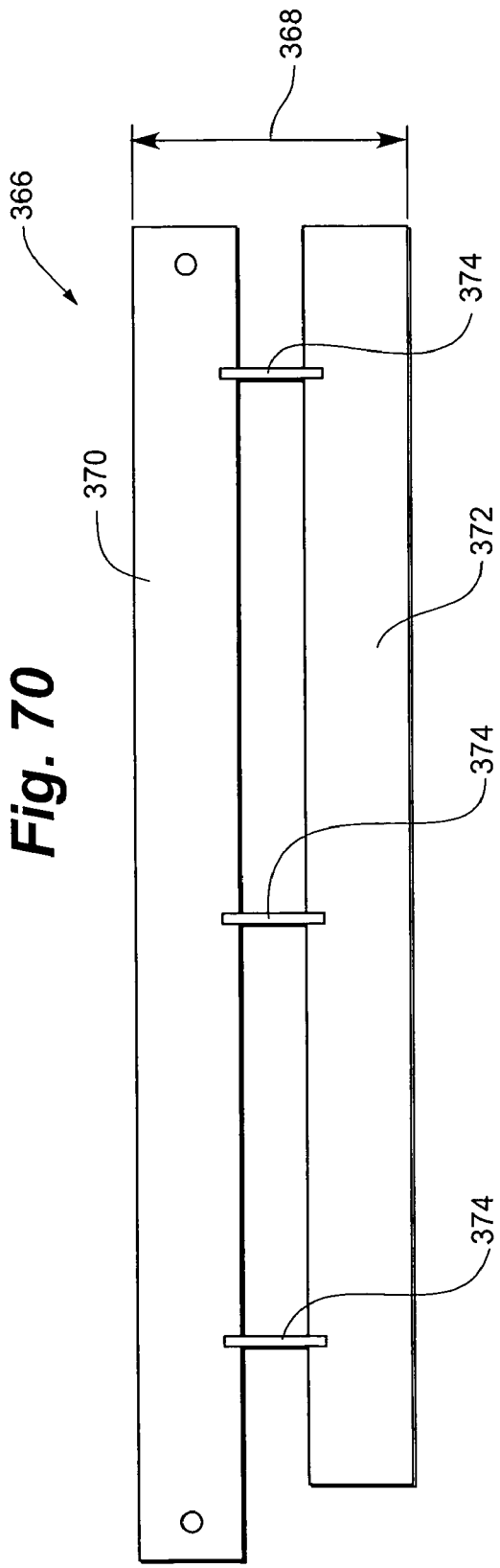
FIG. 70 is a perspective view of a truss of a cart according to an embodiment of the present invention.
Figure 71A:
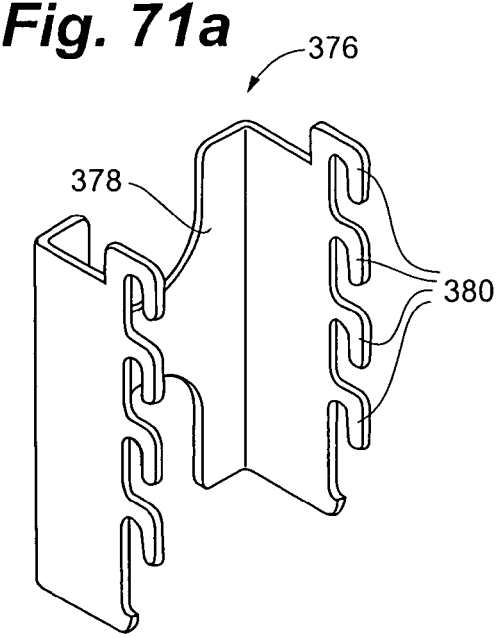
FIG. 71a is a rear perspective view of a truss hanger according to an embodiment of the present invention.
Figure 71B:
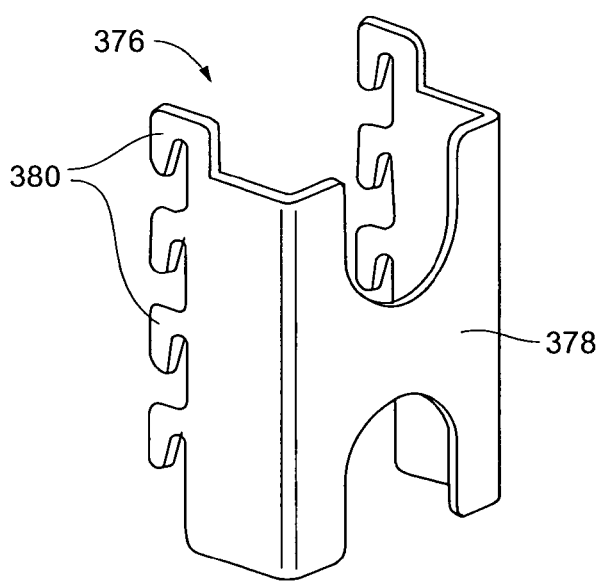
FIG. 71b is a front perspective view of a truss hanger according to an embodiment of the present invention.
Figure 72:
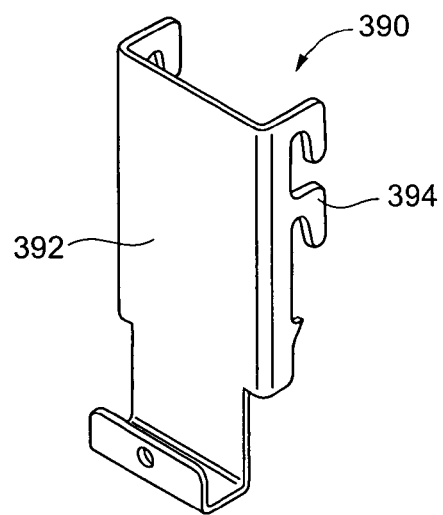
FIG. 72 is a front perspective view of a shelf hanger according to an embodiment of the present invention.
Figure 73:
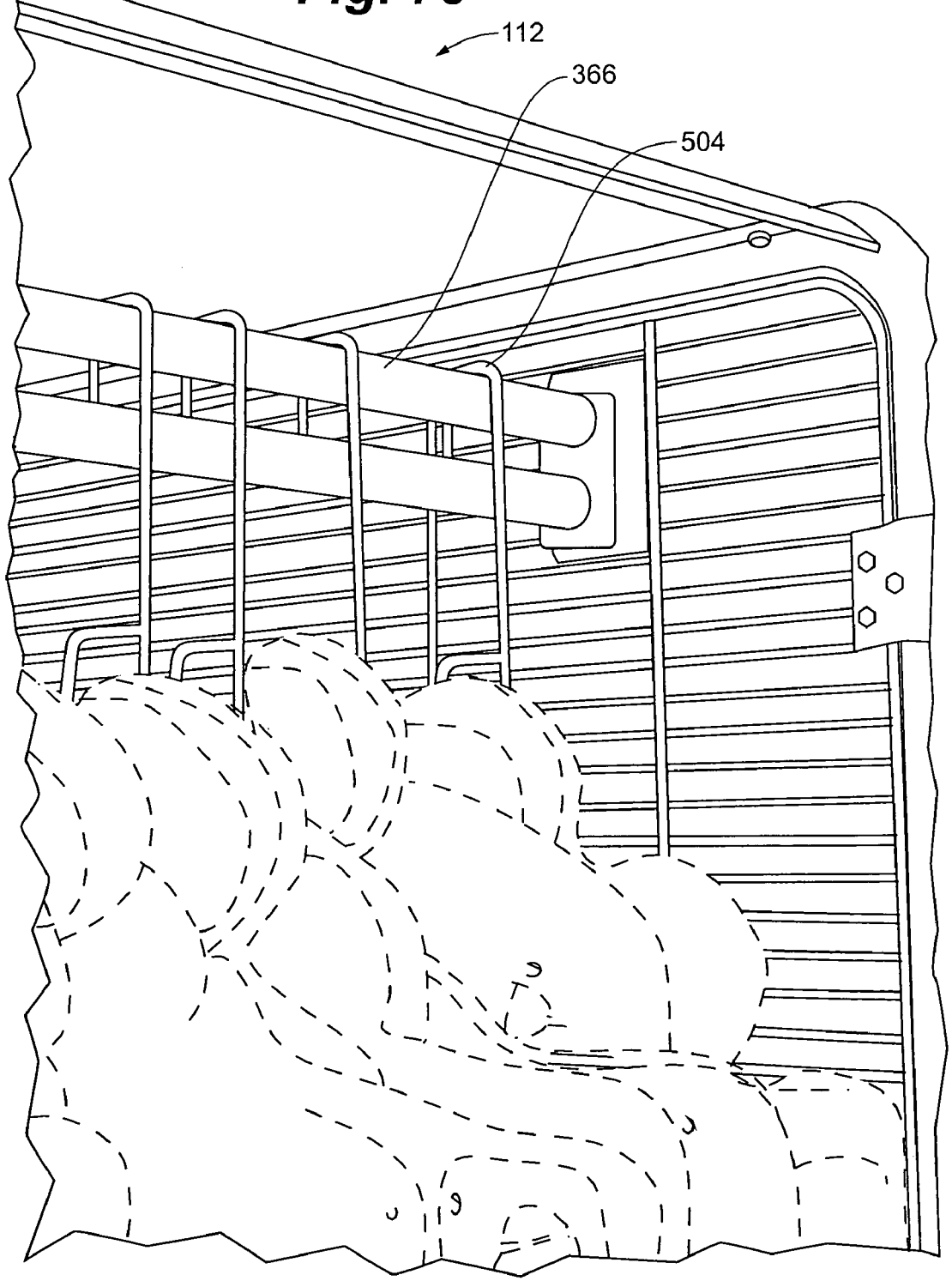
FIG. 73 is a perspective view of a truss of a cart according to an embodiment of the present invention.

According to an embodiment of the present invention, the bypass doors 350 comprise a bottom door glide 354 and a top door glide 352 connected to the bottom 353 and top 351 of the bypass door 350, respectively. As depicted in FIG. 64, the glides 354, 352 are connected to the bypass door 350 using fasteners 800. The bypass door 350 also preferably comprises a latch mechanism 360 connected to the bypass door 350 using fasteners 800, as can be seen in FIG. 61-62. The bottom door glide 354 preferably comprises a plurality of door rollers 356. As depicted in FIG. 63, the door rollers 356 are connected to the bottom door glide 354 using fasteners 800 and door roller plate 358. The door glides 354, 352 are preferably constructed of extruded aluminum, although other materials such as steel, alloys, graphite or composite materials or various plastics could be used without departing from the spirit and scope of this invention. The latch mechanisms 360 are preferably constructed of steel, although other materials such as aluminum, alloys, graphite or composite materials or various plastics could be used without departing from the spirit and scope of this invention. The door rollers 356 are preferably constructed of sintered bronze, although other materials such as nylon, urethane, or various polymer materials could be used without departing from the spirit and scope of this invention.

An alternative embodiment of the bypass door 350b can be seen in FIGS. 65-68. The door 350b of this embodiment comprises a plurality of door rollers 356b disposed on the bottom of the door 350b and a plurality of door claws 362 disposed at the top 351b of the door 350b. When the doors 350b are assembled on the cart 12, the claws 362 slide along the top door track 346bdisposed on the top 351b of the door 350b.

The Track

The modular storage system 110 preferably comprises a single track 114. It will be noted that reference numerals in the 400's are generally used to denote the features and components of the track 114. Although a single track 114 is preferably utilized, it will be understood that for certain aspects of the present invention, a plurality of tracks 114 may be provided and utilized within the scope of those aspects of the present invention.

Figure 39:
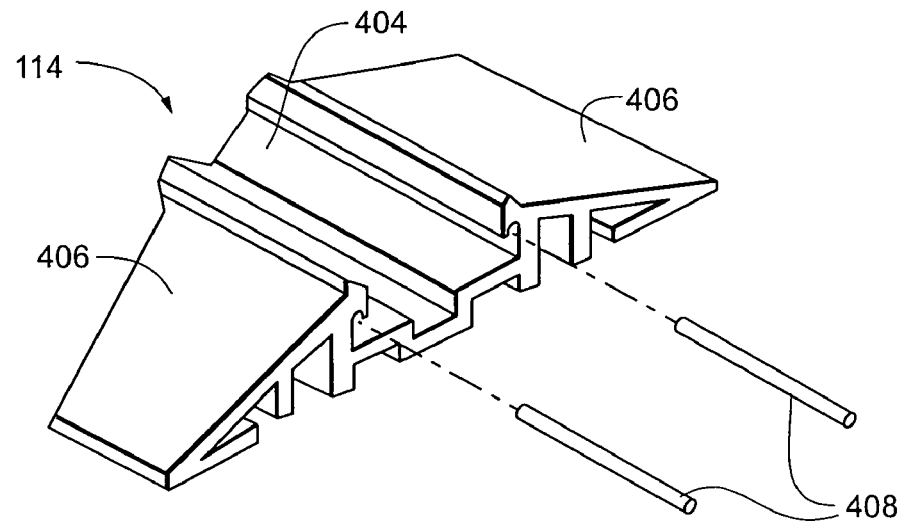
FIG. 39 is a perspective view of the track of a modular storage system according to an embodiment of the present invention.
Figure 40:
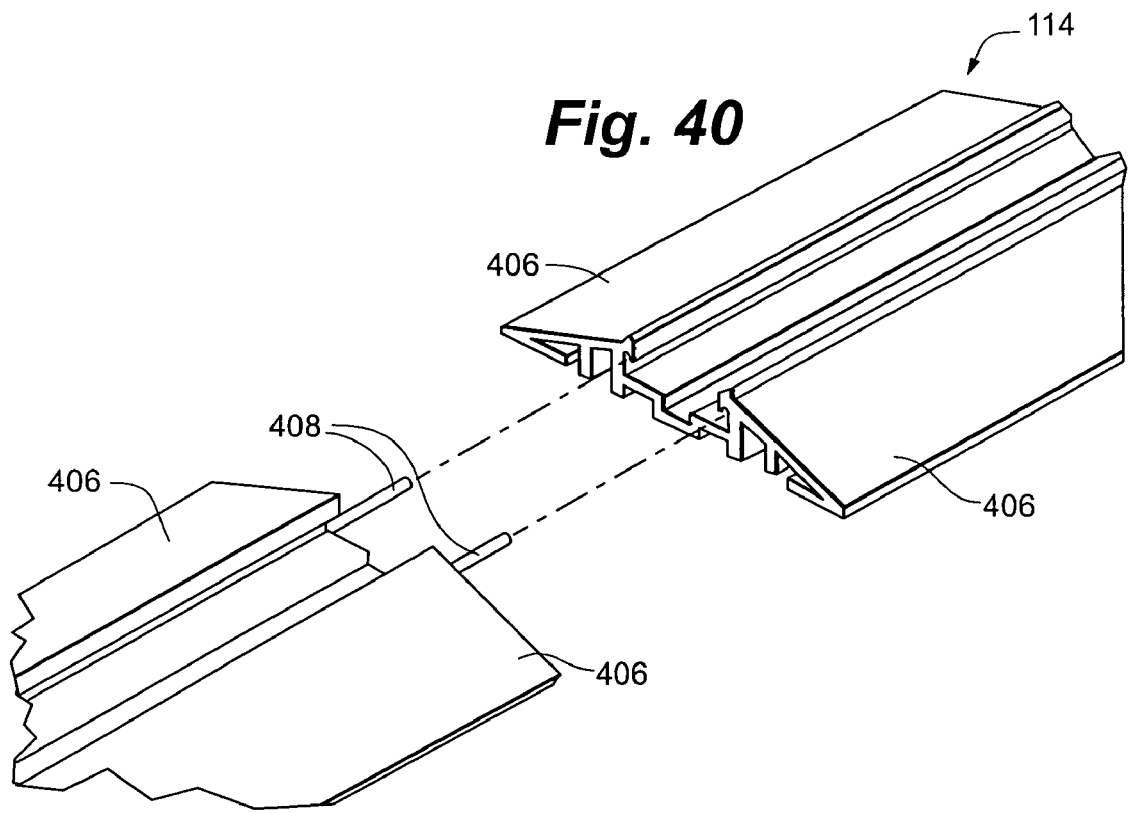
FIG. 40 is a perspective view of the track of a modular storage system according to an embodiment of the present invention.
Figure 41:
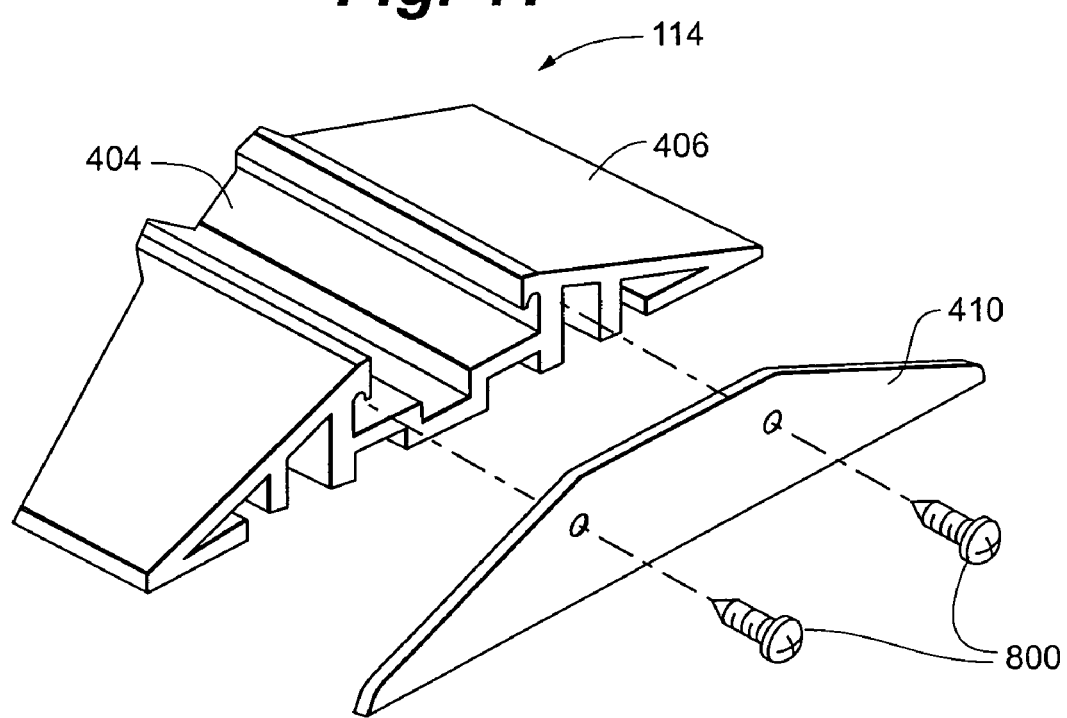
FIG. 41 is a perspective view of the track of a modular storage system according to an embodiment of the present invention.
Figure 42:
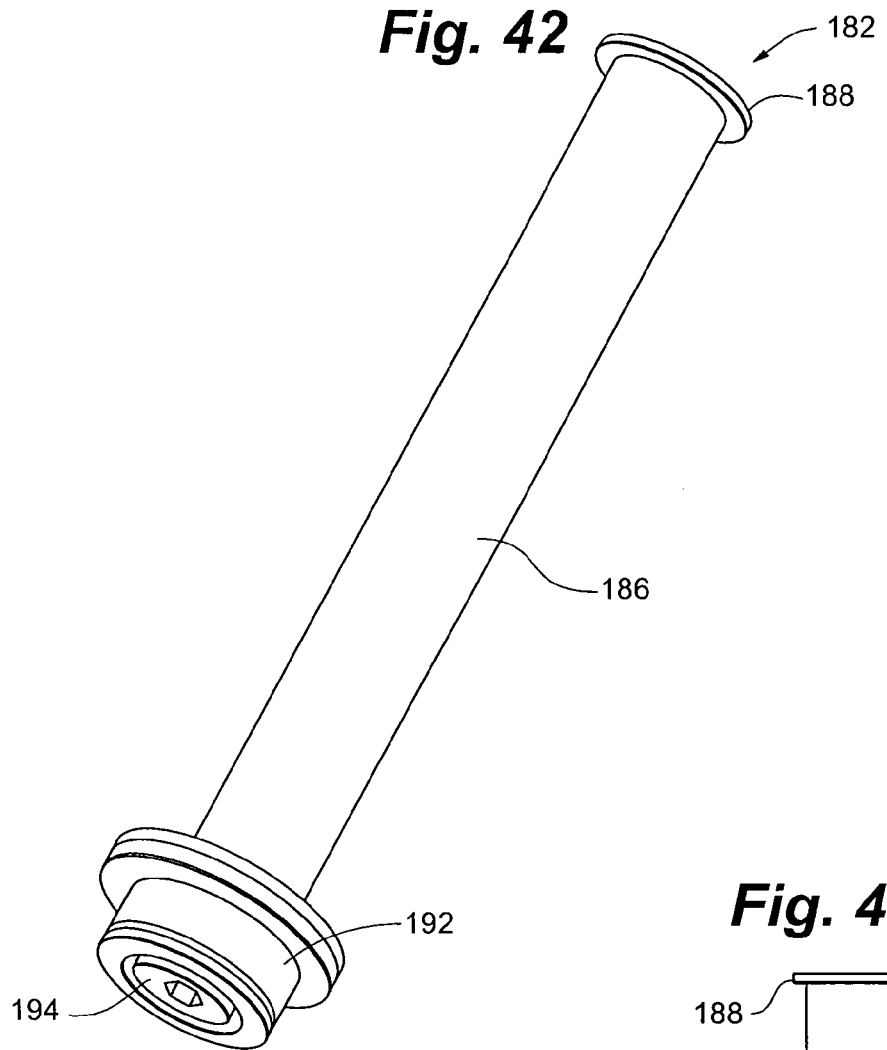
FIG. 42 is a perspective view of the track follower of a cart according to an embodiment of the present invention.
Figure 43B:
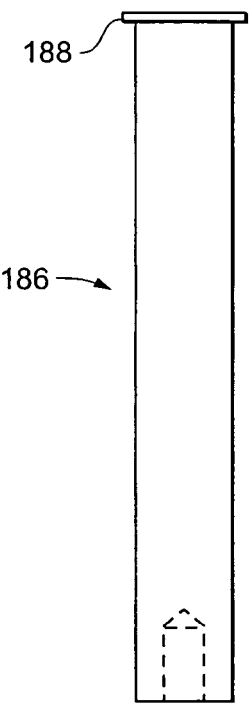
FIG. 43b is a side elevation view of the plunger of a track follower according to an embodiment of the present invention.
Figure 43A:
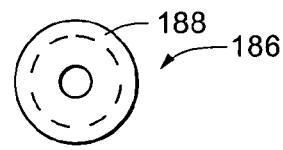
FIG. 43a is a top elevation view of the plunger of a track follower according to an embodiment of the present invention.
Figure 44A:
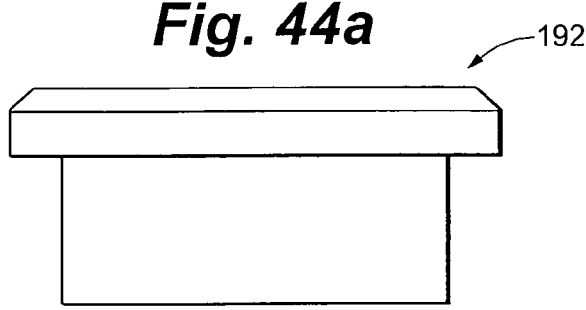
FIG. 44a is a side elevation view of the roller of a track follower according to an embodiment of the present invention.
Figure 45:
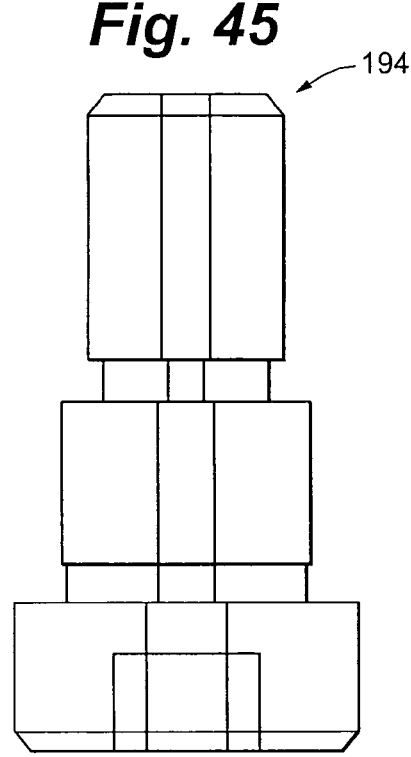
FIG. 45 is a cross-sectional view of the shoulder bolt of a track follower according to an embodiment of the present invention.
Figure 44B:
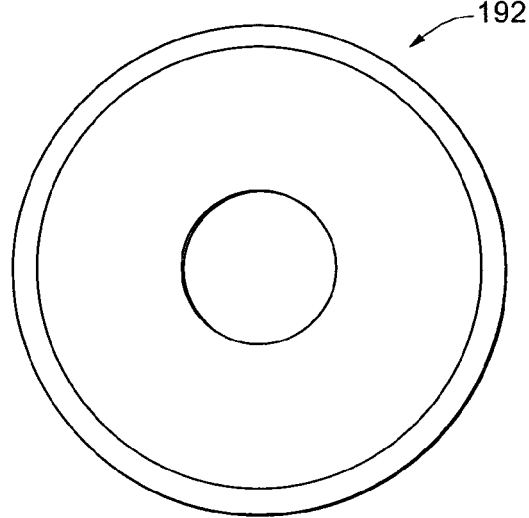
FIG. 44b is a top elevation view of the roller of a track follower according to an embodiment of the present invention.
Figure 46:
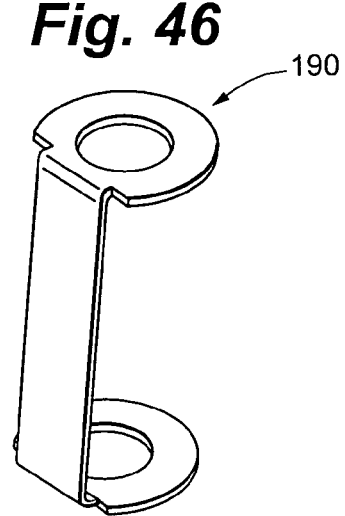
FIG. 46 is a perspective view of the plunger guide of a track follower according to an embodiment of the present invention.
Figure 44C:
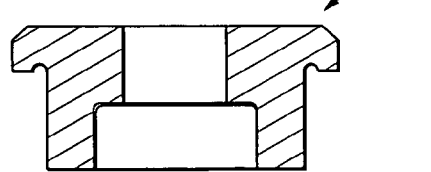
FIG. 44c is a cross-sectional view of the roller of a track follower according to an embodiment of the present invention.

As depicted in FIGS. 37-41, the track 114 of the modular storage system 110 generally comprises a track length 400, a track width 402, a channel 404 extending along the track length 400, and a pair of generally opposed ramped surfaces 406, the ramped surfaces 406 being perpendicular to the track length 400. In an embodiment of the present invention, the track length 400 comprises a unitary, integral track section. In another embodiment of the present invention, the track 114 comprises separate track sections connected using a plurality of spring pins 408. As depicted in FIGS. 39-40, to connect separate track portions, the spring pins 408 are inserted into a cross-section of the track 114 and the portions are then placed together.

For cross-sections of the track 114 that end in the middle of a room, i.e., not at a wall, a track cap 410 having dimensions that are substantially the same as the exposed cross-section is preferably connected to the track 114 using fasteners 800 to prevent the carts 112, 212 from moving beyond the track length 400. The track cap 410 also protects the exposed cross-section and provides a pleasing appearance. The track 14 is preferably constructed of extruded aluminum, although other materials such as steel could be used without departing from the spirit and scope of the invention. The spring pins 408 are preferably constructed of steel, although other materials such as aluminum, bronze, or various plastics could be used without departing from the spirit and scope of the invention. The track caps 410 are preferably constructed of 16-gauge steel, although other materials such as aluminum, alloys, graphite or composite materials or various plastics could be used without departing from the spirit and scope of the invention.

In an embodiment of the present invention, the track 114 can be installed into a newly formed surface. In this embodiment, the ramped surfaces 406 would not be required, as the channel 404 would be incorporated below the surface of a floor. The track 114 could also be installed on the floor of a vehicle, the floor of a trailer, or the floor of a storage system than includes a plurality of movable floors.

The Modular Cart

Figure 47:
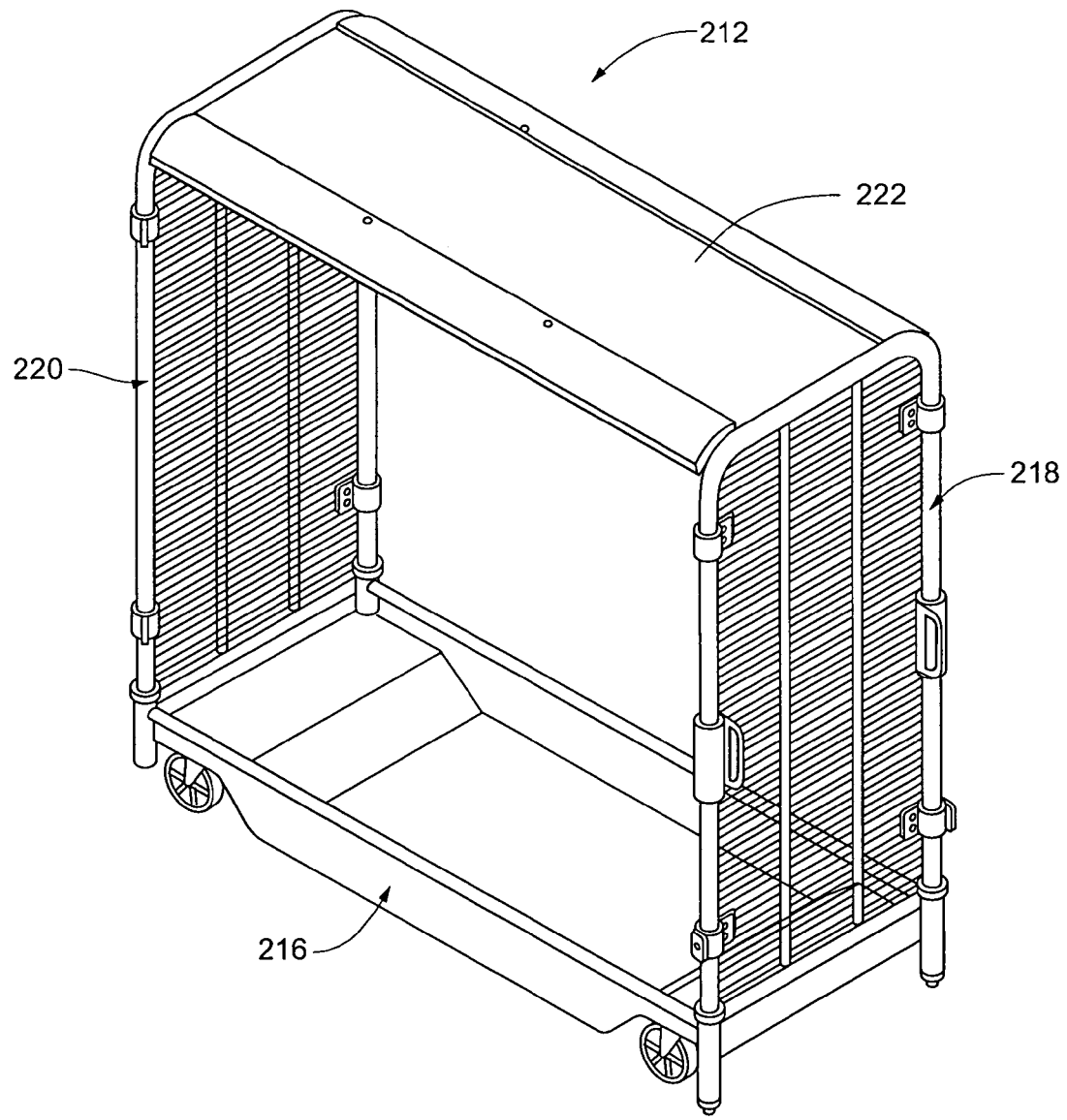
FIG. 47 is a top front perspective view of a cart according to an embodiment of the present invention.

Referring now to FIG. 47, a modular cart 212 in accordance with the present invention will be described. It will be noted that reference numerals in the 200's are generally used to denote the features and components of the modular cart 212. As shown in the embodiment depicted in FIG. 47, the modular cart 212 generally comprises a base 216, a top 222, a front end 218, and a rear end 220 generally opposed the front end 218, wherein the cart base 216, top 222, front end 218, and rear end 220 generally define a storage structure. The modular cart 212 according to this embodiment is designed to be selectively removable from the track 114 in the storage facility for purposes of transporting equipment and articles within the modular cart 212 to an off-site location. Once the logistical purposes of equipping a field unit at a location off-site and remote from the storage facility have been accomplished, the modular cart 212 can be reloaded with the equipment, gear and articles and returned to the storage facility where it can then be selectively re-engaged with the track 114 as part of the modular storage system 110.

As can be seen in FIG. 47, the ends 218, 220 and top 222 of this embodiment of the cart 212 are substantially similar to those as described in relation to the cart 112 according the first embodiment as described above. The above discussion of the ends 118, 120 and top 122 for the retained cart 112 is hereby incorporated with respect to the ends 218, 220 and 222 of the modular cart 212 according to this embodiment.

Figure 48:
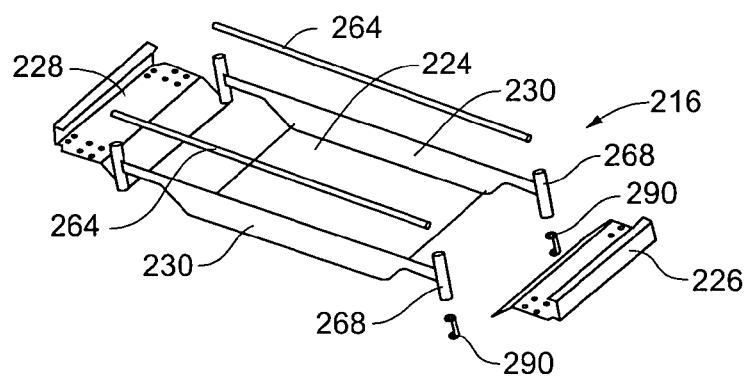
FIG. 48 is an exploded view of a base of a cart according to an embodiment of the present invention.
Figure 49:
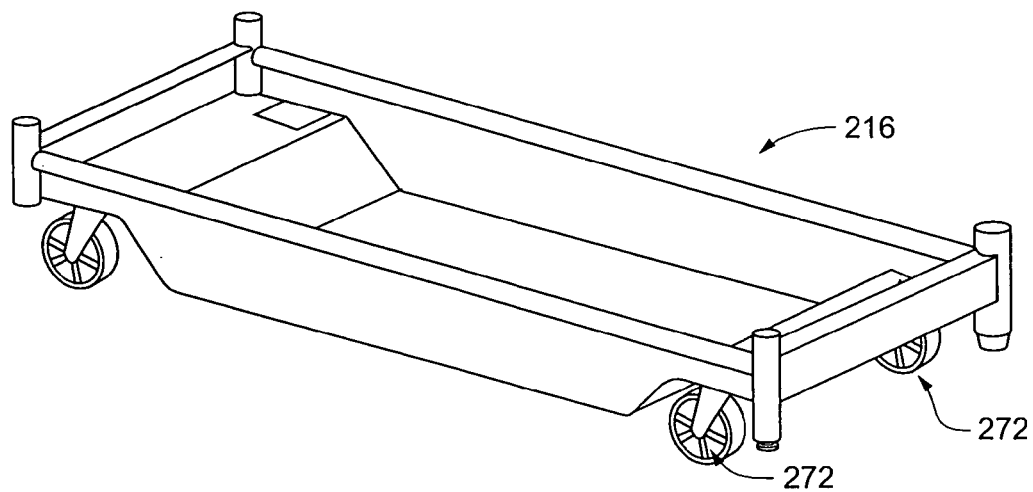
FIG. 49 is a top front perspective view of the base of a cart according to an embodiment of the present invention.

The cart base 216 of the modular cart, as depicted in FIGS. 48-49, comprises a bottom 224, a front plate 226 and a rear plate 228 connected to the bottom 224 using fasteners 800, and a pair of generally opposed sides 230a, 230b. The cart base 216 further preferably comprises a plurality of cylindrical frame posts 268 disposed on the sides 230a, 230b. The frame posts 268 preferably include a side slot 271 such that the sides 230a, 230b can be connected to the frame posts 268 by sliding the sides 230a, 230b into the slots 271. The cart base 216 also preferably comprises beams 264 connected to the sides 230a, 230b and extending substantially from the frame posts 268 proximate the front plate 226 to the frame posts 268 proximate the rear plate 228.

Figure 50A:
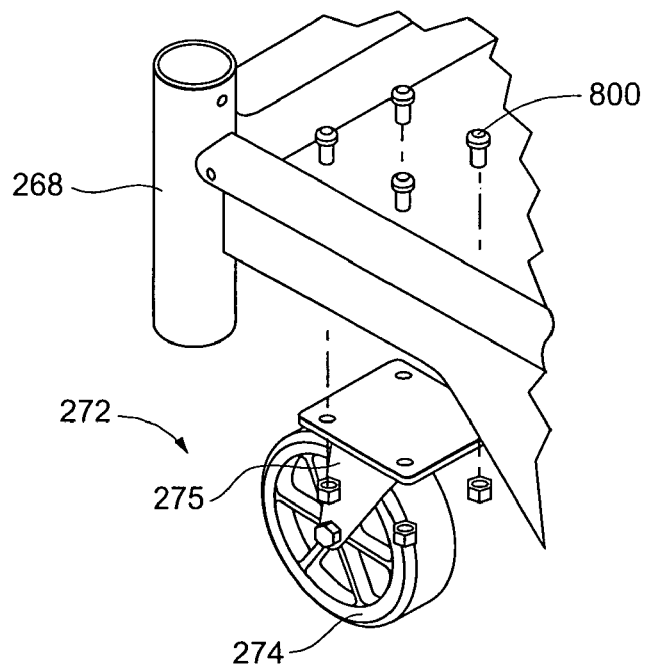
FIG. 50a is a perspective view of a wheel mechanism of a cart according to an embodiment of the present invention.
Figure 50B:
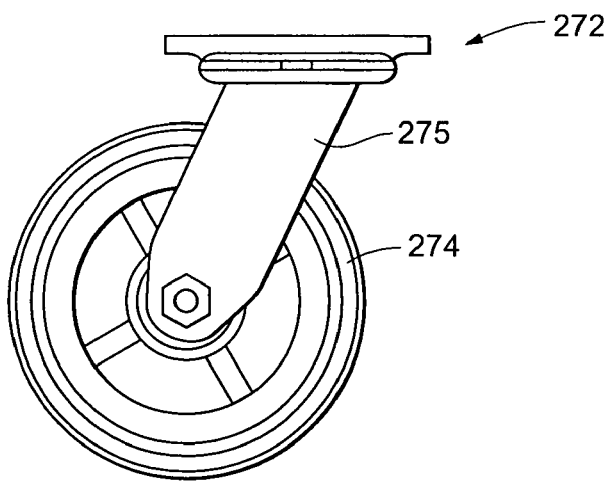
FIG. 50b is a side view of a wheel mechanism of a cart according to an embodiment of the present invention.
Figure 50C:
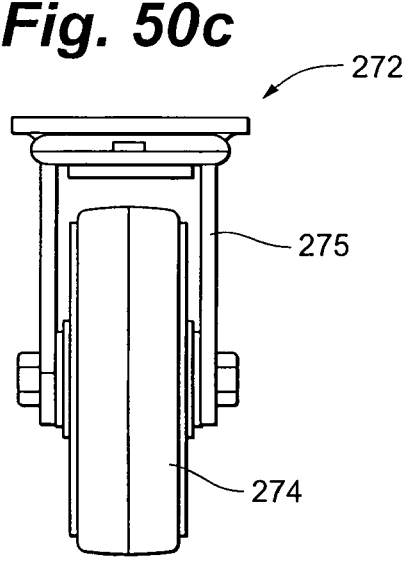
FIG. 50c is a front view of a wheel mechanism of a cart according to an embodiment of the present invention.
Figure 51:
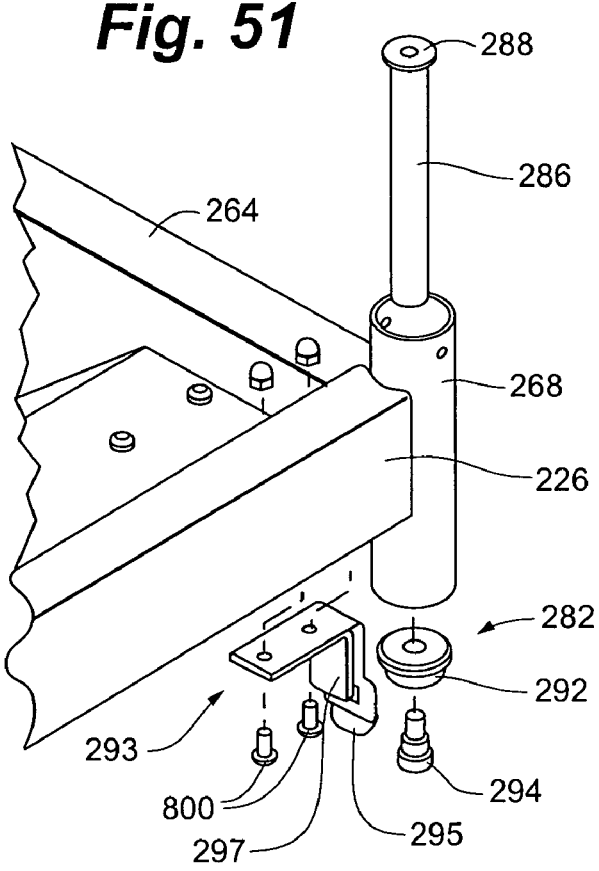
FIG. 51 is an exploded view of a track follower mechanism of a cart according to an embodiment of the present invention.
Figure 52:
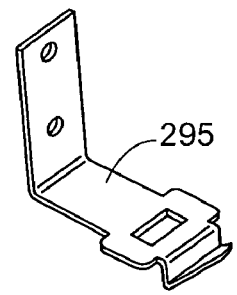
FIG. 52 is a perspective view of the plunger clip of a track follower according to an embodiment of the present invention.
Figure 53:
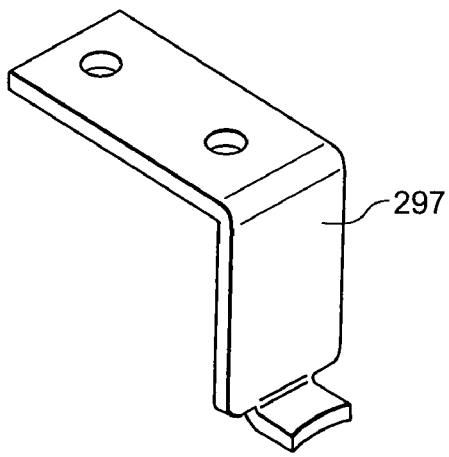
FIG. 53 is a perspective view of the backer of a track follower according to an embodiment of the present invention.
Figure 54:
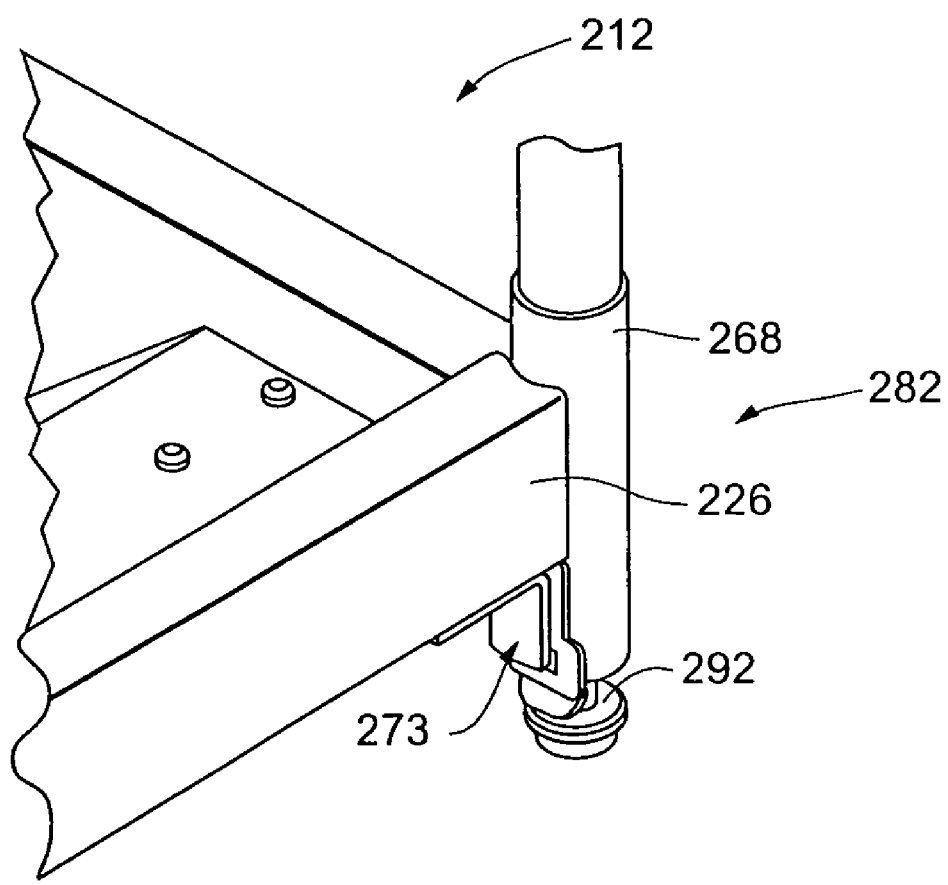
FIG. 54 is a perspective view of a track follower mechanism of a cart according to an embodiment of the present invention.

The bottom 224 generally includes a plurality of wheel mechanisms 272, each wheel mechanism 270 comprising a caster 275 and a wheel 274. As depicted in FIG. 50, the casters 275 are connected to the bottom 224 using fasteners 800. It is contemplated that the casters 275 be pivotable or static. Wheel mechanisms 272 according to the various embodiments of the present invention are preferably exemplified by part number 16-XA-06201-S from Tricker Caster & Wheel Sales in Fairbault, Minn. Again, any number of wheel mechanisms 272 greater than two could be provided on the cart base 216. The casters 275 are preferably constructed of steel, although other materials such as aluminum, alloys, graphite or composite materials could be used without departing from the spirit and scope of the invention. Wheels 274 according to this embodiment are preferably constructed of urethane, although other materials such as nylon or other similar polymer materials could be used without departing from the spirit and scope of this invention. In another embodiment of the present invention, the wheel 274 could be an axled wheel or ball wheel. The wheel mechanisms 227 are preferably 6" to 9" high, optimally 7.5" high, and the wheels 274 preferably have a diameter of approximately 4" to 8", optimally 6.0" and a width of approximately 1.5" to 3", optimally 2.0". The wheels 274 each have a load rating of at least 500-100 pounds, optimally 850 pounds. As can be seen in FIG. 50a, the wheels 274 preferably comprise a concave cross-section in which the diameter at the center of the wheel is slightly larger than the diameter at the edges of the width of the wheel.

The cart base 216 also preferably comprises a plurality of track follower mechanisms 282. The track follower mechanisms 282 are substantially the same as the track follower mechanisms 182 described above. However, track follower mechanisms 282 further comprise a locking mechanism 293 as depicted in FIGS. 51-54. The locking mechanism 293 allows a user to lock the track follower 284 up in a retained position when the modular cart 212 is removed from the track 114 in the storage facility. As depicted in FIGS. 51-54, the locking mechanism 293 preferably comprises a lever arrangement with a plunger clip 295 and a backer 297, both the plunger clip 295 and backer 297 preferably being L-shaped, the plunger clip 295 and backer 297 being connected to the underside 238 using fasteners 800. The plunger clip 295 and backer 297 are preferably constructed of steel, although other materials such as aluminum, alloys, graphite or composite materials or various plastics could be used without departing from the spirit and scope of this invention. Although the locking mechanism 293 is preferably described in terms of the lever arrangement as described, it will be appreciated by those skilled in the art that numerous other locking mechanisms could be implemented to secure the track follower mechanism 282 in a retained position, such as a pin and aperture arrangement, a friction fit or wedge arrangement, a screw arrangement, a slot and ledge arrangement or the like.

Although the track follower mechanism 282 and locking mechanism 293 are preferably disposed on the front end 218 of the modular cart 220, it will be recognized that alternate embodiments are also contemplated by the present invention. For example, in an alternate embodiment, the track 114 and corresponding track follower mechanisms 282 could be positioned proximate the rear end 220 of the carts 212 with appropriate coupling and linkages could be provided for mechanical triggering the track follower mechanism 282 and locking mechanism 293 from the front end 218 of the cart 212. In another embodiment, the track followers 282 could be positioned at any position along the length of the cart 212, for example, in the middle of the length of the cart 112 corresponding to placement of the track 114, and electronic powered controls, such as battery operated solenoids, could be used to remotely operated the track follower mechanism 282 and locking mechanism 293.

Trusses, Hangers Stackers and Shelves

Referring now to FIGS. 69-73, the carts 112, 212 preferably include a truss system 364 having a truss or rod 366 and a truss hanger 376. The truss 366 comprises a truss hanger 376 and preferably comprises a first truss member 370 and a second truss member 372. The second truss member 372 is preferably shorter in length than the first truss member 370. The truss 366 can be selectively positioned on the wire-grille panel 300 using a plurality of truss hangers 376. The truss hangers 376 have a body 378 and a plurality of engagement members 380 disposed perpendicular to the body 378. The distance between each of the engagement members 380 generally corresponds to the spacing in the wire members on the wire-grille panel 300. Once a user has selected a position for the truss hanger 376, the hanger 376 can be positioned on, and engaged with, the wire-grille panel 300. A truss hanger 376 positioned on, and engaged with, a wire-grille panel 300 can be seen in FIG. 69.

Once a pair of truss hangers 376a, 376b are engaged with opposed front and end wire-grille panels 300a, 300b, the truss 366 can be placed onto the truss hangers 376. The body 378 of the truss hanger 376 preferably comprises a first truss member slot 382 and a second member slot 384, which the first truss member 370 and second truss member 372 fit, respectively. Including a first truss member 370 and second truss member 372 provides many benefits. For example, when helmet hangers 502 or pad hangers 504 populated with equipment and hung on the truss 366, the populated hangers will have a center of gravity that is below the second truss member. When a cart 12 having these populated hangers is moved along the track 14, the hangers are likely to swing back and forth in a pendulum motion that is parallel to the movement of the cart. The swinging hangers will make it more difficult to move the cart 12 as the momentum of the cart will be constantly changing due to the swinging hangers. By providing a first truss member 370 and second truss member 372, the populated hanger will be prevented from excessive swinging as the combined height of the truss members 370, 372 gives more height and surface area for the hangers to contact and thus more height and surface area to prevent swinging of the hangers. Alternatively, a single truss member could be used if the height was sufficient to provide the same height and surface area. The truss members 370, 372 are preferably constructed of tubular steel, although other materials such as aluminum, graphite or composite materials could be used without departing from the spirit and scope of this invention. The hangers 376 are preferably constructed of steel, although other materials such as aluminum, graphite or composite materials or various plastics could be used without departing from the spirit and scope of this invention.

Figure 74:
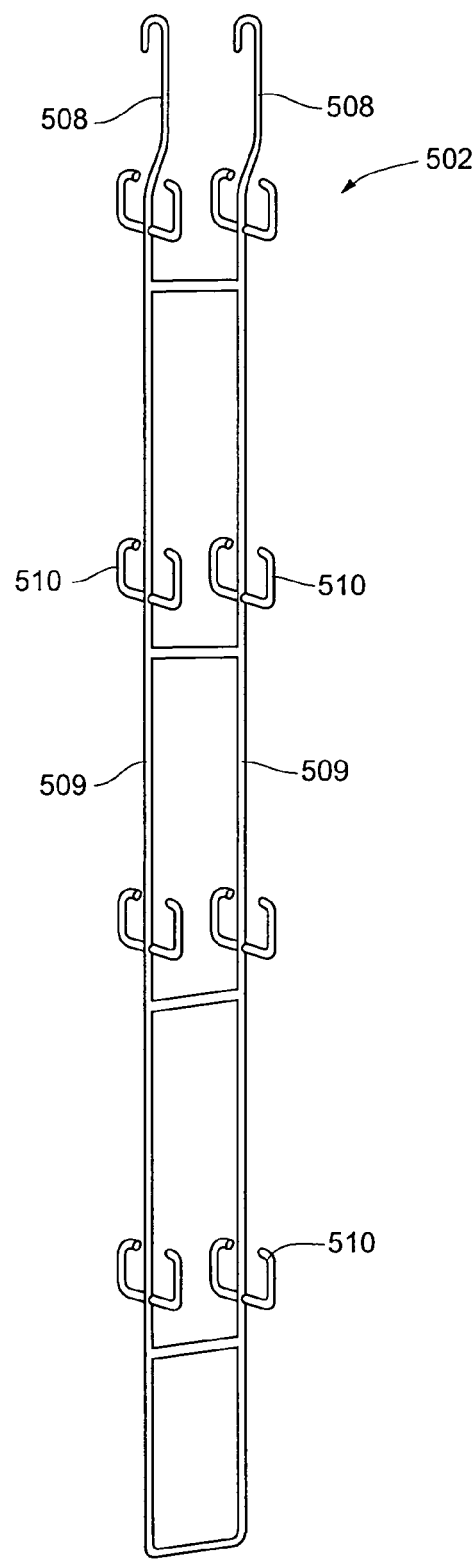
FIG. 74 is a perspective view of a helmet hanger of a cart according to an embodiment of the present invention.

The present invention includes a number of means for hanging equipment, such as football helmets and football shoulder pads. It will be noted that reference numerals in the 500's are generally used to denote the features and components of hangers and stackers adapted for use in the modular storage system 110 of the present invention. A helmet hanger 502 can be seen in FIG. 74. The helmet hanger 502 comprises a plurality of truss hooks 508 and a pair of generally opposed helmet hanger members 509. The helmet hanger 502 further comprises a plurality of helmet hooks 510 disposed vertically along the pair of generally opposed hanger members 509. As depicted in FIG. 75, the helmet hanger 502 is hung on the truss 366 and the helmet hanger 502 can then be populated with helmets. The helmet hanger 502 is preferably constructed of wire steel, although other materials such as graphite or composite materials or various plastics could be used without departing from the spirit and scope of this invention.

Figure 78:
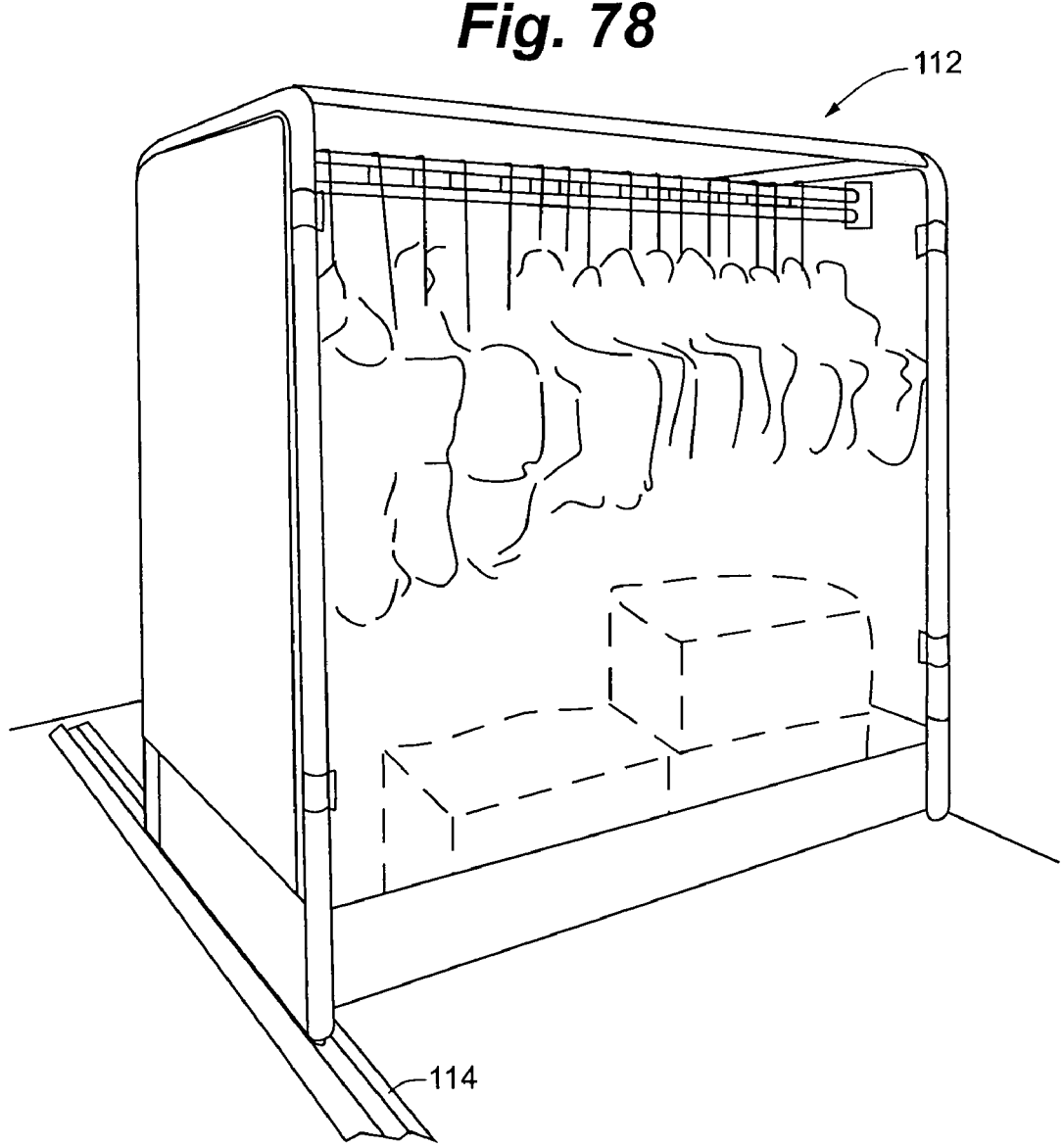
FIG. 78 is a perspective view of a cart having fully populated pad hangers according to an embodiment of the present invention.
Figure 79:
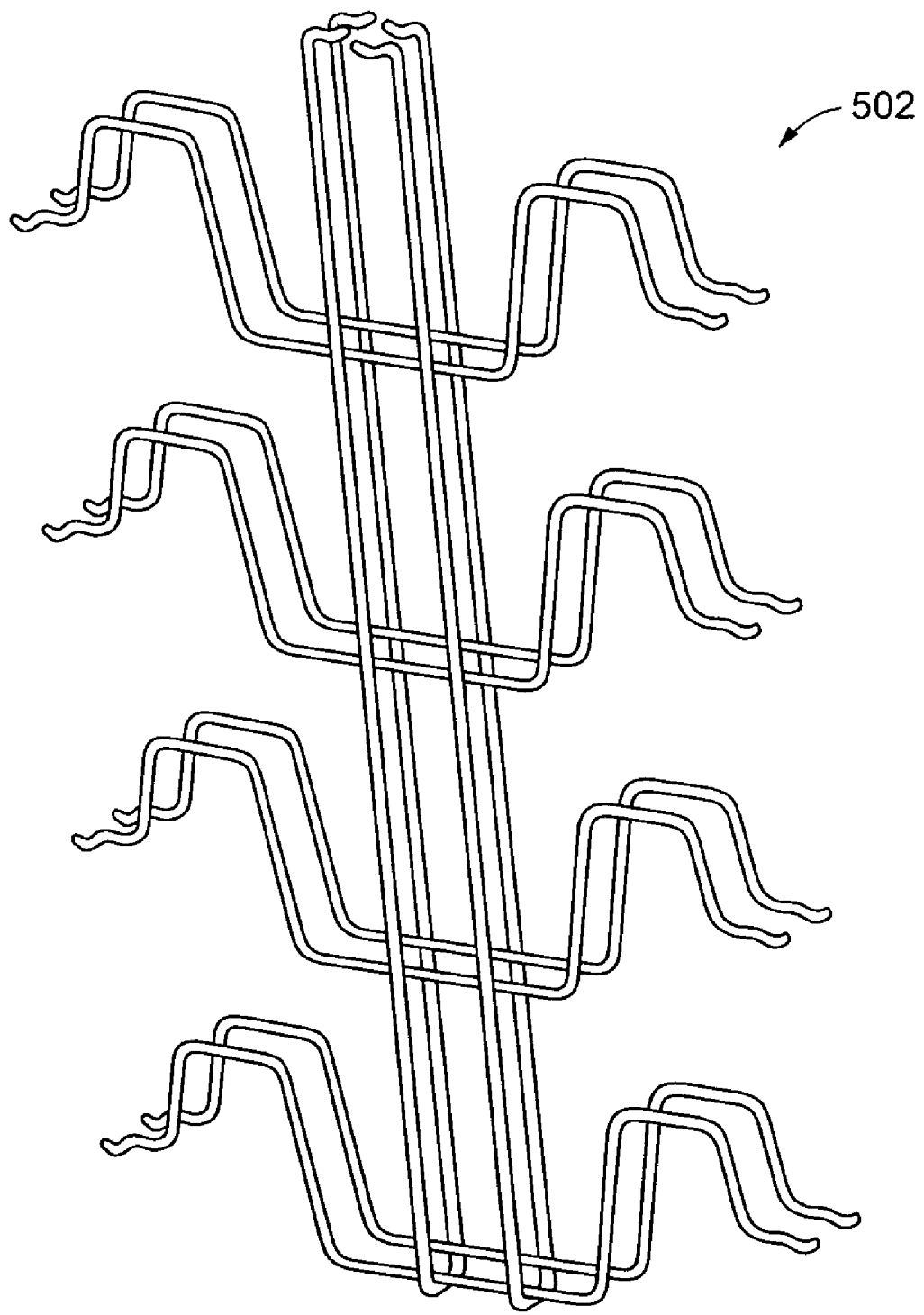
FIG. 79 is a perspective view of a hanger of a cart according to an embodiment of the present invention.
Figure 80:
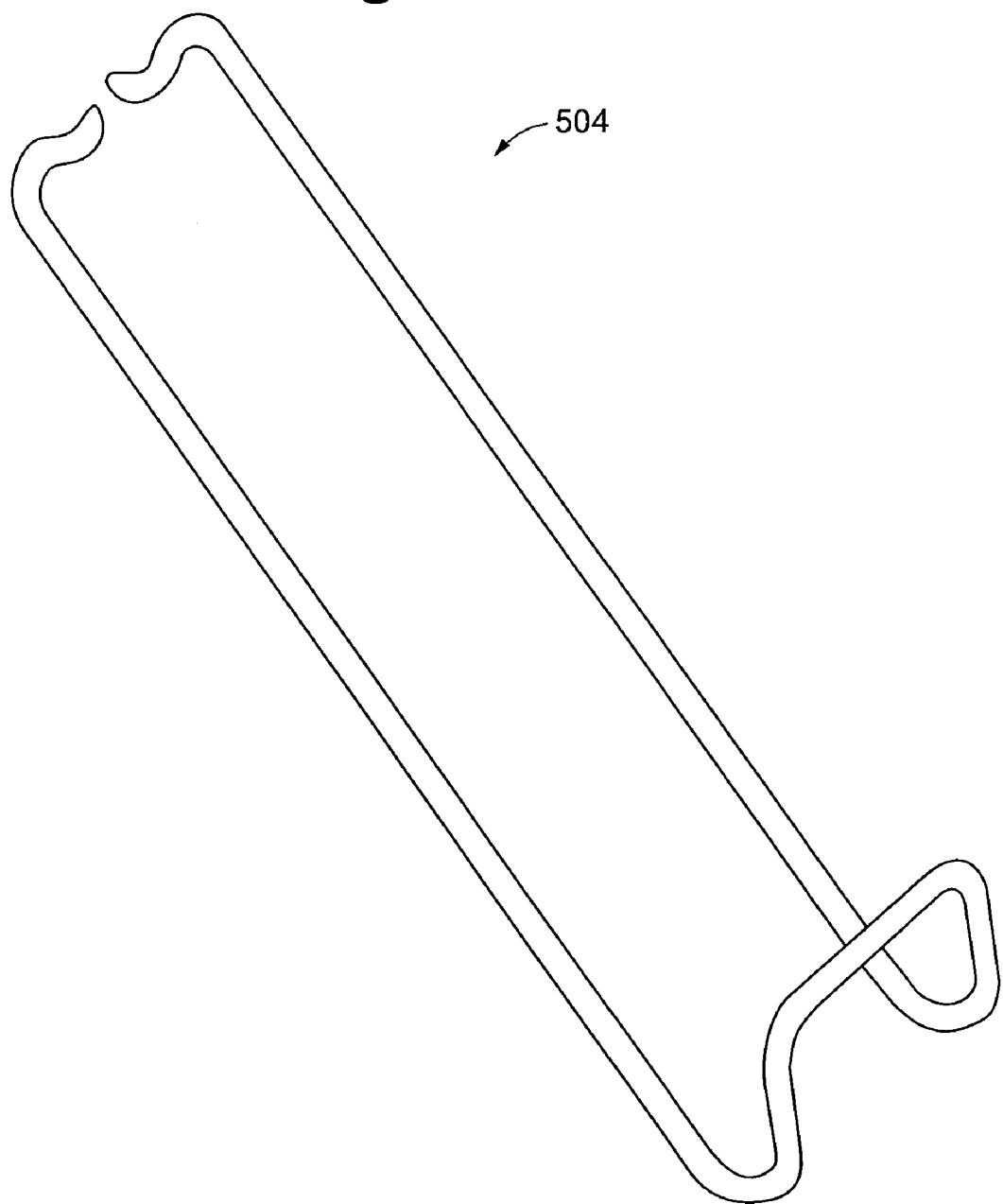
FIG. 80 is a perspective view of a hanger of a cart according to an embodiment of the present invention.
Figure 81:
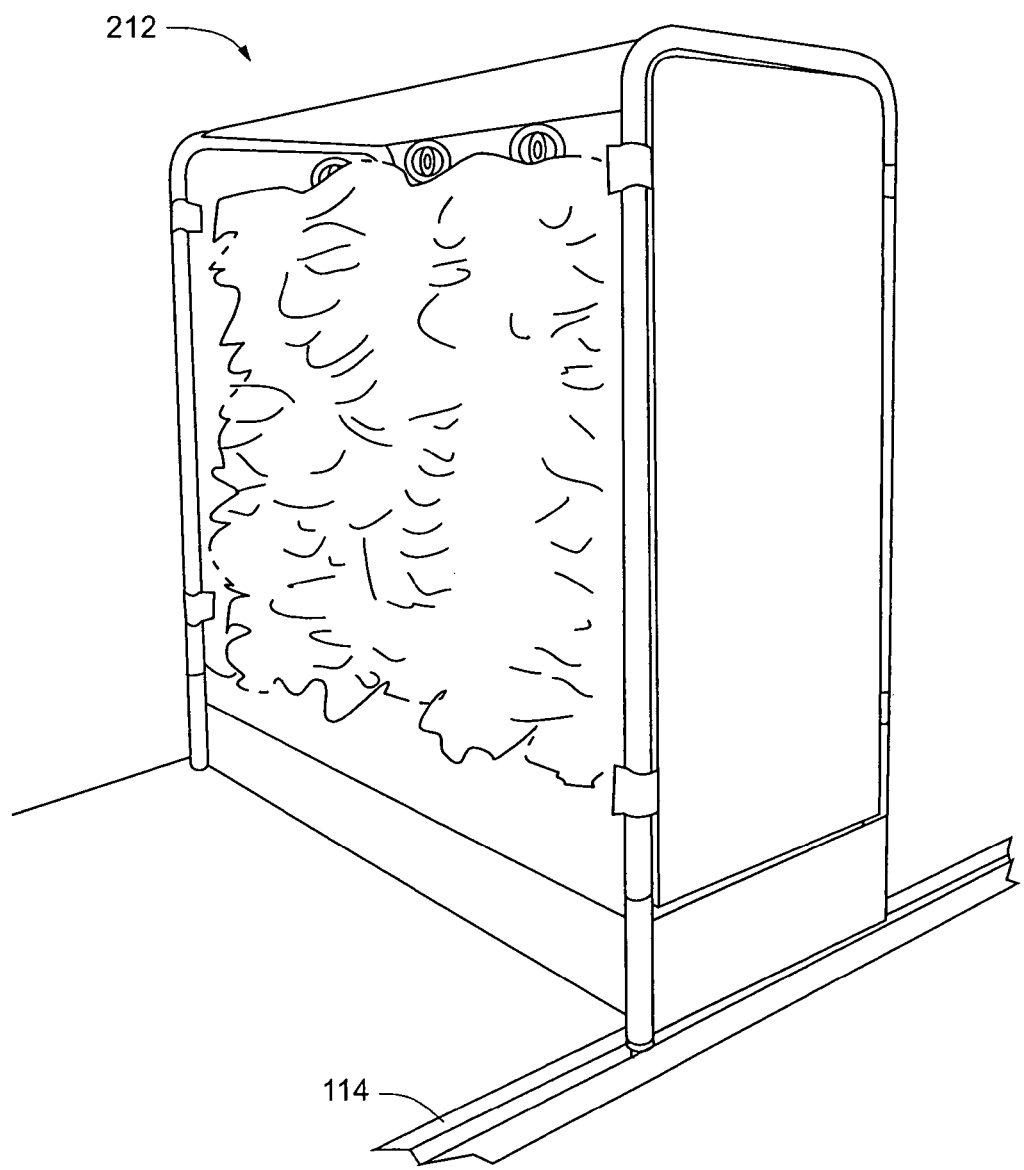
FIG. 81 is a perspective view of a cart having fully populated pad stackers according to an embodiment of the present invention.

Another means for hanging equipment includes a pad hanger 504. Long and short pad hangers 504a, 504b can be seen in FIGS. 76-77. The pad hangers 504a, 504b comprise a truss hook 512 connected to a pad hanger member 513. The pad hangers also comprise a pad hook 514 generally opposed the truss hook 512. As depicted in FIG. 78, the pad hanger 504 is hung on the truss 366 and the pad hanger 504 can then be populated with pads. The pad hanger 504 is preferably constructed of wire steel, although other materials such as graphite or composite materials or various plastics could be used without departing from the spirit and scope of this invention. Alternative pad and helmet hangers 503 can be seen in FIGS. 79-80.

In one embodiment, the present invention preferably includes means for stacking equipment within the storage space of the carts 112, 212. A pad stacker 506 can be seen in FIGS. 81-87. The pad stacker 506 preferably comprises a stacker base 516, a stacking tower 518, a pad support 520, and a support channel 522. The stacker base 516 comprises a pair of generally opposed stacker frames 524a, 524b connected to a stacker frame cross tube 526. The stacker base 516 further comprises a pair of stacker handles 528a, 528b connected to the pair of generally opposed stacker frames 524. The stacker base 516, stacking tower 518, and support channel 522 are preferably constructed of steel, although other materials such as aluminum, alloys, graphite or composite materials or various plastics could be used without departing from the spirit and scope of this invention. The pad support 520 is preferably constructed of vacuum formed ABS, 0.125" thick, with a haircell finish, although other materials could be used without departing from the spirit and scope of this invention.

The stacking tower 518 comprises a short tube loop 530 and a long tube loop 536, the tube loops 530, 536 connected at a bottom end 532 to a tower channel 531. At least one of the tube loops 530, 536 comprises a plurality of pin apertures 534. The pad support 520 comprises a pad support base 538 and a pad support member 540. The support channel 522 comprises a support plate 542 and a support channel member 544 connected to the support plate 542. The pad support 520 is then connected to the support plate 542 of the support channel 522.

To assemble the pad stacker 506, the stacking tower channel 531 is connected to the stacker frame cross tube 526 using fasteners 800. A pin is then inserted into one of the pin apertures 534 and the support channel 522 and pad support 520 are then placed onto the stacking tower 518 and lowered down until it rests upon the pin.

Figure 82:
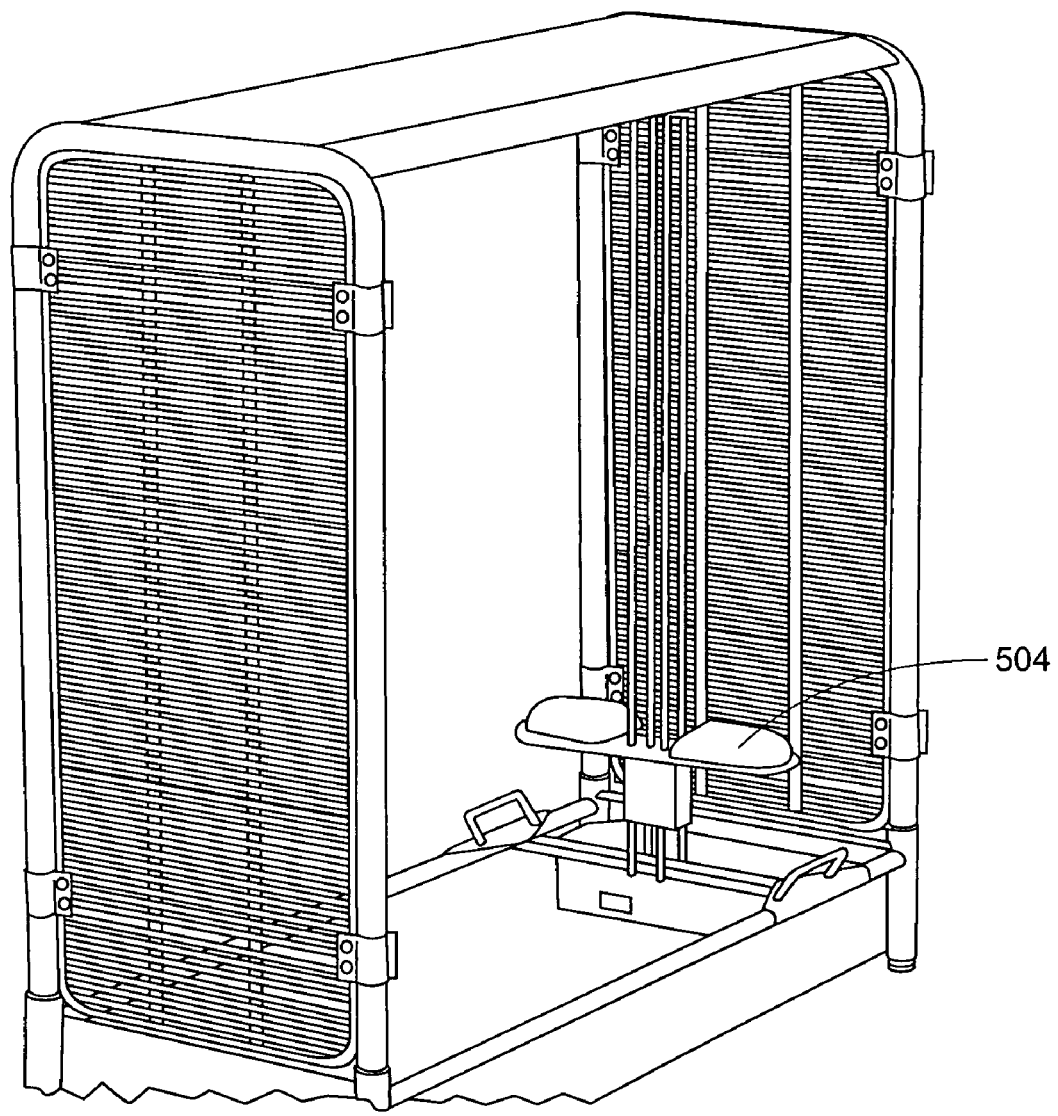
FIG. 82 is a perspective view of a cart having an unpopulated pad stacker according to an embodiment of the present invention.
Figure 83:
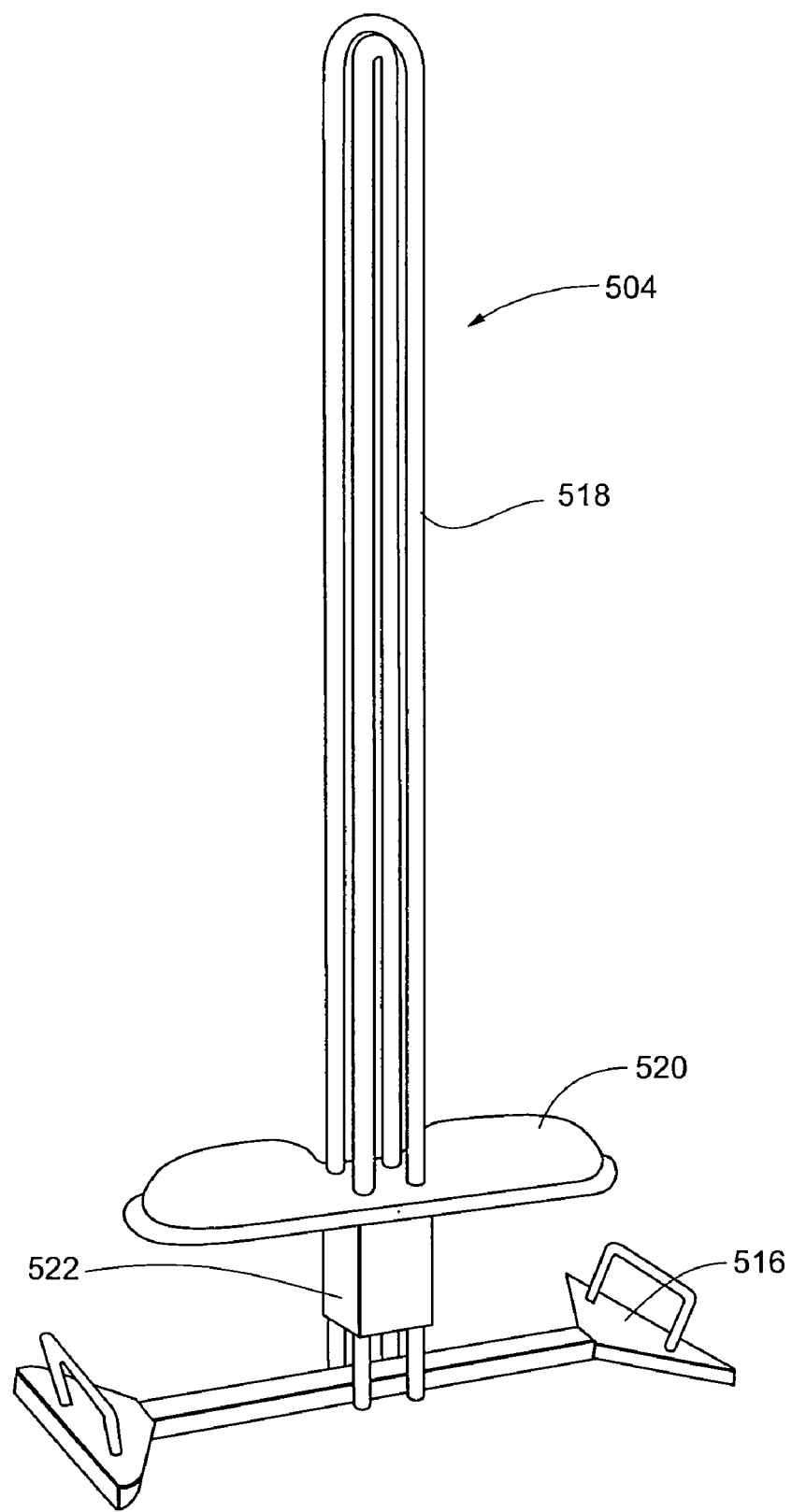
FIG. 83 is a perspective view of a pad stacker of a cart according to an embodiment of the present invention.
Figure 84A:
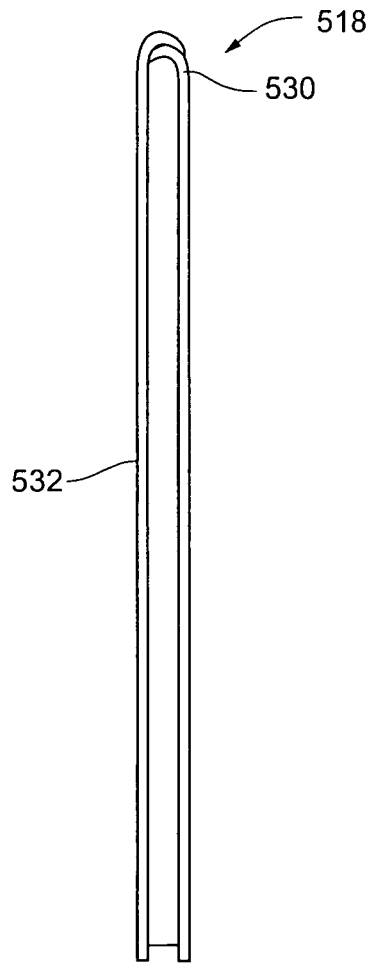
FIG. 84a is an elevation view of a pad tower of a pad stacker of a cart according to an embodiment of the present invention.
Figure 84B:
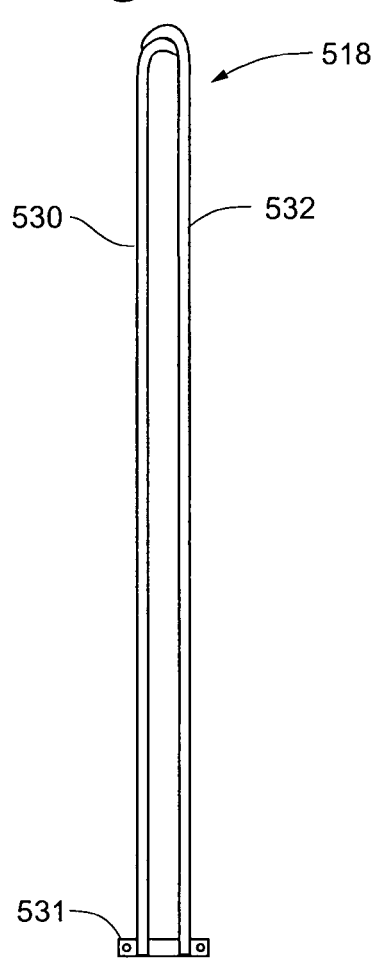
FIG. 84b is bottom elevation view of a pad tower of a pad stacker of a cart according to an embodiment of the present invention.
Figure 84D:
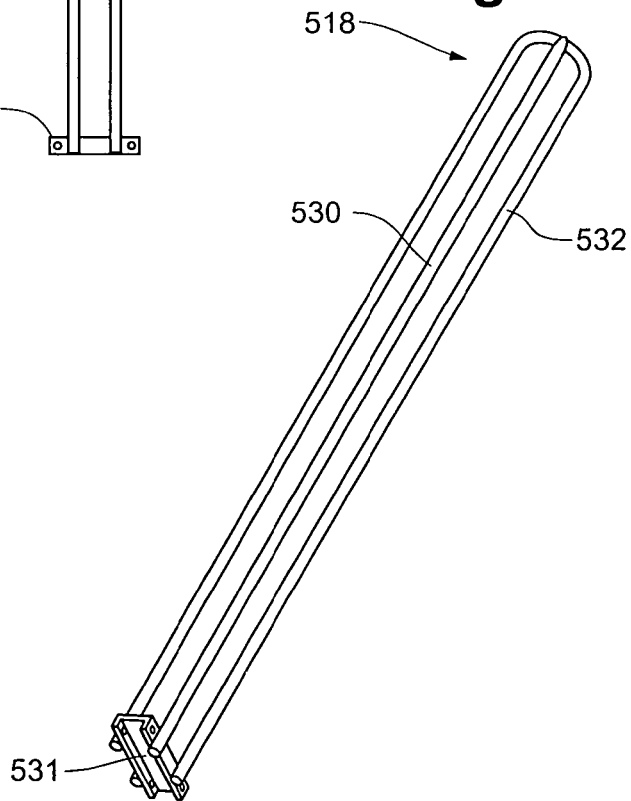
FIG. 84d is a perspective view of a pad tower of a pad stacker of a cart according to an embodiment of the present invention.
Figure 84C:
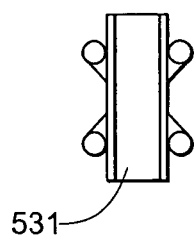
FIG. 84c is an elevation view of a pad tower of a pad stacker of a cart according to an embodiment of the present invention.
Figure 87A:
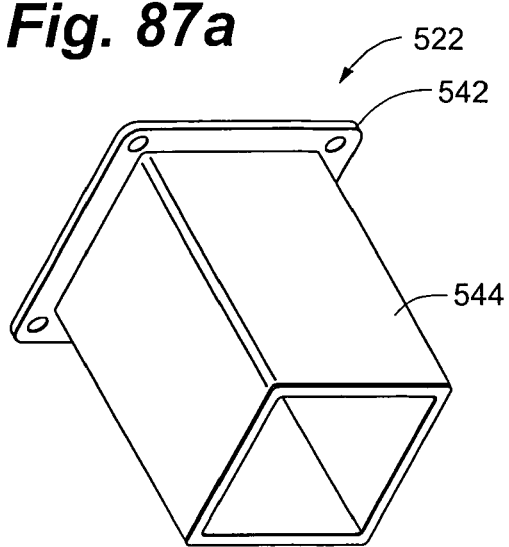
FIG. 87a is a perspective view of a support channel of a pad stacker of a cart according to an embodiment of the present invention.
Figure 87B:
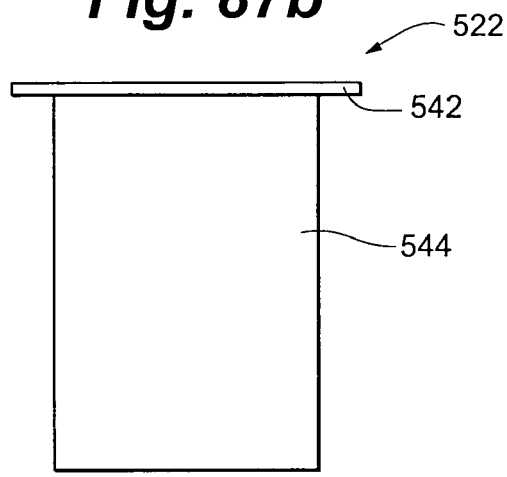
FIG. 87b is a side elevation view of a support channel of a pad stacker of a cart according to an embodiment of the present invention.
Figure 87C:
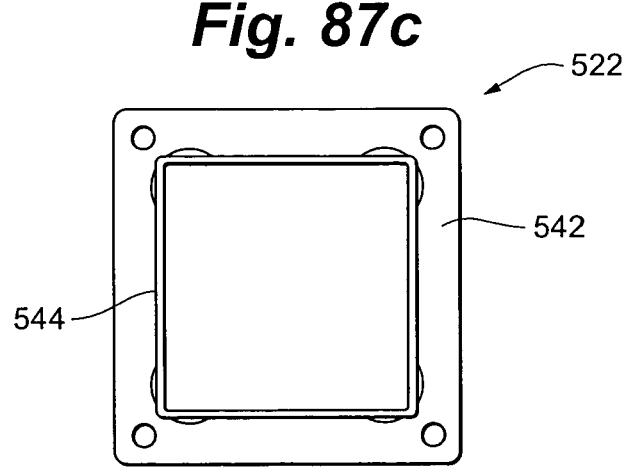
FIG. 87c is a top elevation view of a support channel of a pad stacker of a cart according to an embodiment of the present invention.

Once the pad stacker 506 has been assembled, the pad stacker 506 can be placed onto the cart base 116 or 216 of a cart. As can be seen in FIG. 82, the pad stacker 506 is depicted in a cart 112. The stacker frames 524 are supported by the sides 130a, 130b of the cart base 116. A pad stacker 506 populated with pads can be seen in FIG. 81. In an embodiment of the present invention, the pad stacker 506 comprises wheels. When the pad stackers 506 are fully populated with pads, the pad stackers 506 will very likely be extremely heavy. Those involved with athletics will appreciate that a pad stacker 506 according to this embodiment can be moved along a surface without the need of lifting the pad stacker 506 off of the ground. When the pad stackers 506 have been populated and placed into the cart 12, each of the carts 12 can preferably hold more than eighty sets of shoulder pads.

As depicted in FIG. 3, the cart 112 according to an embodiment of the present invention also includes a shelf system 386. A shelf 388 can be selectively positioned on the wire-grille panel 300 using a plurality of shelf hangers 390. The shelf hangers 390 have a body 392 and a plurality of engagement members 394 disposed perpendicular to the body 392. The distance between each of the engagement member 394 generally corresponds to the spacing in the wire members on the wire-grille panel 300. Once a user has selected a position for the shelf hanger 390, the shelf hanger 390 can be positioned on, and engaged with, the wire-grille panel 300. Once a pair of shelf hangers 390 is engaged with opposed front and end wire-grille panels 300, the shelf 388 can be placed onto the shelf hangers 390. The shelf 388 is preferably constructed of sheet or wire steel, although other materials such as aluminum or plastic could be used without departing from the spirit and scope of this invention.

Installation

When the track is installed in a room not near the wall, an island stop 354 may be needed to create the bounds of the storage facility. In this type of embodiment, the storage facility will be generally defined by the track length 342 and the overall length of the carts as they are moved along the track 114. When the track is installed in an area not near a wall, track end caps 350 should be used to prevent damage to the exposed cross section of the track 14 and also to provide a more pleasing appearance.

Once the modular storage system 110 of the present invention has been installed in a storage facility, the carts 112, 212 can be placed into the storage facility. In a preferred embodiment, a plurality of carts 112, 212 will be used, the plurality of carts comprising both retained carts 112 and modular carts 212. To place the retained carts 112 into the storage site, they generally would have to be lifted into the storage facility and positioned such that the track followers 184 are directly above the channel 404 of the track 114. Once the retained carts have been positioned, the track followers 184 should be allowed to engage with the channel 404 of the track 114. Once the track followers 184 engage with the channel 404 of the track 114, the retained carts can then be manually moved within the storage facility in a direction along the track 114.

To place modular carts 212 in the storage facility, the modular carts 212 can be manually moved over the track 14. By manually providing the modular cart 212 with enough momentum, the wheels 274 will roll over the ramped surfaces 406 of the track. The modular cart can then be placed so that the track followers 284 are directly above the channel 404 of the track 114. Once the modular carts 212 have been positioned, the track followers 284 should be allowed to engage with the channel 404 of the track 114. To do this, the plunger clip 295 and backer 297 should be pulled away from the track follower 284 so that the track follower can move freely. Once this is done, the track follower 284 will engage with the channel 404 of the track 114. The modular carts 212 can then be manually moved within the storage facility in a direction along the track 114.

In a preferred embodiment, there is preferably at least a portion of the track 114 that does not include a cart 112, 212. By having such a space, the carts 112, 212 can be moved along the track 114 and different carts 112, 212 can then be accessed proximate the portion not including a cart 112, 212.

In a preferred embodiment of the present invention, comprising modular carts 212 and retained carts 112, the modular carts 212 could contain uniforms and equipment in off-season use or uniforms and equipment that is not need to be taken out of the storage facility in the cart. This type of uniforms and equipment could be retrieved by individuals or taken to the individuals. The retained carts 112 could contain equipment that is needed out of the storage site 11 and easier to transport in a cart 12. Such equipment could include game uniforms and equipment. A modular cart 212 such as this could be simply loaded onto a trailer or into a vehicle and transported to a game site.

When the at least one track follower mechanism 282 on modular carts 212 is selectively engaged with the track 114, these carts 212 are operably retained by and movable only in a direction generally parallel to the track 114 permitting the cart to be selectively positioned within a storage position that is generally side-by-side with an adjacent cart 112, 212 along the track. In this position, the contents of the carts 112, 212 are accessible position as the carts 112, 212 are generally spaced apart with adjacent carts along the track.

Figure 88:
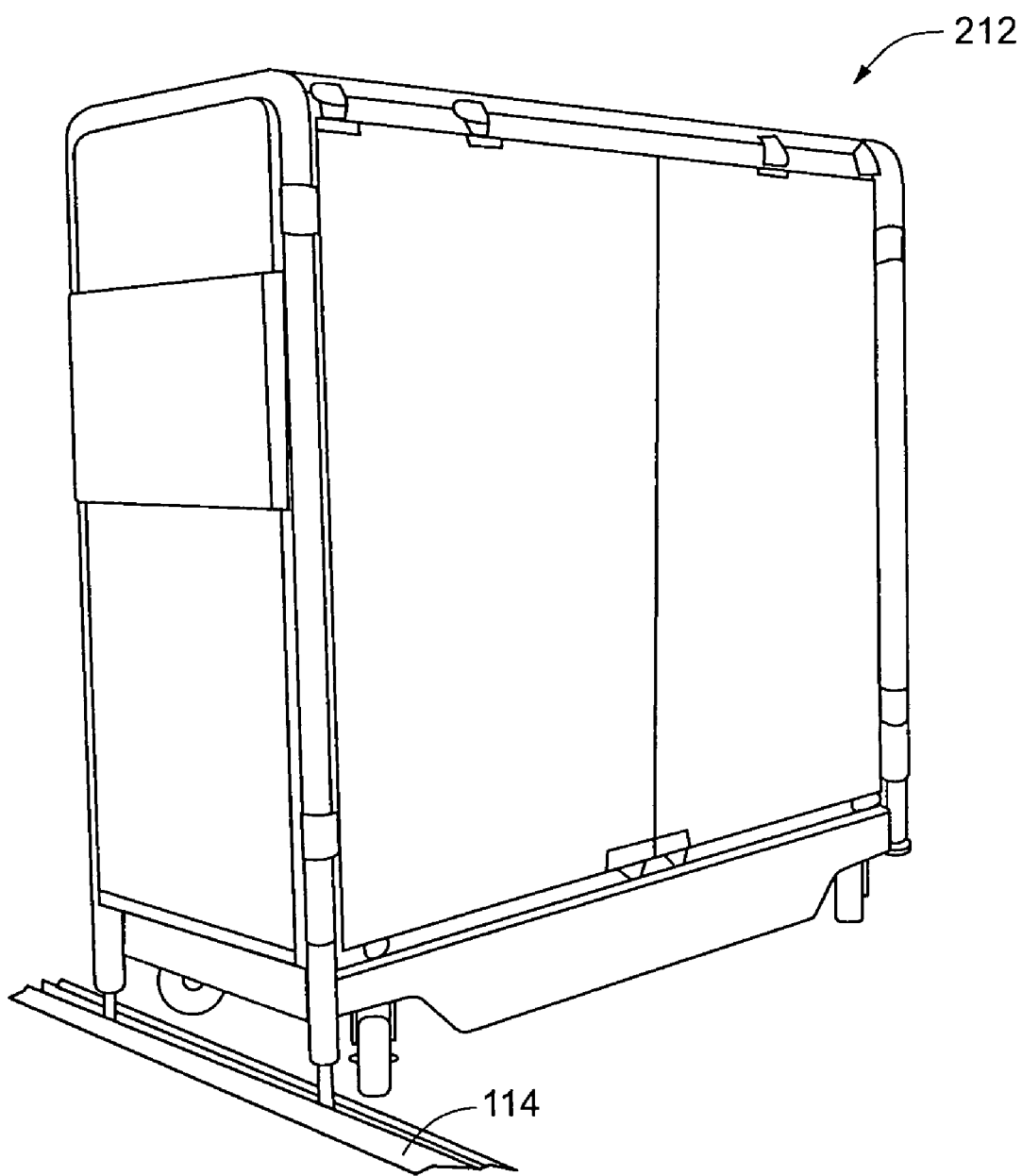
FIG. 88 is a perspective view of a cart according to an embodiment of the present invention.
Figure 89:
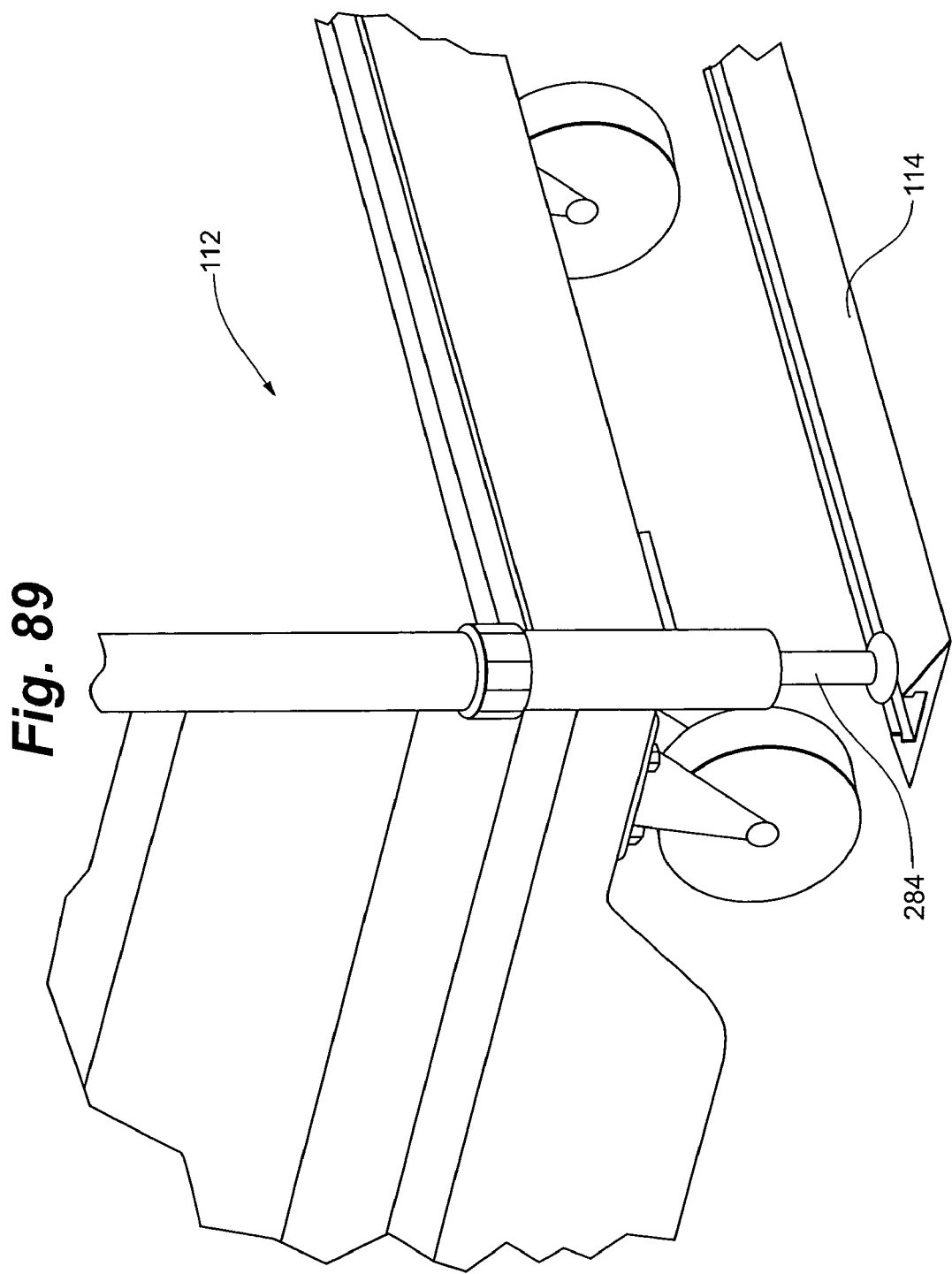
FIG. 89 is a perspective view of the track follower of a cart and a track according to an embodiment of the present invention.
Figure 90:
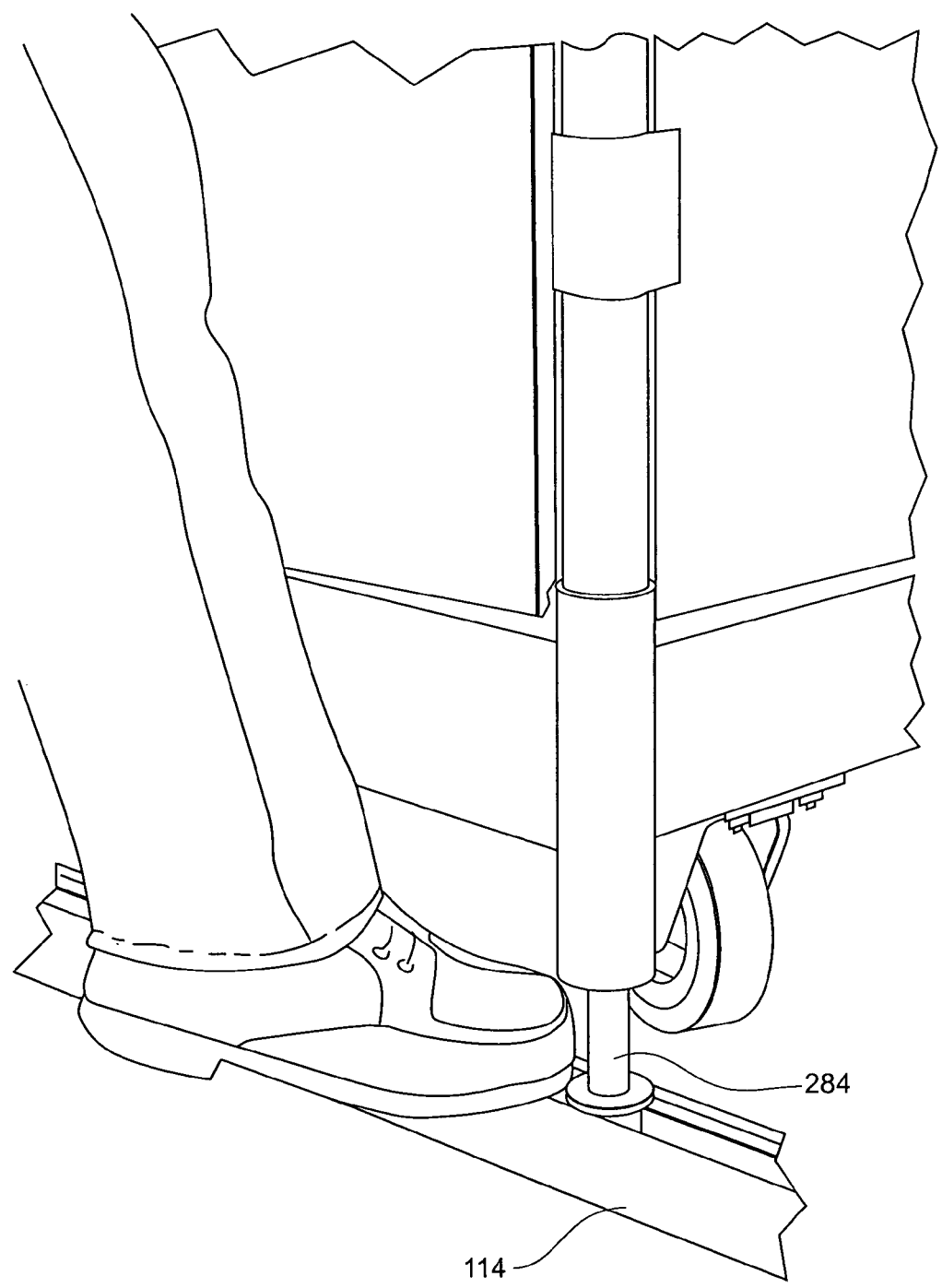
FIG. 90 is a perspective view of the track follower of a cart and a track according to an embodiment of the present invention depicting the track follower in an engaged position.
Figure 91:
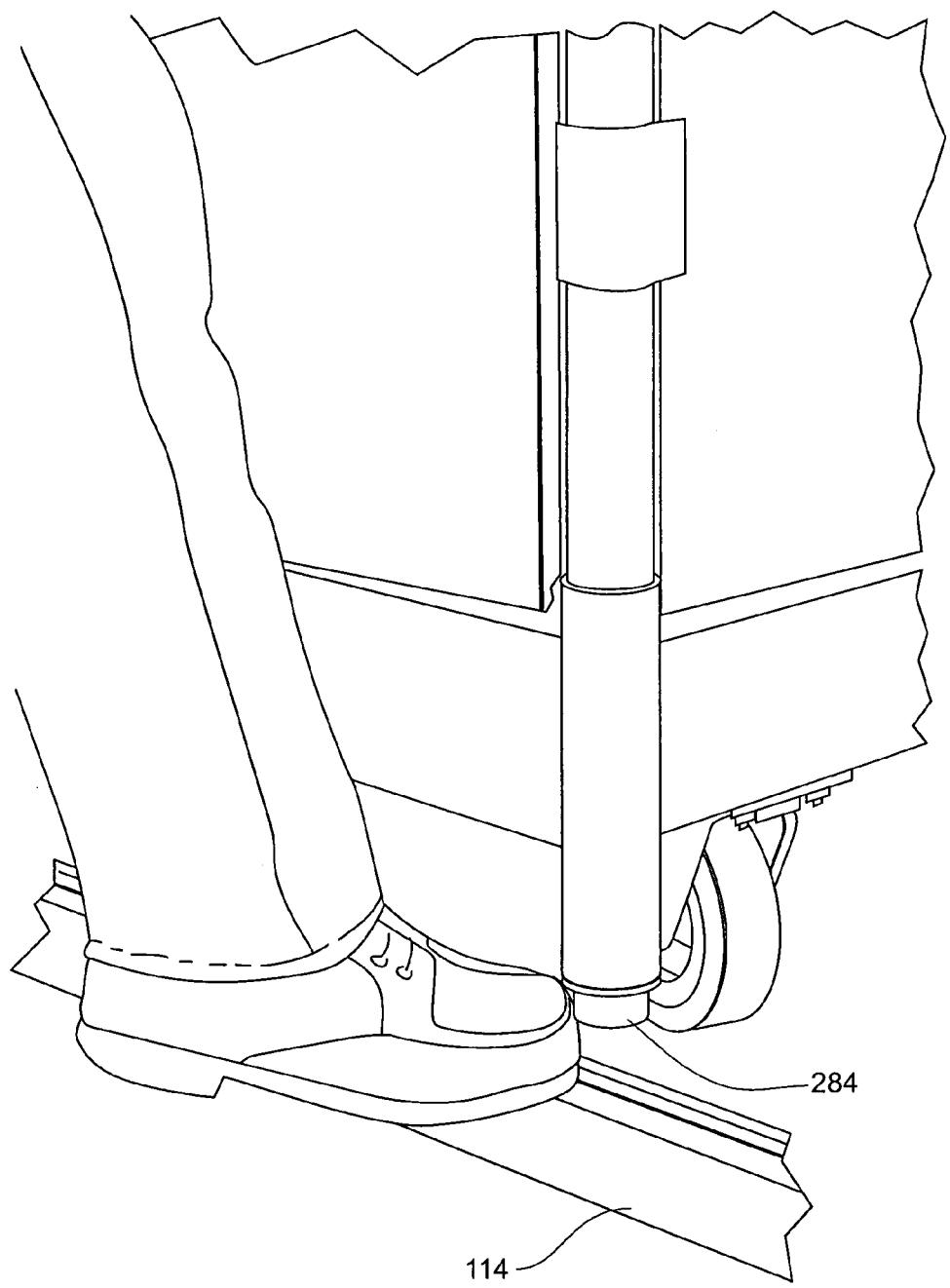
FIG. 91 is a perspective view of the track follower of a cart and a track according to an embodiment of the present invention depicting the track follower in a retained position.
Figure 92:
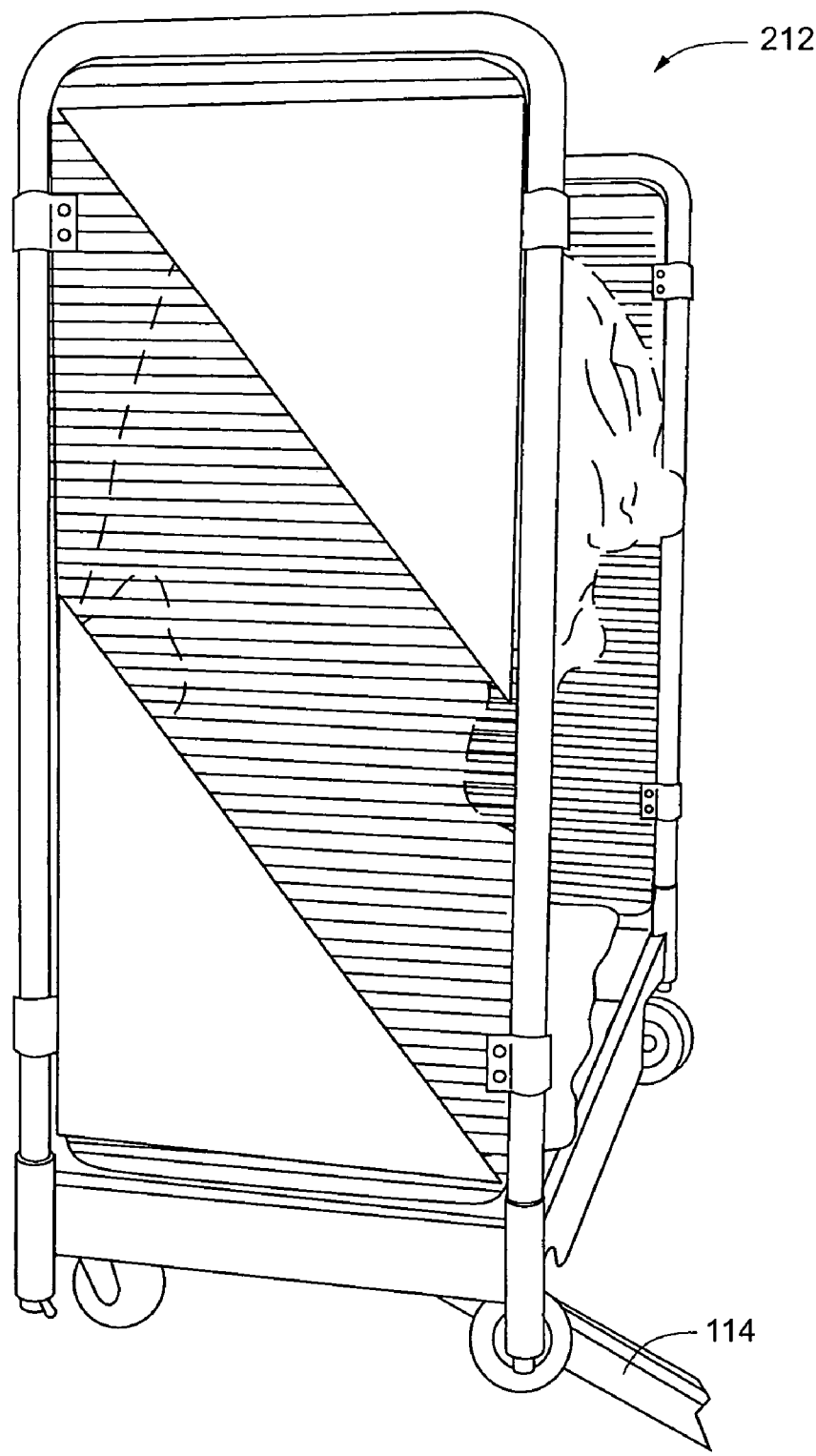
FIG. 92 is a perspective view of a cart according to an embodiment of the present invention depicting the cart partially outside of the storage site.

As depicted in FIG. 88-89, when it is desired that the cart 212 remain in the storage facility, the rollers 292 of the track followers 284 are engaged with the channel 404 of the track 114. In this position, the cart 212 is movable in a direction along the track 114. However, as can be seen in FIGS. 91-92, the modular cart 212 is removable from the track 114 and movable in a direction generally perpendicular to the track 114 when the at least one track follower 284 is selectively disengaged from the track 114. FIG. 90 depicts a track follower 284 in an engaged position with respect to the track 114. By using a foot, as depicted in FIG. 91, the track follower 284 can be lifted so that the plunger clip 295 and backer 297 on the locking mechanism 293 retains the track follower 284 in a retained position. As depicted in FIG. 92, once the track follower 284 is in a retained position, the modular cart 212 is removable from the track 114 and movable in a direction generally perpendicular to the track 114.

Figure 93A:
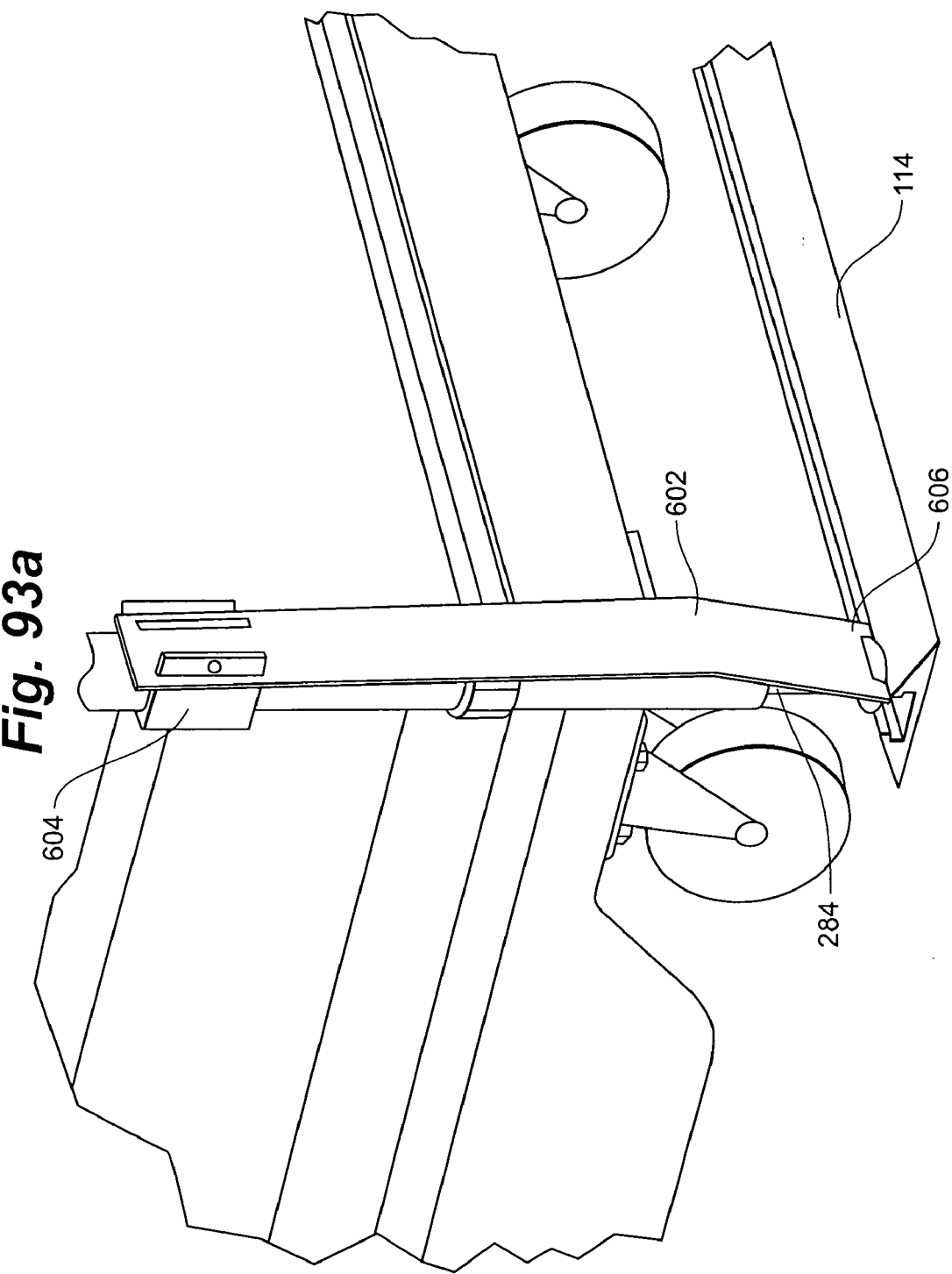
FIG. 93a is a perspective view of the track follower of a cart and a track according to an embodiment of the present invention depicting the track follower in a locked position by a plunger lock bracket.

If those using modular carts 212 desire to prevent the cart 212 from being removed from the storage facility, the plunger lock bracket 602 can be used to keep the track follower 284 in an engaged position. The plunger lock bracket 602 comprises a lock slot 604 that can be placed onto the locking portion 316 of a bracket 310 and a channel portion 606 that prevents the track follower 284 from being placed in a retained position. The plunger lock bracket 602 can be seen in FIG. 93.

Figure 95:
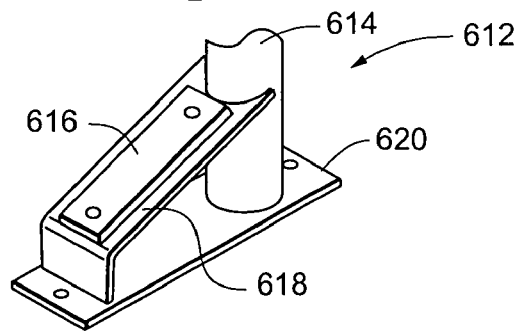
FIG. 95 is a perspective view of an island stop base of an island stop according to an embodiment of the present invention.

The storage facility for the modular storage system 110 of the present invention can be located in any area of the room, facility or even a storage area in vehicle such as a truck or trailer. While it is preferred that the storage facility be located near a wall and in the corner of a room, it is contemplated that the storage facility be located in the center of a room. In this type of arrangement, there will likely be a need to place an island stop 608, as depicted in FIGS. 94-95, within the room. The island stop 608 comprises an island stop frame 610 and an island stop base 612 located on ends 614a, 614b of the island stop frame 610. The island stop base 612 comprises a substantially flat island stop plate 620 and an island stop bracket 618 connected to the island stop plate 620. The island stop bracket 618 preferably comprises an island stop glide 616 to prevent damage to the underside of the cart base 116. When the modular storage system 110 is used with an island stop 608, the island stop 608 is placed near the termination of a track 114. When a cart 112 is moved along the track 114 towards the island stop 608, the island stop 608 prevents the cart 112 from running out of track 114. This type of arrangement allows a user to place the modular storage system 110 in any location within a room or storage area.

The cart base 116/216, cart top 122/222, front end 118/118, and rear end 120/220 of the retained cart 112 and the modular cart 212 according to the various embodiments of the present invention provides the carts 112, 212 with a defined structural integrity that is sufficient to permit the manual movement of the carts 12 in the direction that is generally parallel to the track 14 by a manual force greater than the coefficient of a rolling friction of the wheels 172/272 times the maximum gross weight exerted on one of the ends 18, 20 of the cart 12 and prevent binding along the length of the cart 12.

Instructional and AV Accessories

As depicted in FIG. 1, a modular cart 212 according to an embodiment of the present invention can be provided with a drawing panel or white board 622. In the embodiment shown in FIG. 1, the white board 622 is mounted on a front end 218 of the modular cart 212, although it will be understood that white board 622 could be mounted on either a side or end of the modular cart 212 or even the front end of a retained cart 112.

Figure 99:
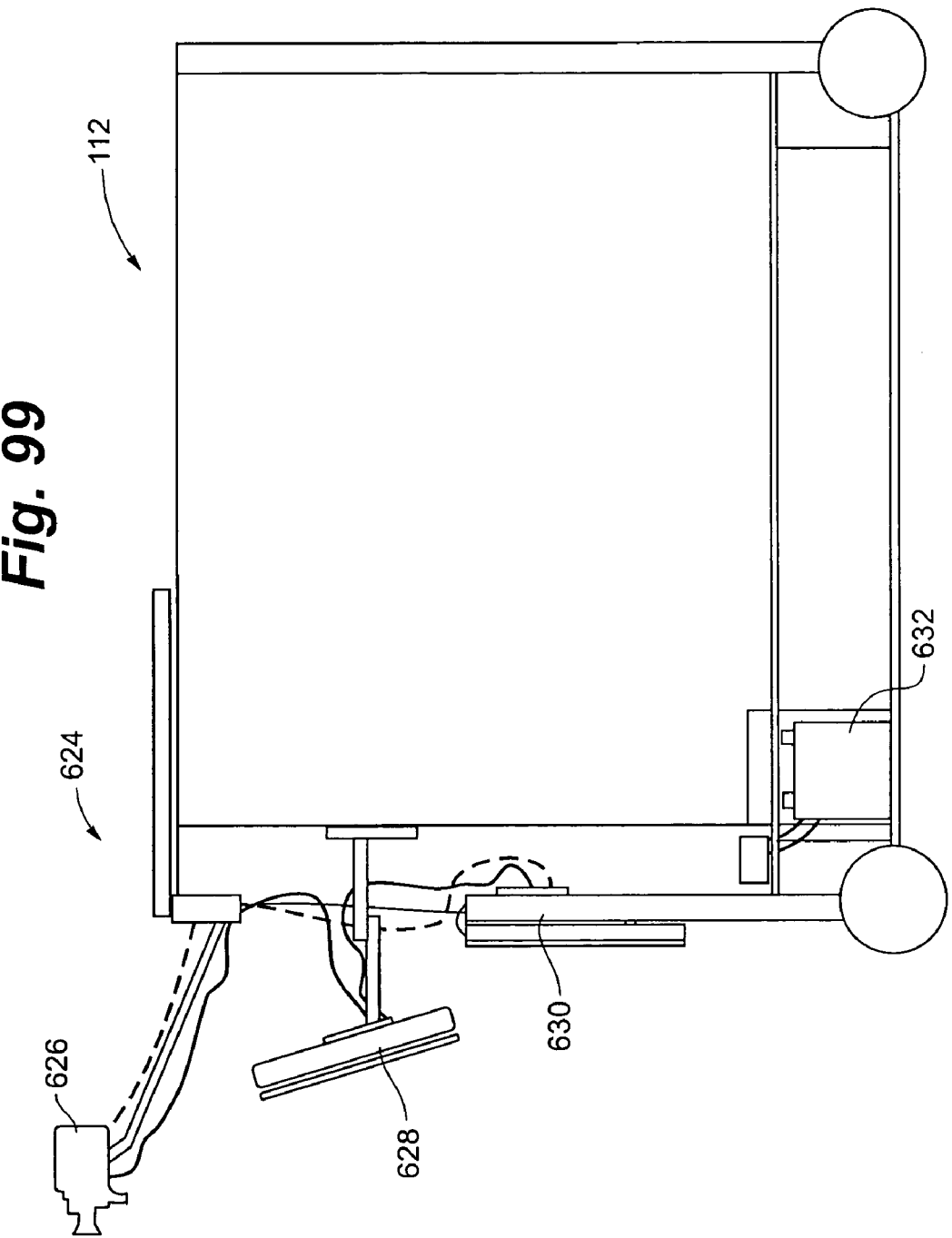
Figure 100:
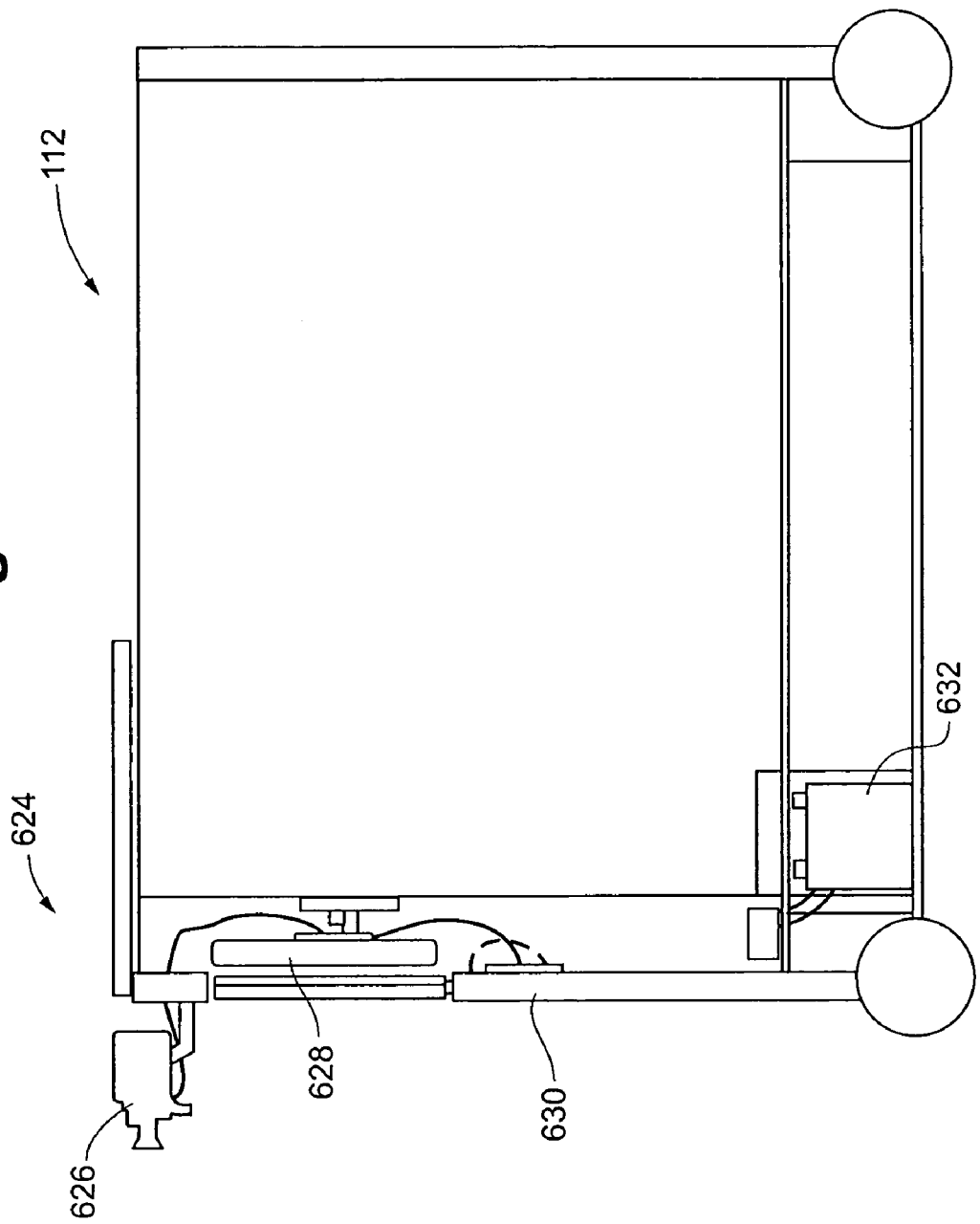
Figure 101:
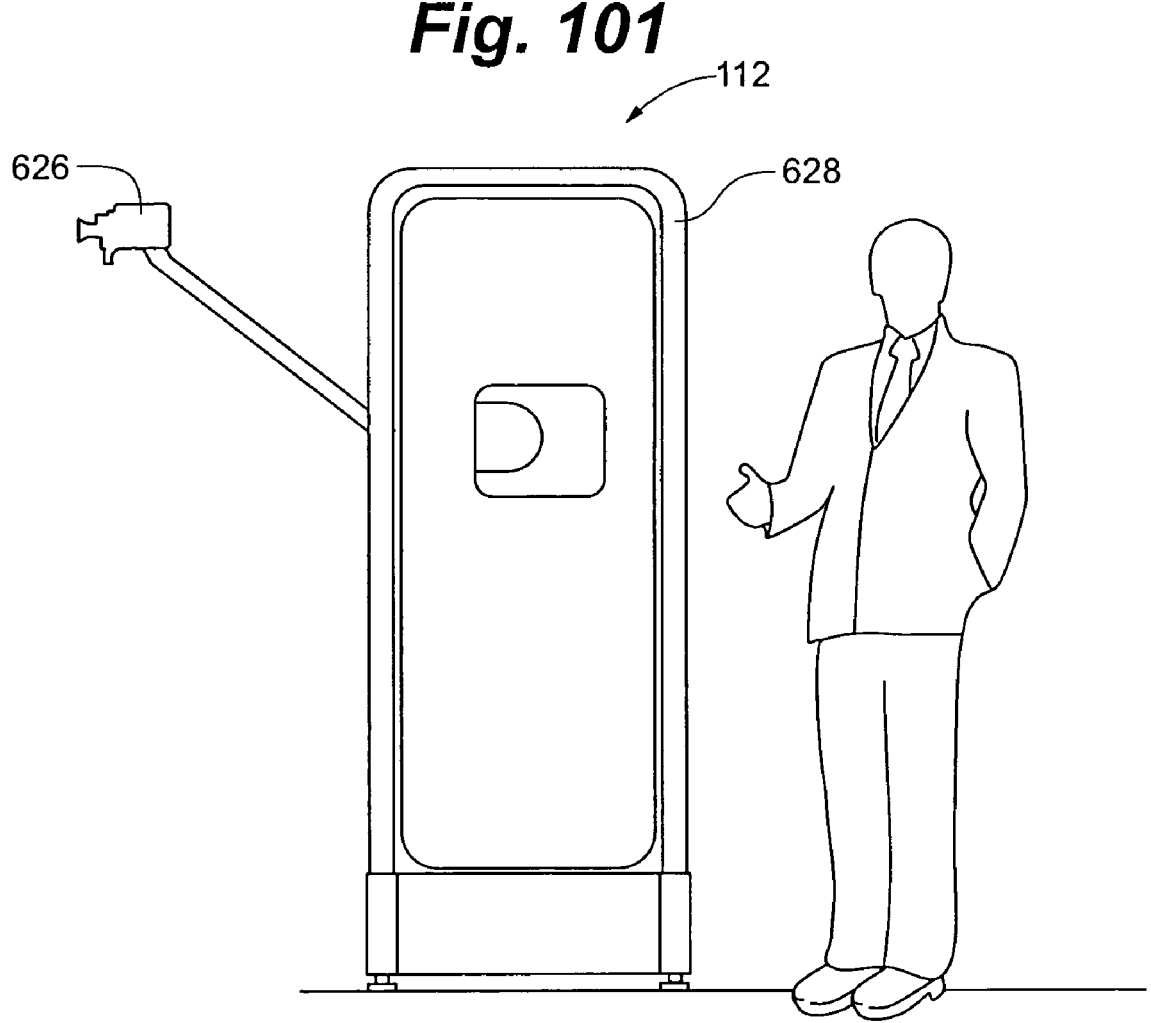

As depicted in FIGS. 99-101, a cart 212 according to an embodiment of the present invention comprises a video system 624. The video system 624 preferably includes a camera 626 and monitor 628 operably connected to a processor 630. The video system 624 is connected a power source 632 such as a battery or may be plugged into an electricity outlet.

Pull Cart

Figure 102:
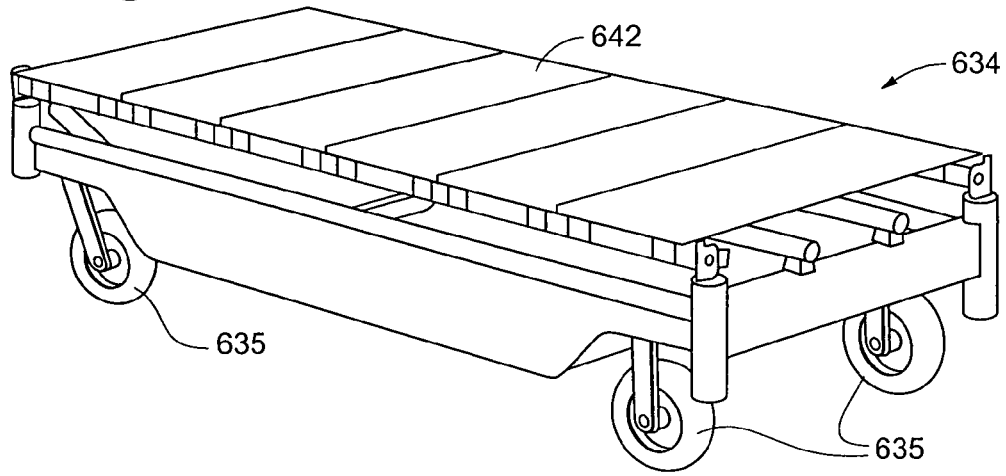
Figure 103:
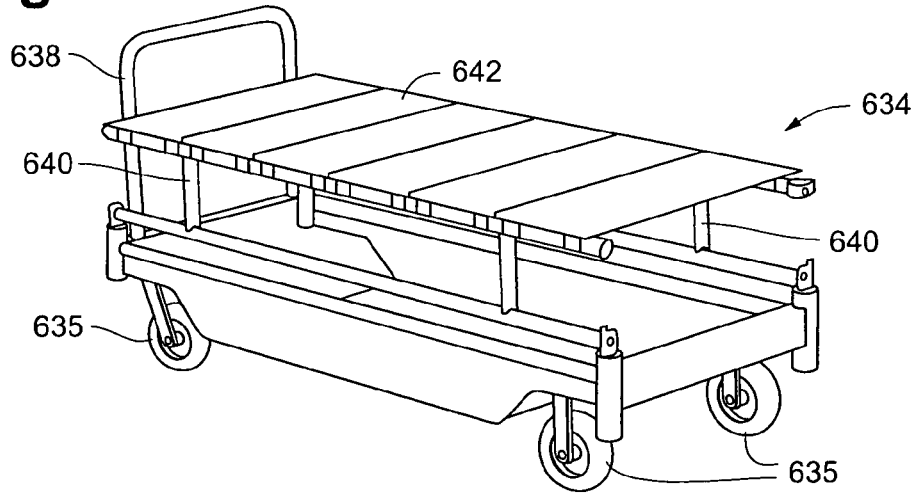
Figure 104:
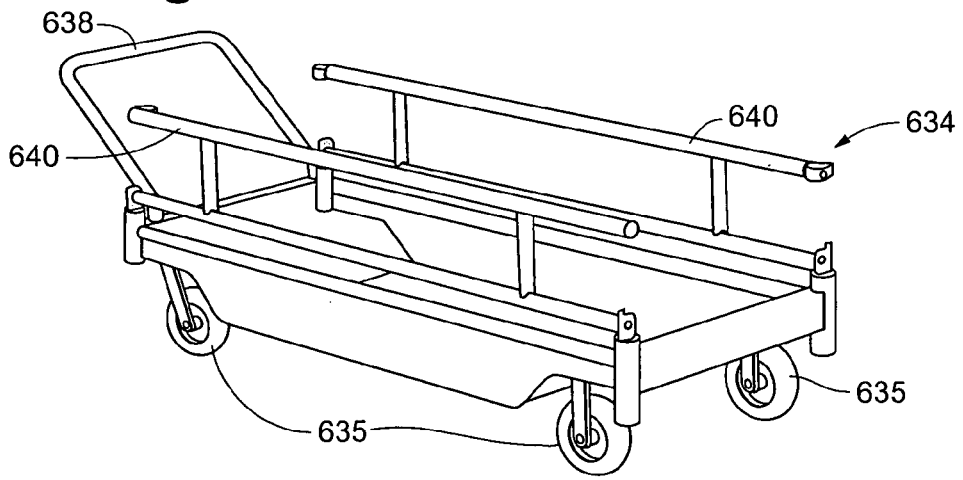

As depicted in FIGS. 102-104, a pull cart 634 for use in connection with the modular storage system 110 of the present invention is described. The pull cart 634 may be stored in storage facility in the opening along the track 114 or may be stored elsewhere in the storage facility, but it is not intended that the pull cart 634 be retained by the track 114 as part of modular storage system 110. The pull cart 634 is specifically designed for hauling portions of equipment to outdoor locations having turf or similar natural surfaces on which it would be difficult to transport the modular carts 212 of the present invention.

According to this embodiment of the present invention, the pull cart 634 comprises a base 636, a pull handle 638 located at an end 637 of the base 636, a pair of generally opposed rails 640 pivotally attached to the base 636 between a collapsed position 639 and an upright position 641, an top panel 642 disposed on the rails 640 when they are in the collapsed position 639 or the upright position 641, and a plurality of wheels 635 connected to the base 636. The base 636 is substantially the same as the base 216 on the modular cart 212. As such, the discussion of the base 216 is incorporated with reference to the pull cart 634. As can be seen in FIG. 103, the top panel 642 is preferably attached to the rails 640 using straps. The pull cart 634 can be used to transport equipment within the base 636 or on the top panel 642. The pull cart 634 can also be used to transport players, soldiers, or other persons when they are injured. The opposed rails 640 and pull handle 638 are preferably constructed of tubular steel, although other materials such as aluminum, alloys, graphite or composite materials or various plastics could be used without departing from the spirit and scope of this invention.

Figure 105:
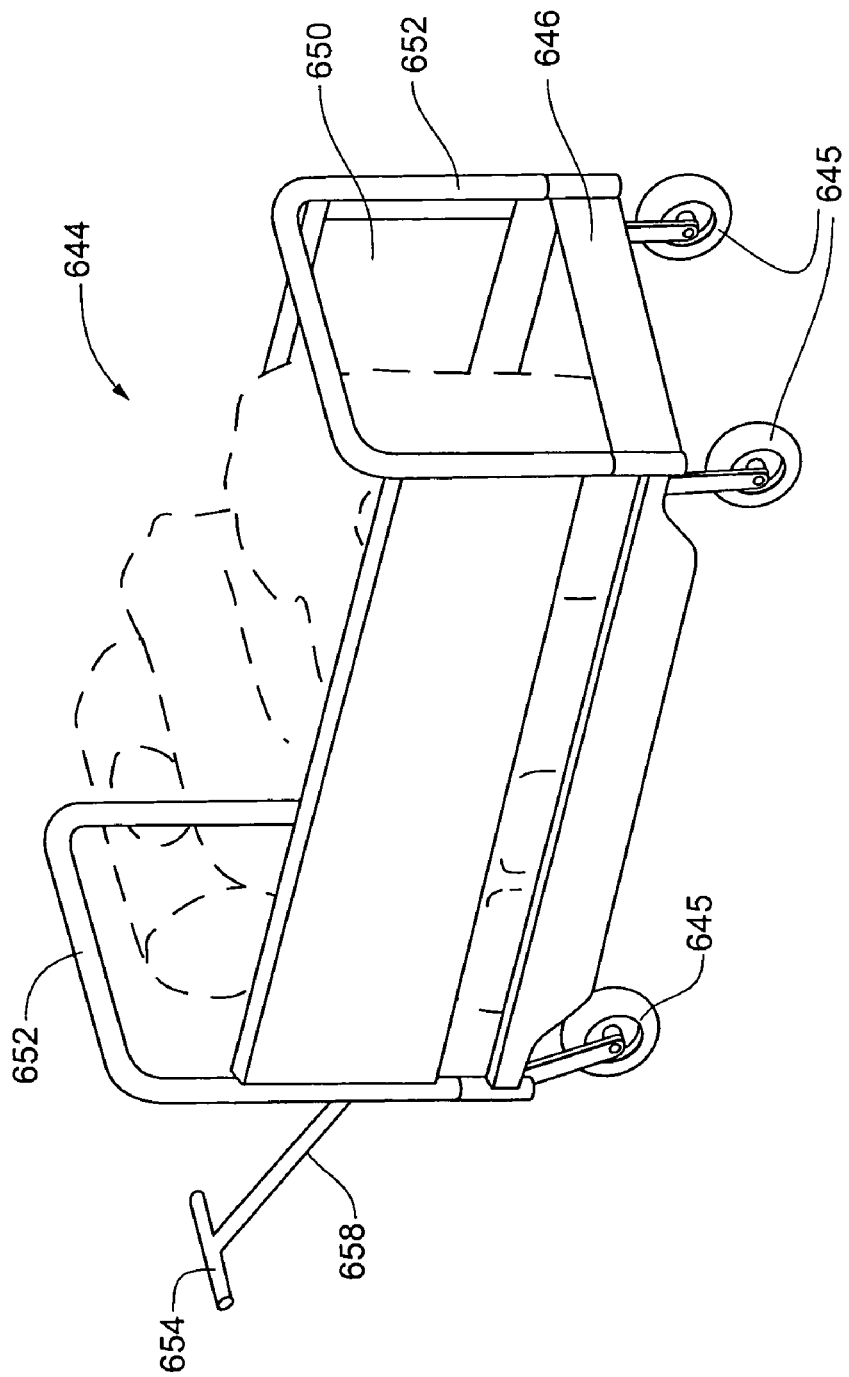
Figure 106:
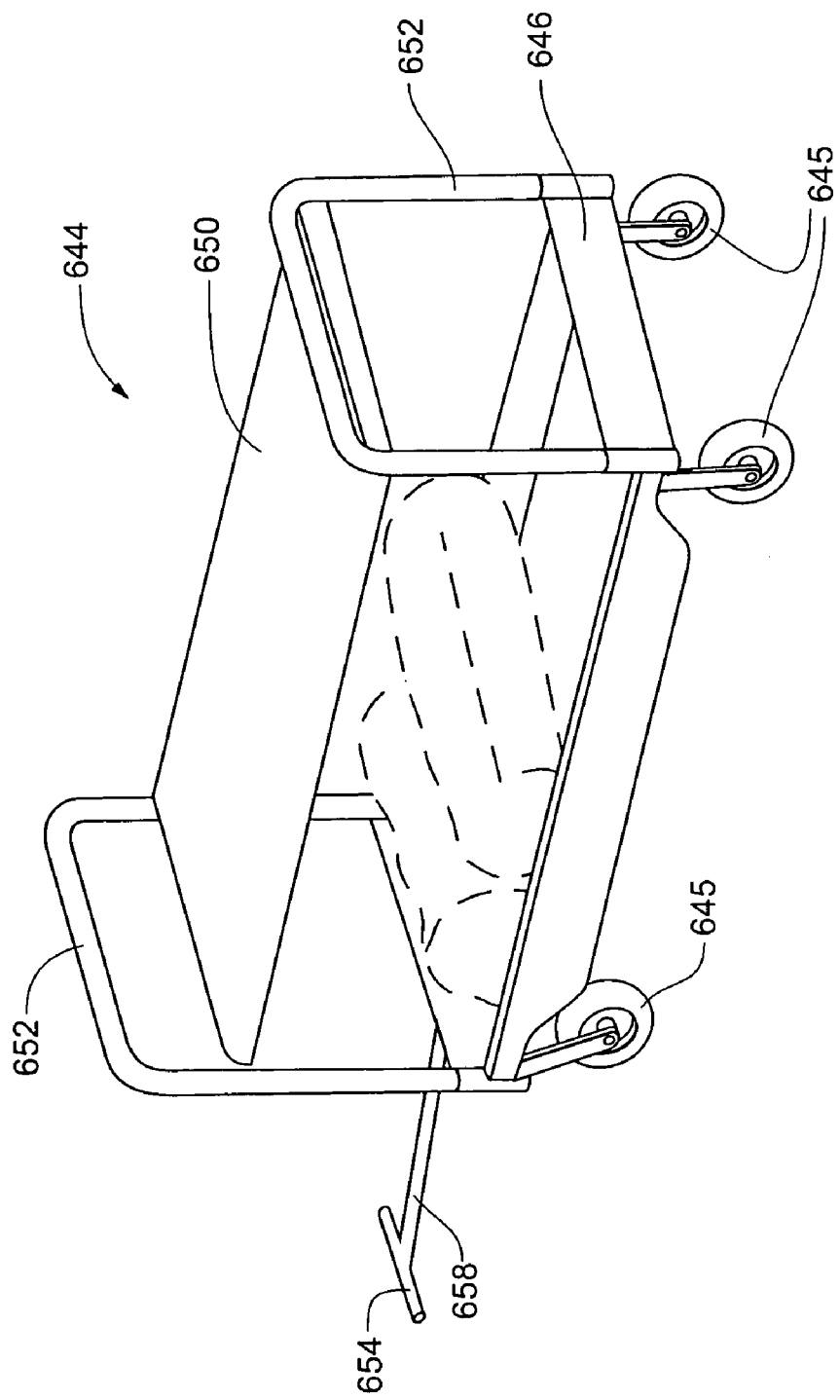

As depicted in FIGS. 105-107, a pull cart 644 according an embodiment of the present invention comprises a base 646, a pull handle 648 pivotally attached to an end of the cart 644, a pair of generally opposed side panels 650, a pair of generally opposed end frames 652, and a plurality of wheels 645 connected to the base. The base 646 is substantially the same as the base 216 on the modular cart 212. As such, the discussion of the base 216 is incorporated with reference to the pull cart 644. As depicted in FIG. 106, the cart 644 in another embodiment includes a top panel 651 disposed between the end frames 652. In this embodiment, players or equipment can be stored or transported on the top panel 651. The pull cart 644 can be used to transport equipment or persons within the base 646. The pull handle 648 can be seen in greater detail in FIGS. 107a-107e. The pull handle 648 comprises a handle member 654 and an opposed brake member 656 connected to the handle member 654 by a handle bar 658, and an attachment member 660 connected to the brake member 656. The pull handle 648 is pivotable between a use position and a brake position. When the pull handle 648 is in a brake position, the brake member 656 preferably contacts the wheels 645 and prevents the wheels 645 from rotating. The pull handle 648 and end frames 652 are preferably constructed of tubular steel, although other materials such as aluminum or various plastics could be used without departing from the spirit and scope of this invention.

The embodiments described herein are intended to be illustrative and not limiting. Additional embodiments are described within the claims. Although the present invention has been described with reference to particular embodiments, those skilled in the art will recognize that changes may be made to the embodiments in form and detail without departing from the spirit and the scope of the invention.

What is claimed:

1. A modular storage system comprising:
a plurality of carts, at least one of the plurality of carts including:
a base generally having a length that separates opposed ends of the base;
a storage structure operably attached to and carried by the base;
at least three pivotable wheel assemblies, each wheel assembly operably attached to and extending below the base to provide a rolling surface adapted to roll on the floor; and
at least one track follower mechanism having a height and a vertical axis along the height, the at least one track follower mechanism operably attached to one end of the base and having at least a portion of which is axially movable upwardly and downwardly along the vertical axis; and
a track operably positioned on the floor and extending along a track axis,
such that a cart is operably retained by and movable along the track axis when the at least one track follower mechanism is selectively engaged with the track by movement of the track follower mechanism from a position out of the track downwards axially along the vertical axis and into the track to permit the cart to be selectively positioned in a storage position that is generally side-by-side with an adjacent cart along the track axis and in an accessible position that is generally spaced apart with an adjacent cart along the track axis, and
such that the cart is removable from the track and movable in a direction transverse to the track axis when the at least one track follower mechanism is selectively disengaged from the track by movement of the track follower mechanism from a position in the track upwards axially along the vertical axis and out of the track.

2. The modular storage system of claim 1, wherein the track is installed in relation to a floor that is selected from the set consisting of: the floor of a vehicle, the floor of a trailer, the floor of a storage system than includes a plurality of movable floors, an existing floor, or a newly formed floor surface.

3. The modular storage system of claim 1, further comprising a stop at a track end, such that when a cart is moved in a direction generally parallel to the track axis to the track end, the stop prevents the cart from moving to a position that is beyond the track end.

4. The modular storage system of claim 1, wherein a cart is movable in a direction generally parallel to the track axis using manual force.

5. The modular storage system of claim 1, wherein the pivotable wheel assemblies on the modular cart are selected from the set consisting of: casters, axled pairs of wheels, or ball wheels.

6. A modular storage system comprising:
a plurality of carts, at least one of the plurality of carts including:
a chassis generally having a length mat separates opposed ends of the base;
a storage structure operably attached to and carried by the base;
at least three wheel assemblies, each wheel assembly operably attached to and extending below the base to provide a rolling surface adapted to roll on the floor, wherein the wheels on at least one cart are pivotable; and
at least one rail follower mechanism having a height and a vertical axis along the height, the at least one rail follower mechanism operably attached to one end of the base and having at least a portion of which is axially movable upwardly and downwardly along the vertical axis;
a rail operably positioned on the floor and extending along a rail axis,
such that the cans are operably retained by and movable along the rail axis when the at least one rail follower mechanism is selectively engaged with the rail by movement of the rail follower mechanism from a position out of the rail downwards axially along the vertical axis and into the rail to permit the cart to be selectively positioned in a storage position that is generally side-by-side with an adjacent cart along the rail axis and in an accessible position that is generally spaced apart with an adjacent can along the rail axis, and
such that the cart comprising pivotable wheels is removable from the rail and movable in a direction generally transverse to the rail axis when the at least one rail follower mechanism is selectively disengaged with the rail by movement of the rail follower mechanism from a position in the rail upwards axially along the vertical axis and out of the rail.

7. The modular storage system of claim 6, wherein the rail is installed in relation to a floor that is selected from the set consisting of: the floor of a vehicle, the floor of a trailer, the floor of a storage system than includes a plurality of movable floors, an existing floor, or a newly formed floor surface.

8. The modular storage system of claim 6, further comprising a stop at a rail end, such that when a cart is moved in a direction generally parallel to the rail axis to the rail end, the stop prevents the rail follower mechanism from moving to a position that is beyond the rail end.

9. The modular storage system of claim 6, wherein a cart is movable in a direction generally parallel to the rail axis using manual force.

10. The modular storage system of claim 6, wherein the wheels assemblies on the modular cart are selected from the set consisting of: casters, axled pairs of wheels, or ball wheels.

11. A method of using a modular storage system comprising:
- providing a plurality of carts, at least one of the plurality of carts including:
  - a base generally having a length that separates opposed ends of the base;
  - a storage structure operably attached to and carried by the base;
  - at least three pivotable wheel assemblies, each wheel assembly operably attached to and extending below the base to provide a rolling surface adapted to roll on the floor; and
  - at least one track follower mechanism having a height and a vertical axis along the height, the at least one rail follower mechanism operably attached to one end of the base and having at least a portion of which is axially movable upwardly and downwardly along the vertical axis; and
- providing a track operably positioned on the floor and extending along a track axis;
- selectively engaging the at least one track follower mechanism with the track by movement of the track follower mechanism from a position out of the track downwards axially along the vertical axis and into the track so that the cart is operably retained by and movable only in a direction generally parallel to the track axis in a storage position; and
- selectively disengaging the at least one track follower mechanism from the track by movement of the track follower mechanism from a position in the track upwards axially along the vertical axis and out of the track, such that the cart is removable from the track and movable in a direction transverse to the track axis.

* * * * *

UNITED STATES PATENT AND TRADEMARK OFFICE
CERTIFICATE OF CORRECTION

PATENT NO. : 7,484,631 B2
APPLICATION NO. : 10/990277
DATED : February 3, 2009
INVENTOR(S) : Bothum et al.

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (536) days Delete the phrase "by 536 days" and insert -- by 492 days --

Signed and Sealed this

Twenty-ninth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,484,631 B2  Page 1 of 1
APPLICATION NO. : 10/990277
DATED : February 3, 2009
INVENTOR(S) : Bothun et al.

It is certified that error appears in the above-identified patent and that said Letters Patent is hereby corrected as shown below:

On the title page,

[*] Notice: Subject to any disclaimer, the term of this patent is extended or adjusted under 35 USC 154(b) by 536 days.

Delete the phrase "by 536 days" and insert -- by 937 days --

Signed and Sealed this

Twenty-ninth Day of June, 2010

David J. Kappos
*Director of the United States Patent and Trademark Office*